US007653517B2

(12) United States Patent
Oba et al.

(10) Patent No.: US 7,653,517 B2
(45) Date of Patent: Jan. 26, 2010

(54) DESIGN DATA GENERATING APPARATUS AND DESIGN DATA GENERATING METHOD

(75) Inventors: Morio Oba, Gamagori (JP); Takatoshi Negishi, Nagoya (JP); Yasuo Mishima, Hekinan (JP); Koji Fujiwara, Toyota (JP); Ryuji Nagata, Okazaki (JP); Masataka Sato, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 687 days.

(21) Appl. No.: 10/812,935

(22) Filed: Mar. 31, 2004

(65) Prior Publication Data

US 2005/0001363 A1 Jan. 6, 2005

(30) Foreign Application Priority Data

Apr. 15, 2003 (JP) ............................. 2003-110675
Jun. 27, 2003 (JP) ............................. 2003-184124

(51) Int. Cl.
*G06F 17/50* (2006.01)

(52) U.S. Cl. ........................................................ 703/1

(58) Field of Classification Search ...................... 703/1
See application file for complete search history.

(56) References Cited

U.S. PATENT DOCUMENTS

| 5,806,069 | A | 9/1998 | Wakiyama et al. |
| 6,223,092 | B1 | 4/2001 | Miyakawa et al. |
| 6,557,002 | B1 | 4/2003 | Fujieda et al. |

(Continued)

FOREIGN PATENT DOCUMENTS

EP 0 642 105 3/1995

(Continued)

OTHER PUBLICATIONS

"Deformation of n-dimensional objects" Borrel et al. ACM 1991.*

(Continued)

*Primary Examiner*—Kamini Shah
*Assistant Examiner*—Saif Alhija
(74) *Attorney, Agent, or Firm*—Finnegan, Henderson, Farabow, Garrett & Dunner, LLP

(57) ABSTRACT

A design data generating apparatus for generating new design data of an article by performing a shape transformation process with respect to design data of the article which has been already generated comprises an input device which receives transformation instructions from an operator and an operation device which performs an operation of the design data in accordance with the input transformation instructions. The input device receives input of allocation of article shape attribute between an attribute of a transformation region which is to be transformed and an attribute of a maintaining region which maintains its shape, and input of a transformation instruction vector defined by a direction and an amount of transformation with respect to the article. The operation device performs a transformation process with respect to a node which defines an article shape of the transformation region in accordance with the transformation instruction vector. Specifically, the operation device fixes a node located at a boundary between the transformation region and the maintaining region, and transforms a node not located at the boundary. Thus, a new three-dimensional shape which the operator expects can be efficiently designed.

11 Claims, 45 Drawing Sheets

U.S. PATENT DOCUMENTS 6,725,184 B1 4/2004 Gadh et al.
6,882,893 B2 4/2005 Uchida et al.

FOREIGN PATENT DOCUMENTS

| JP | 63 82549 | 4/1988 |
| JP | 2-297673 | 10/1990 |
| JP | 5-298396 | 11/1993 |
| JP | 9-36238 | 2/1997 |
| JP | 9-185647 | 7/1997 |
| JP | 11-45353 | 2/1999 |
| WO | WO 02/31775 | 4/2002 |

OTHER PUBLICATIONS

European Search Report dated Dec. 19, 2006.
Anonymous: "Ashlar-Vellum: Cobalt, Xenon & Argon: DesignerElements-3D Modeling User Guide" *Internet Citation* [online] Jan. 2003.
Haixia Du, et al., "Integrating Physics-based Modeling with PDE Solids for Geometric Design," Computer Graphics and Applications, 2001, Proceedings Ninth Pacific Conference (Oct. 16-18, 2001), *IEEE*, pp. 198-207.
Borrel, P., et al., "Deformation of n-dimensional objects," *Proceedings. Symposium on Solid Modeling Foundations and CAD/CAM Applications*, ACM 1991, pp. 351-369, XP002397143.
McDonnell, K.T., et al., "Dynamic Sculpting and Animation of Freeform Subdivision Solids," Computer Animation 2000. *Proceedings* May 3-5, 2000, *IEEE*, pp. 126-133, XP010526540.
Chinese Office Action dated Mar. 24, 2006.
"Realization of Mechanical CAD Standardized Database," *Mechanics and Electronics*, (2000), pp. 28-29.
Japanese Search Report dated Jul. 19, 2005.

* cited by examiner

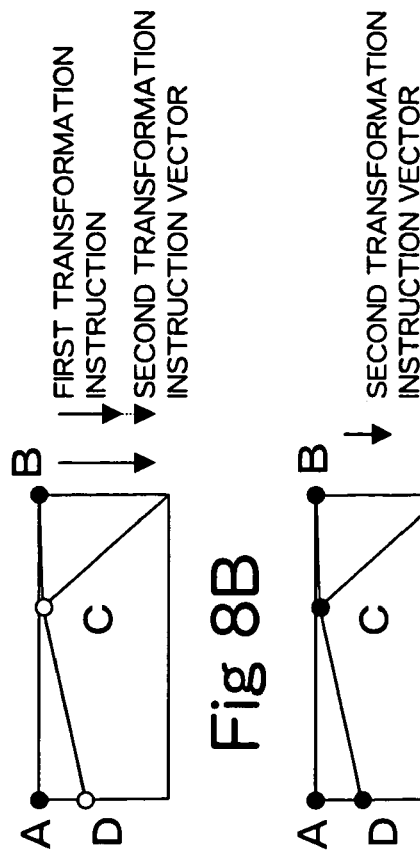
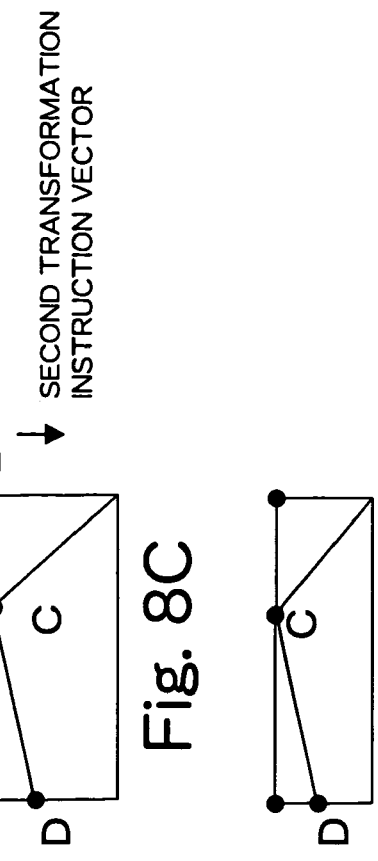
Fig. 8A  Fig 8B  Fig 8C  Fig. 8D
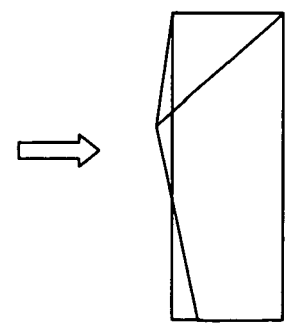
Fig. 7A  Fig. 7B

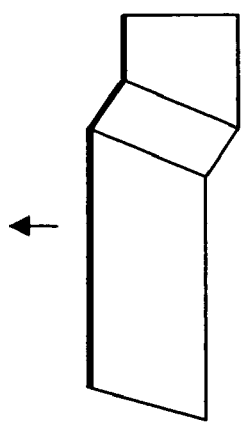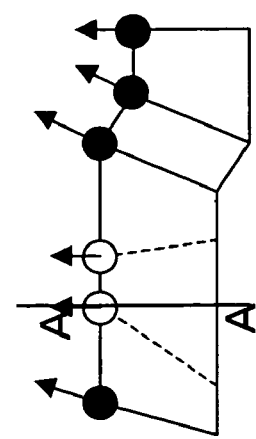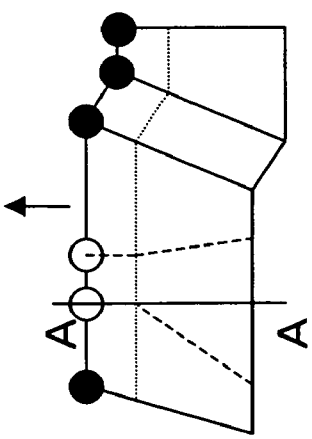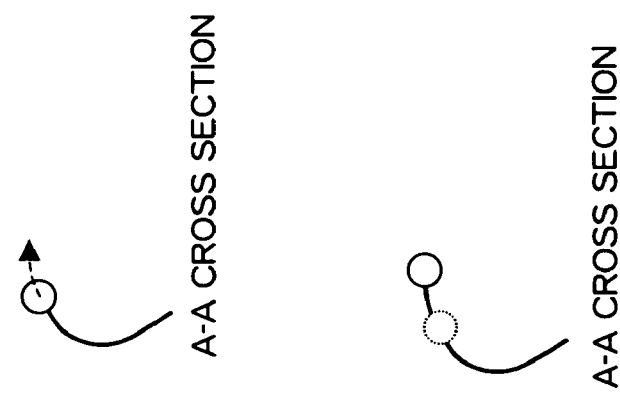

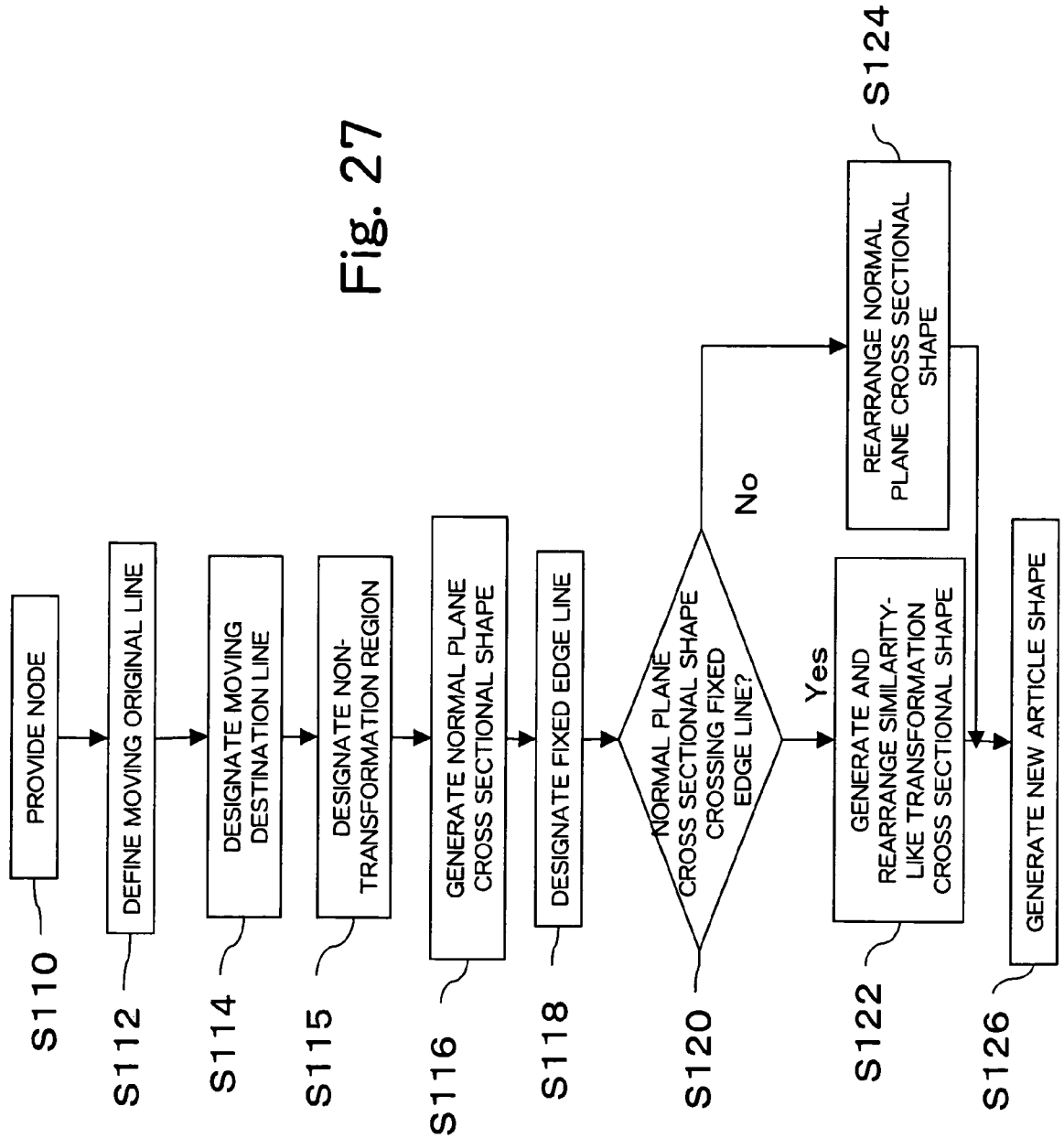

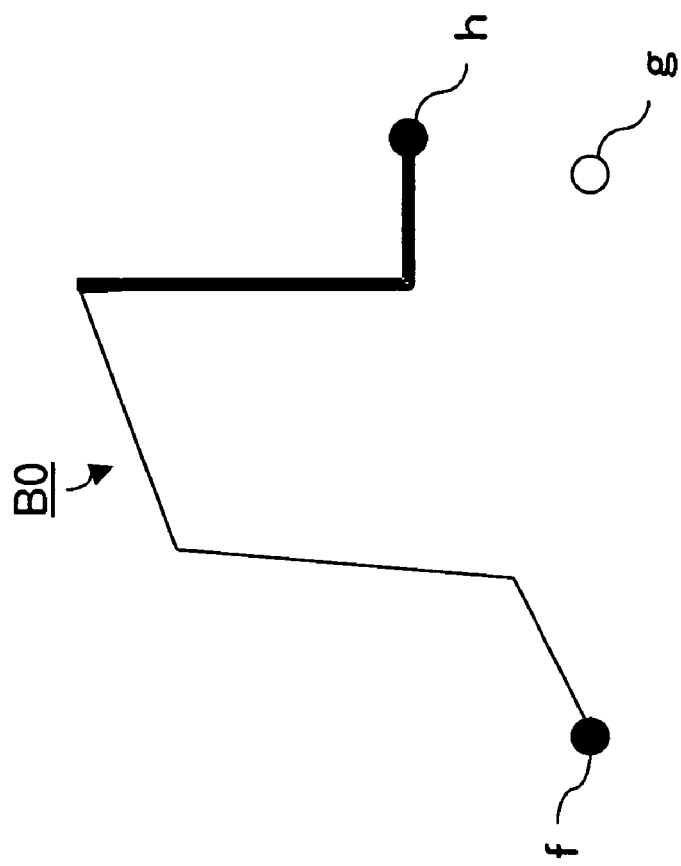
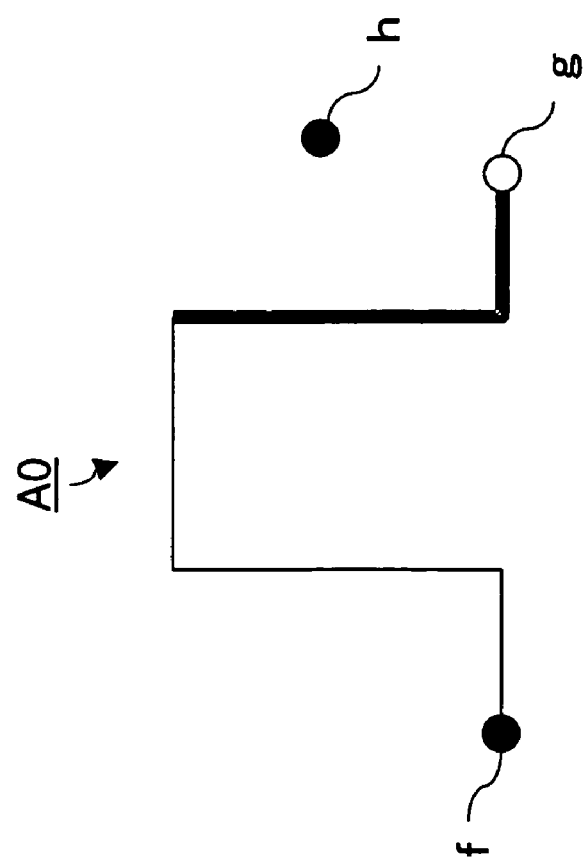
Fig. 29B
Fig. 29A

DESIGN DATA GENERATING APPARATUS AND DESIGN DATA GENERATING METHOD

BACKGROUND OF THE INVENTION

1. Field of the Invention

The present invention relates to a design data generating method and a design data generating apparatus, and more particularly to a design data generating method and a design data generating apparatus for changing an existing article shape to generate new design data for an article.

2. Description of Related Art

A new article may be designed by transforming existing article data using a CAD (Computer-Aided Design) apparatus. For example, according to one method which is used, for an article having a shape as shown in FIG. 47A, a line segment which is to be a new edge line of the article is input, and the original cross sectional shape is arranged along the new edge line while maintaining its shape, thereby generating a new shape shown in FIG. 47B.

Further, with respect to LSI layout pattern design, there has been a method in which a function cell for realizing a function unit of the designed layout pattern is replaced, thereby achieving efficient re-designing. (For example, see Japanese Patent Laid-Open Publication No. Hei 9-36238). According to another method, a cross sectional shape is extracted from an existing three-dimensional article shape, and a shape model which is classified according to the shape pattern is subjected to basic operations such as extrusion, sweep, rotation, cutting, mirror copy, etc., thereby generating a three-dimensional shape of a new article. (See Japanese Patent Laid-Open Publication No. Hei 11-45352, for example.)

Even in the case of transforming the whole article design based on the data of an existing article, rather than partial replacement of an existing article, it is sometimes desired to transform a portion of the article while another portion is maintained. In such a case, according to the conventional process, only a portion of the article which needs transformation is extracted and transformed, and then the transformed portion is once again connected to the portion which maintains the original shape. The above conventional process, however, suffers from problems that it is difficult to recognize and confirm the whole article design during transformation and that the boundary between connected portions becomes discontinuous.

There are also cases where a new article shape is desired which cannot be configured with the cross sectional shape of the existing article being maintained. In this case, it is necessary to first transform individual cross sectional shapes and then rearrange the transformed cross sectional shapes in order to obtain a new three-dimensional shape.

However, it is difficult to generate a new three-dimensional shape which the operator expects by transforming the individual cross sectional shapes, and therefore this has largely been a process of trial and error.

In addition, because there is no way of specifying how cross sectional model shapes are arranged in a new three-dimensional shape so as to satisfy the operator's desire, efficient use has not been made of an existing three-dimensional shape.

SUMMARY OF THE INVENTION

It is an advantage of the present invention to achieve efficient design operation in a design data generating apparatus for generating new design data of an article by applying a shape transformation process to design data of the article which is already generated.

A design data generating apparatus in accordance with the present invention comprises a region attribute input device for receiving, from an operator, attribute allocation of the article shape between a transformation region to which shape transformation is to be performed and a maintaining region which maintains its shape, a transformation instruction input device for receiving, from the operator, a transformation instruction vector which is defined by the direction and amount of transformation with respect to the article, a transformation processing device for performing a displacement process with respect to nodes which define an article shape of the transformation region in accordance with the input transformation instruction vector, a node located at a boundary between the transformation region and the maintaining region being fixed and a node not located at the boundary being subjected to the displacement process. Thus, because the transformation process can be performed using the whole article design data, no discontinuity is caused at the boundary of the transformation region and the maintaining region. Further, because an operator can perform transformation design while confirming the structure of the whole article, efficient article design can be achieved.

BRIEF DESCRIPTION OF THE DRAWINGS

FIG. 7A is a view for explaining the design data generating method according to the third embodiment of the present invention using a specific figure.

FIG. 7B is a view for explaining the design data generating method according to the third embodiment of the present invention using a specific figure.

FIG. 8A is a view for explaining the design data generating method according to the third embodiment of the present invention using a specific figure.

FIG. 8B is a view for explaining the design data generating method according to the third embodiment of the present invention using a specific figure.

FIG. 8C is a view for explaining the design data generating method according to the third embodiment of the present invention using a specific figure.

FIG. 8D is a view for explaining the design data generating method according to the third embodiment of the present invention using a specific figure.

FIG. 10A is a view for explaining the design data generating method according to the fourth embodiment of the present invention using a specific figure.

FIG. 10B is a view for explaining the design data generating method according to the fourth embodiment of the present invention using a specific figure.

FIG. 10C is a view for explaining the design data generating method according to the fourth embodiment of the present invention using a specific figure.

FIG. 27 is a chart showing the design data generation flow including a step of designating a non-transformation region according to the sixth embodiment of the present invention.

FIG. 29A is a view for explaining similarity-like transformation of a normal plane cross sectional shape which crosses the non-transformation region shown in FIG. 28A.

FIG. 29B is a view for explaining similarity-like transformation of a normal plane cross sectional shape which crosses the non-transformation region shown in FIG. 28A.

DETAILED DESCRIPTION OF PREFERRED EMBODIMENTS

Preferred embodiments of the present invention will be described in further detail with reference to the accompanying drawings.

Embodiment 1

Figure 1:
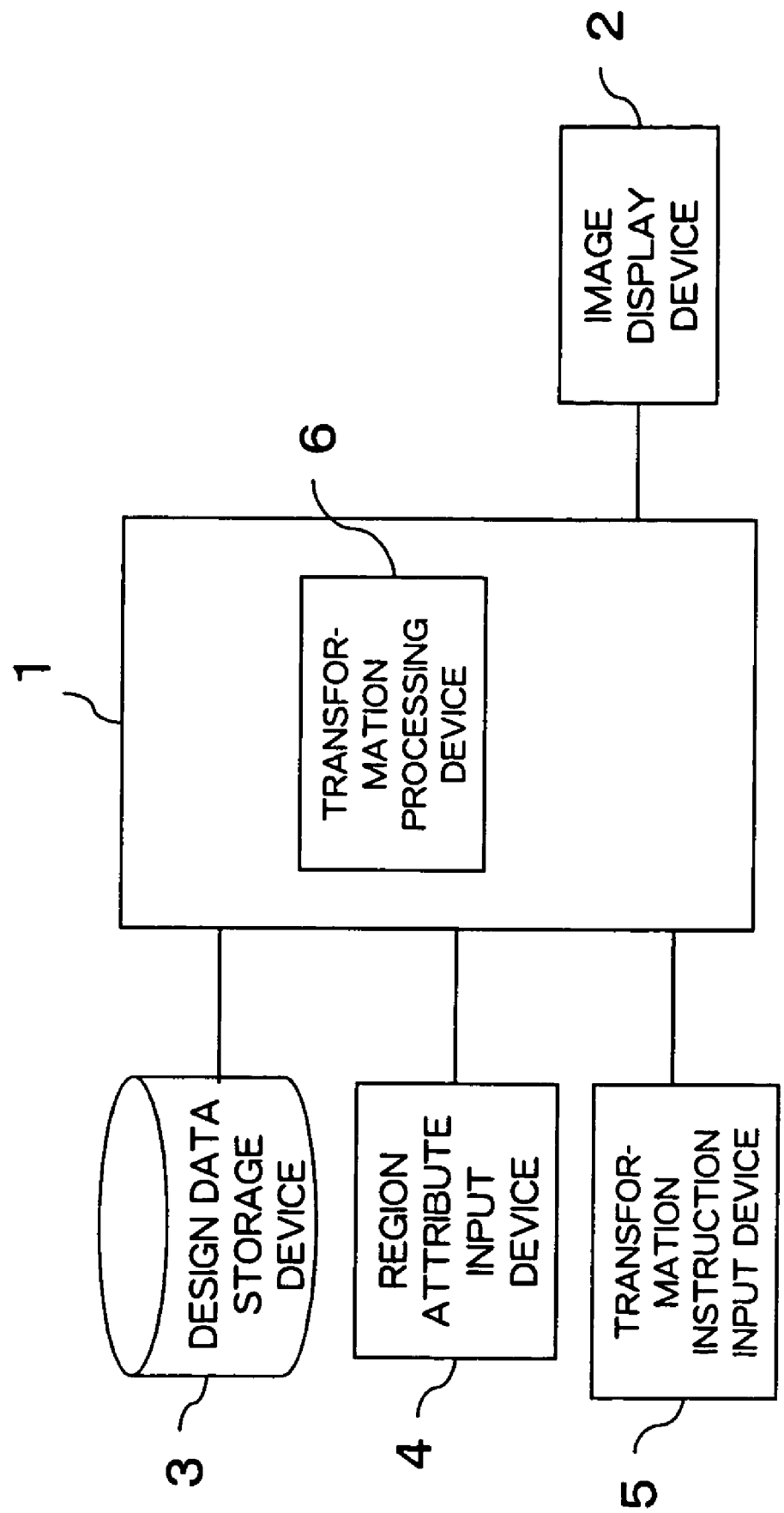
FIG. 1 is a functional block diagram of a design data generating apparatus according to a first embodiment of the present invention.

FIG. 1 is a functional block diagram showing the structure of a design data generating apparatus 100 according to the first embodiment of the present invention. The design data generating apparatus 100 is an apparatus for generating new design data of an article by applying a shape transformation process to design data of the article which has been already generated. More specifically, existing article design data is read out from a design data storage device 3 which is configured by a hard disk or the like. The operator inputs data using a region attribute input device 4 configured by an input device, such as a keyboard or a mouse, and a transformation instruction input device 5 and performs a shape transformation process in accordance with the input data using a transformation processing device 6 included in a calculator 1, while visually confirming the shape being transformed on an image display device 2 such as a CRT. The design data generating apparatus preferably includes communication means for communicating with a printer and a network.

Figure 2:
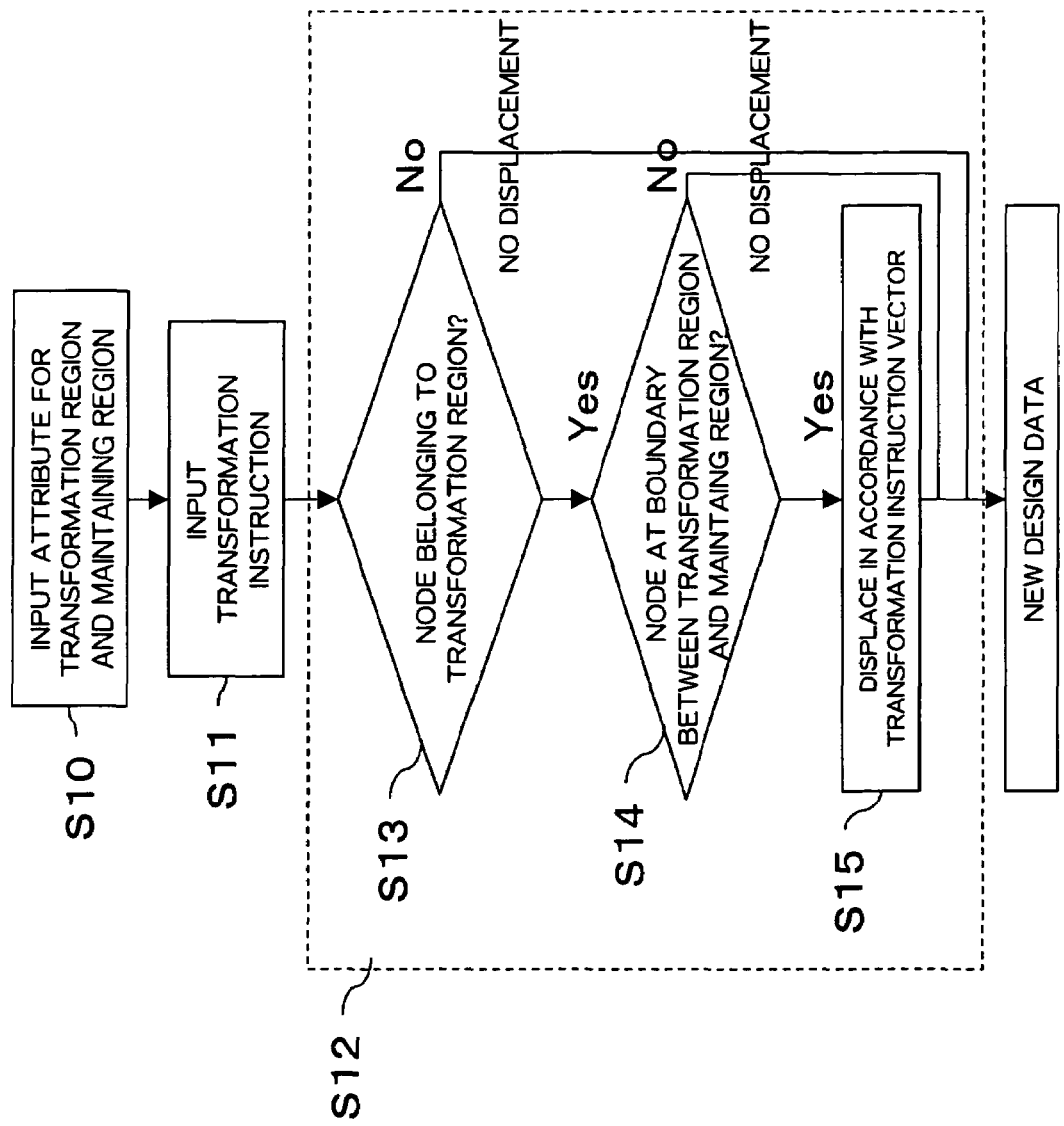
FIG. 2 is a flowchart showing a design data generating method according to the first embodiment of the present invention.

FIG. 2 is a flowchart showing data generation in the deign data generating apparatus of the present invention.

First, existing article design data stored in the design data storage device 3 is read out. The region attribute input device 4 receives operator's input for attribute allocation of the input existing article shape to which a transformation process is to be applied, between a transformation region which the operator wishes to transform and a maintaining region whose shape the operator wishes to maintain during the transformation process (S10). The boundary between the transformation region and the maintaining region may be a line or may be nonlinear series of a plurality of segments. Then, the transformation instruction input device 5 receives operator's transformation instructions by a transformation instruction vector which is defined by the direction and amount of transformation with respect to the article (S11). The transformation instruction vector may instruct X direction extension of the shape by 1.5 times, for example.

Then, the transformation processing device 6 performs transformation process of the shape based on the above-described information (S12). In the transformation process, it is first determined whether or not a node which defines the article shape belongs to the transformation region (S13). It should be noted that a node refers to an apex of a shape which defines a certain region. With regard to the node which belongs to the transformation region, it is further determined whether or not the node belongs to the boundary between the transformation region and the maintaining region (S14). Nodes belonging only to the maintaining region, not to the transformation region, and nodes belonging to the boundary between the transformation region and the maintaining region, as classified according to the above determination, are not to be subject to relative displacement in accordance with the transformation instruction vector in this transformation process. Accordingly, the maintaining region defined by these nodes will retain its original shape. It should be noted that although, with transformation of the transformation region, the maintaining region may change its position on the display screen of the image display device 2 with its shape being maintained, the dimension of the maintaining region as design data is maintained. Nodes belonging only to the transformation region, on the other hand, are to be displaced in accordance with the transformation instruction vector (S15). As a result of the node displacement in the above-described transformation process at S12, a new article shape is generated as new design data.

With the above structure, because the transformation process can be performed using the design data of the whole article, discontinuity is not caused at the boundary between the transformation region and the maintaining region. Further, because an operator can perform design transformation while confirming the structure for the whole article, efficient article design can be achieved.

Preferably, the input data received by the transformation instruction input device from the operator includes instructions concerning an operative node of the transformation instruction vector, i.e., a node on which the transformation instruction vector acts. With these instructions, the shape of the transformation region can be transformed by displacing only the predetermined node in accordance with the predetermined transformation instruction vector.

Further, the instructions for the operative node of the transformation instruction vector may preferably include point designation concerning a single node, line designation concerning a line connecting nodes, and plane designation concerning a plane enclosed by nodes.

Figure 3A:
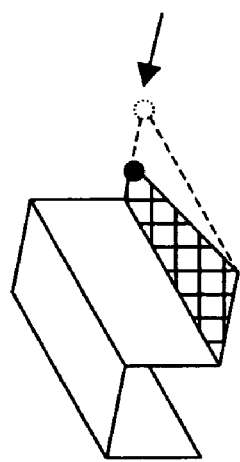
FIG. 3A is an example transformation process for an existing article shape by the design data generating method according to the first embodiment of the present invention.
Figure 3B:
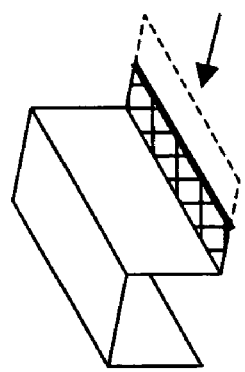
FIG. 3B is another example transformation process for an existing article shape by the design data generating method according to the first embodiment of the present invention.
Figure 3C:
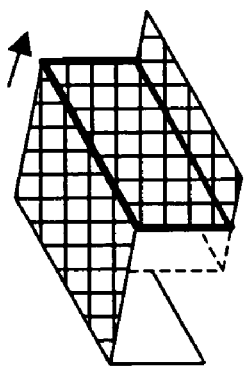
FIG. 3C is a further example transformation process for an existing article shape by the design data generating method according to the first embodiment of the present invention.

The node displacement in the design data generating apparatus according to the first embodiment of the present invention will be described using an example. FIGS. 3A, 3B, and 3C show transformation of the transformation region when the point designation, the line designation, and the plane designation are instructed, respectively.

First, the attributes of the transformation region and the maintaining region are input by the operator (S10). In this case, the checked portion in the drawing is specified as the transformation region (the shape of the transformation region before transformation is shown by dotted line). Subsequently, the transformation instruction input device 5 receives, from the operator, transformation instructions in a transformation instruction vector defined by the direction and amount of transformation for the article (S11). In FIGS. 3A to 3C, the transformation instruction vectors are shown by arrows. Further, the operative node is input by the operator. The operative node can be specified by selecting among a point, a line connecting two nodes, and a plane enclosed by three or more nodes. In the shown examples, the point indicated as a black dot (FIG. 3A), the line indicated as a bold line (FIG. 3B), and the plane enclosed by a bold line (FIG. 3C) are respectively specified as the operative node. At the transformation process at S12, these operational nodes are displaced in accordance with the transformation instruction vector, so that the shape of the transformation region is transformed as shown by the checked pattern.

With the above structure, the operative node is not specified only as a point, and can be specified by selecting among a point, a line, and a plane. It is therefore possible to perform more efficient design operation.

With the above structure, because the transformation process can be performed using the whole article design data, discontinuity is not caused at the boundary between the transformation region and the maintaining region. Further, because the operator can perform transformation design while confirming the structure of the whole article, efficient article design can be achieved.

Also, because the operator's input to the transformation instruction input device includes designation for the operative node of the transformation instruction vector, transformation which satisfies the operator's intention is possible by performing, as shape transformation, predetermined vector displacement only with respect to the predetermined node.

Further, because the designation for the operative node of the transformation instruction vector includes a point designation for a single node, line designation for a line connecting nodes, or plane designation for a plane enclosed by nodes, efficient design operation can be achieved.

Embodiment 2

In some cases, the shape of an article may be divided into a base shape which determines a rough shape of the whole article and an auxiliary shape associated therewith. The auxiliary shape may include, for example, a bead shape which is formed so as to enhance the strength of a panel. The auxiliary shape, which has a special function, must be maintained even when transformation is desired for the whole shape.

Figure 4:
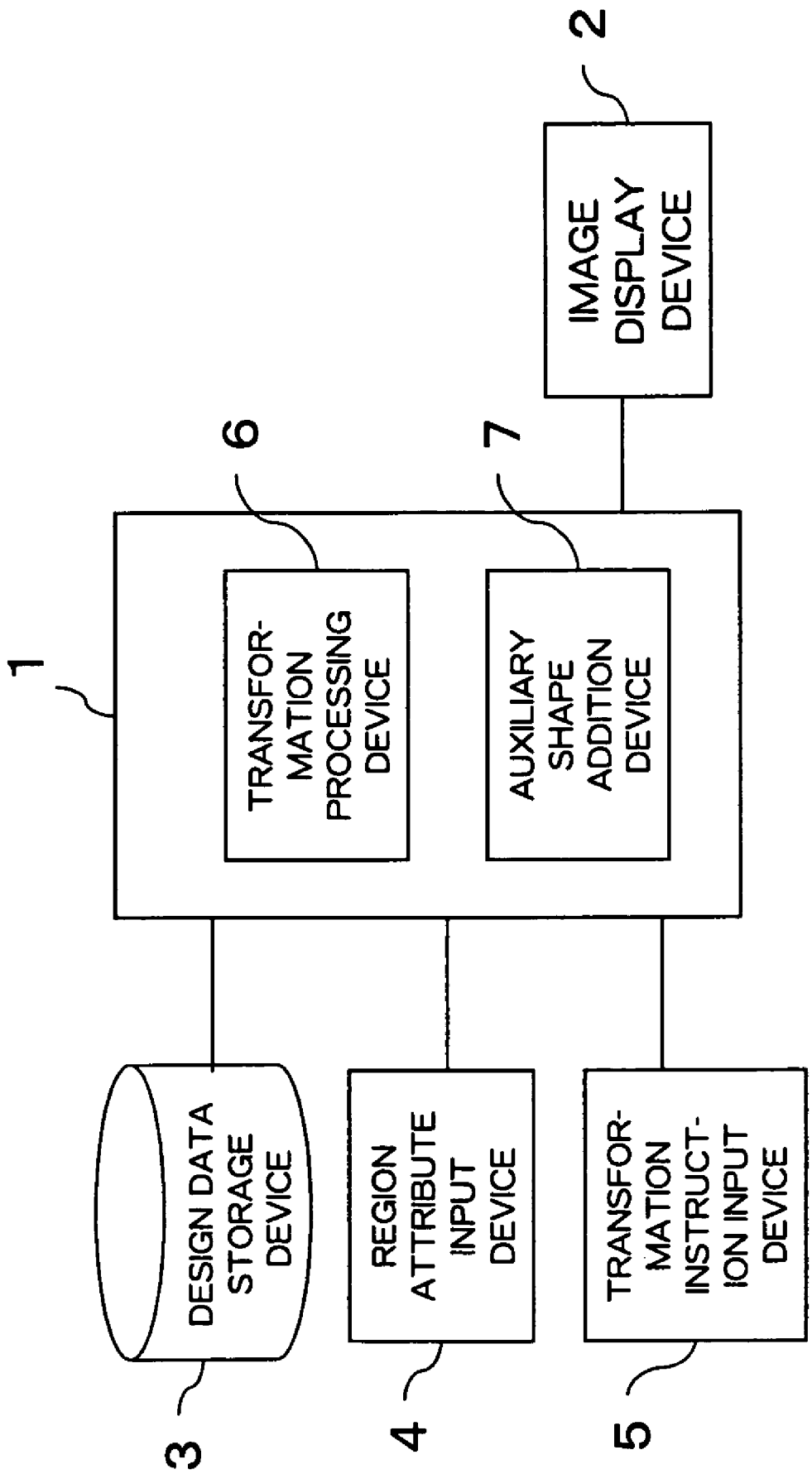
FIG. 4 is a functional block diagram of a design data generating apparatus according to a second embodiment of the present invention.

FIG. 4 is a functional block diagram showing a design data generating apparatus according to the second embodiment of the present invention, which solves this problem. In the apparatus of FIG. 4, an auxiliary shape adding device is further provided in addition to the design data generating apparatus of the first embodiment.

Figure 5:
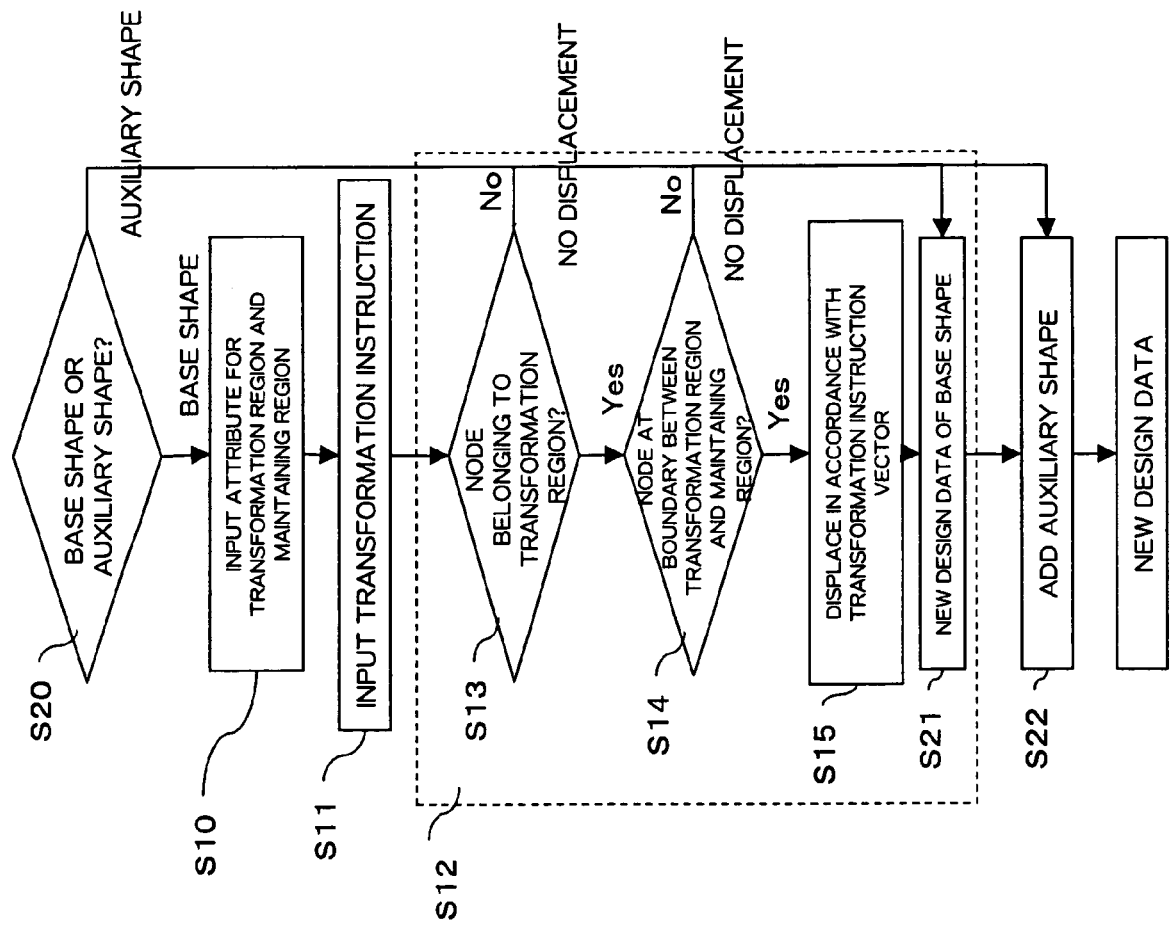
FIG. 5 is a flowchart showing a design data generating method according to the second embodiment of the present invention.

FIG. 5 is a flowchart showing data generation in the design data generating apparatus of the second embodiment.

After existing article design data stored in the design data storage device 3 is read out, it is determined by the transformation processing device 6 whether the read design data includes an attribute of a base shape or an attribute of an auxiliary shape (S20). If it is an auxiliary shape, the transformation process at step 12 is not performed. If it is a base shape, on the other hand, the transformation process S12 which is similar to that in the first embodiment is performed to obtain new design data of the base shape (S21). Then, the auxiliary shape adding device 7 adds the auxiliary shape to the new base shape (S22). The position in the new base shape where the auxiliary shape is added may be determined as follows. Specifically, when the auxiliary shape is partially located in the maintaining region of the original base shape, the auxiliary shape may be added to the original position. When the auxiliary shape is located in the transformation region of the original base shape, on the other hand, the position of the new base shape to which the auxiliary shape is added may be determined in accordance with the operator's input.

As described above, when an article shape consists of a base shape and an auxiliary shape, the transformation process by the shape transformation processing device is performed only with regard to the base shape, and the auxiliary shape is added by the auxiliary shape adding device to the design data which has been transformed, whereby efficient design can be achieved.

Embodiment 3

In the shape transformation process step in each of the first and second embodiment, in a case where the edge line connecting nodes will extend beyond a node belonging to the boundary between the maintaining region and the transformation region as a result of node displacement in accordance with the transformation instruction vector input by the operator, a region defined by nodes before transformation may be transformed into a shape element which cannot be defined by the original nodes after the nodes are merely displaced in accordance with the transformation instruction vector. This problem is solved by the shape transformation process of the third embodiment.

Figure 6:
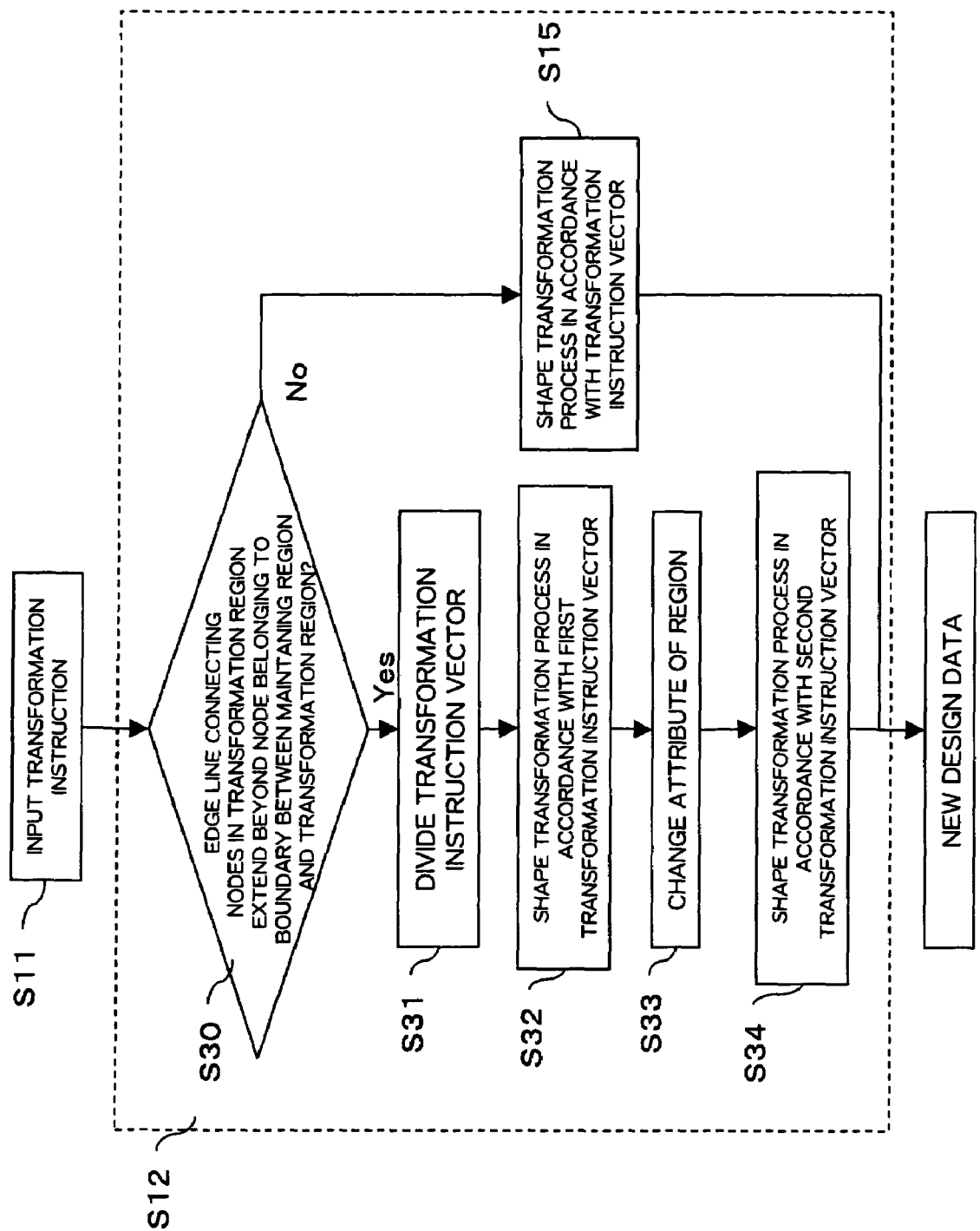
FIG. 6 is a flowchart showing a design data generating method according to a third embodiment of the present invention.

FIG. 6 is a flowchart showing the shape transformation process in the design data generating apparatus according to the third embodiment of the present invention. When transformation instructions are input (S11), it is determined by the transformation processing device 6 whether or not the edge line connecting the nodes in the transformation region is to extend beyond a node belonging to the boundary between the maintaining region and the transformation region as a result of node displacement in accordance with the input transformation instruction vector (S30). If NO, the shape transformation process in accordance with the transformation instruction vector, which is similar to the process in the first embodiment, is performed (S15). If YES, on the other hand, the input transformation instruction vector is divided into a first transformation instruction vector which terminates where the edge line connecting the nodes in the transformation region reaches a node in the maintaining region and a second transformation instruction vector which starts where the edge line connecting the nodes in the transformation region reaches the node in the maintaining region (S31). Then, the shape transformation process in accordance with the first transformation instruction vector is performed only with respect to the transformation region which is originally designated by the operator (S32). Subsequently., the attribute of the maintaining region containing the node which contacts the edge line of the transformation region is reallocated as the attribute of the transformation region (S33). Then, the shape transformation process in accordance with the second transformation instruction vector is performed with regard to the new transformation region, including the reallocated transformation region, of the article shape which has been subjected to the transformation process in accordance with the first transformation instruction vector (S34). As a result of the above transformation process, new design data is generated.

According to the above transformation process, even when the input transformation instruction vector extends beyond the node which belongs to the boundary between the maintaining region and the transformation region, it is possible to perform a transformation process which can realize actual shape transformation.

The node displacement by the design data generating method according to the third embodiment of the present invention will be described using an example. FIG. 7A shows an existing article shape which is composed of three shape elements, with two hatched regions being designated as transformation regions and the remaining white region being designated as a maintaining region. The transformation instruction vector is indicated by an arrow and the operative node is designated by a bold line. If the node transformation process according to the first embodiment is performed with the above input data, the region which is defined by the node before transformation would be divided as shown in FIG. 7B and cannot be defined by the original nodes.

FIGS. 8A to 8D explain node displacement by the design data generating method according to the third embodiment of the present invention. In FIG. 8A, the operative nodes A and B are shown as black circles and the white circles C and D indicate nodes which do not move. The transformation instruction vector which is initially input is divided into a first transformation instruction vector which terminates where the edge line connecting the nodes of the transformation region contacts the node belonging to the maintaining region and a second transformation instruction vector which starts where the edge line connecting the nodes of the transformation region contacts the node belonging to the maintaining region (S31). As shown in FIG. 8B, the nodes A and B are displaced in accordance with the first transformation instruction vector which terminates where the edge line defined by the nodes A and B contacts the node C belonging to the boundary between the maintaining region and the transformation region. Then, as shown in FIG. 8C, the attribute of the maintaining region containing the node C which contacts the edge line of the transformation region is reallocated as that of the transformation region (S33). Consequently, the attributes of the nodes C and D are changed to those for the nodes to be displaced, and therefore the nodes C and D are shown as block circles. Then, as shown in FIG. 8D, the nodes A, B, C and D are displaced in accordance with the second transformation instruction vector. With the above transformation processing method, it is possible to generate new design data while retaining the characteristic that nodes define a region.

According to the above transformation process, even when the input transformation instruction vector extends beyond the node belonging to the boundary between the maintaining region and the transformation region, the transformation process which can realize actual shape transformation can be performed.

Embodiment 4

A design data generating method according to the fourth embodiment of the present invention relates to shape transformation in which a bending line of an article is maintained and transformation in which a curved shape of an article is maintained.

Figure 9:
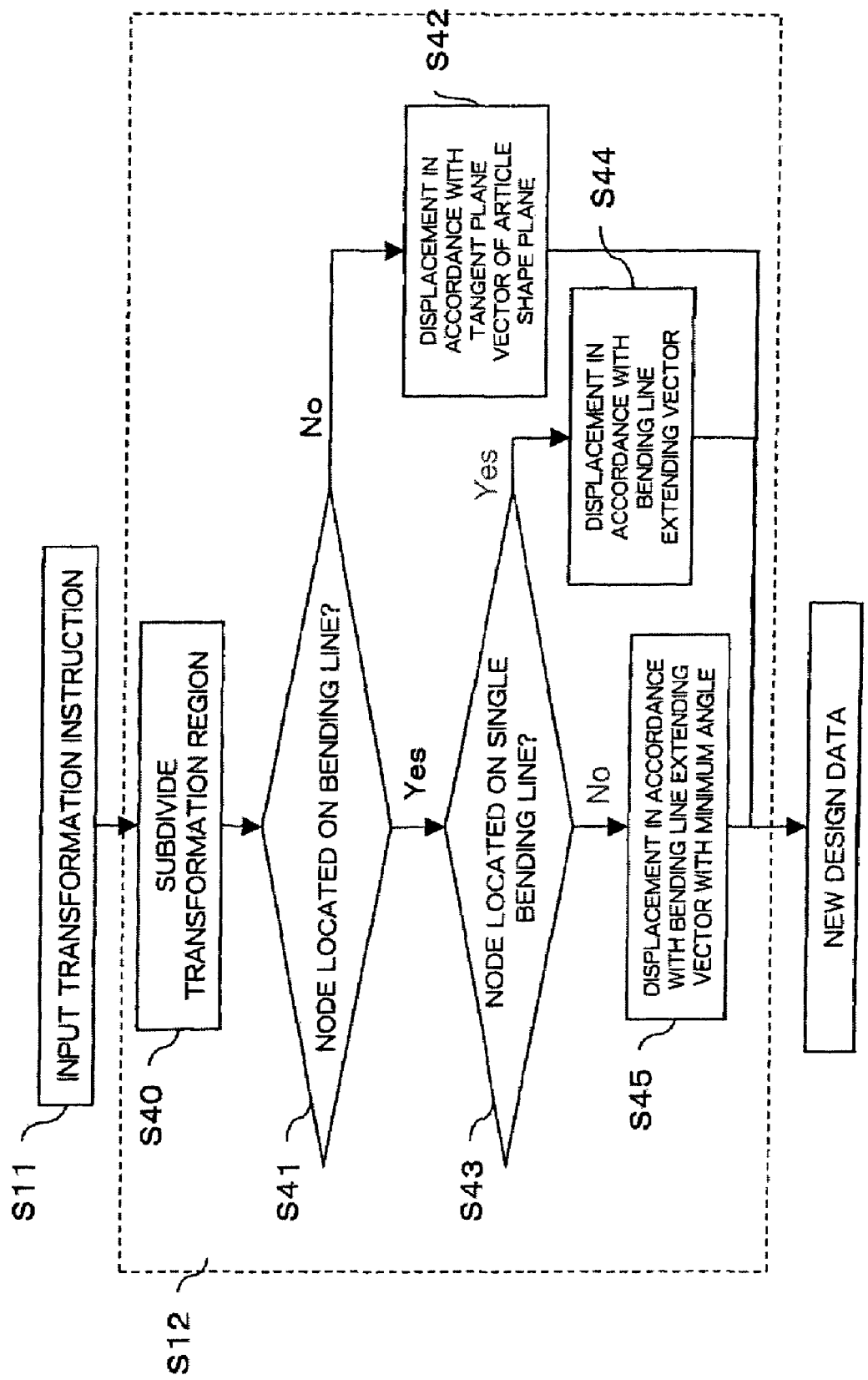
FIG. 9 is a flowchart showing a design data generating method according to a fourth embodiment of the present invention.

FIG. 9 is a flowchart showing a shape transformation process in a design data generating apparatus according to the fourth embodiment of the present invention.

The transformation processing device 6 subdivides the transformation region into shape elements (S40). The shape element subdivision is performed by dividing a region into triangle or square mesh pattern, as is well known in shape processing by a CAD device. Then, displacement of a node which defines the shape of a shape element is performed. The manner of displacement depends on the nature of the node. First, it is determined whether or not the node is located on the bending line of an article (S41). When the node is not located on the bending line, node displacement in accordance with a vector obtained by projecting the transformation instruction vector onto the extension plane of the article shape plane at that node is performed. Here, when the article shape plane at that node is obtained by cutting a sphere, for example, the extension plane of the article shape plane is obtained by extending a spherical surface having the same radius. When the article shape plane at the node is a plane obtained by cutting a column, the extension plane thereof is obtained by extending a column having the same radius, and when the article shape plane at that node is a plane defined by a predetermined function, the extension plane is obtained by extending such a plane. Then, it is further determined whether or not the node which is determined to be on the bending line is located on a single bending line or on a plurality of bending lines (S43). The node located on a single bending line is displaced in the extending direction of the bending line and by an amount corresponding to a component of the input transformation vector in the extending direction of the bending line (S44). When the node is located on the intersection of a plurality of bending lines of an article, the node is displaced in the extending direction of the bending line which forms the smallest angle with respect to the transformation vector and by an amount corresponding to a component of the input transformation vector in the extending direction of the bending line (S45). Due to the node displacement described above, new design data can be generated.

With the transformation process by the data generating method according to the fourth embodiment of the present invention, a shape element defined by nodes can be transformed while retaining a curved surface of the original article shape. In addition, transformation which maintains the bending line structure of an article can be performed.

The node displacement by the design data generating method according to the fourth embodiment of the present invention will be described using an example. FIG. 10A shows an existing article shape having two bending lines. A transformation instruction vector is input as indicated by an arrow, and the operative node is shown by a bold line. The transformation processing device 6 first subdivides the transformation region into shape elements (S40). In this example, the transformation region has been divided by line segments indicated by dotted lines as shown in FIG. 10B. The nodes are then classified into nodes located on the bending line of an article, as indicated by black circles, and nodes not located on the bending line of the article, as indicated by white circles (S41). The nodes indicated by white circles not located on the bending line are to be displaced in accordance with a vector obtained by projecting the transformation instruction vector onto the extension plane at the node (S42). Here, the A-A section, for example, is an extension plane of a curved surface shape as shown in FIG. 10B, and the node is displaced in the direction shown by a dotted line in the cross sectional view. On the other hand, each node located on the bending line of an article is to be displaced in the extending direction of the bending line and by an amount corresponding to a component of the input transformation vector in the extending direction of the bending line (S44). Due to the node displacement described above, new design data as shown in FIG. 10C can be generated.

Figure 11:
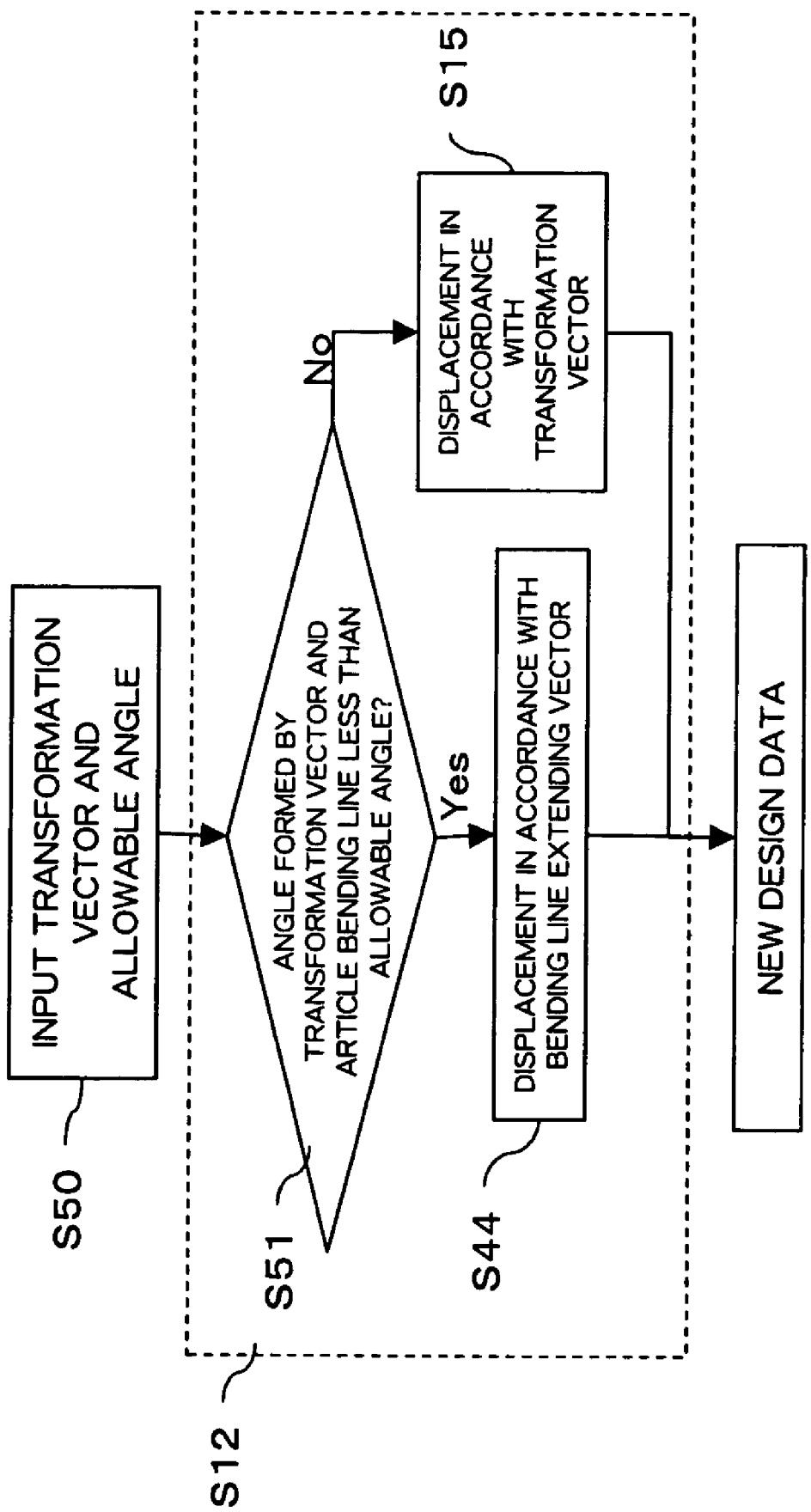
FIG. 11 is a flowchart showing a preferred transformation process of the design data generating method according to the fourth embodiment of the present invention.

In the above steps S44 and S45, the node located on the bending line is displaced in the extending direction of the bending line. However, the direction of displacement is preferably changed depending on the angle which is formed by the bending line and the transformation instruction vector. The flow of such a shape transformation process is shown in FIG. 11.

The transformation instruction input device 5 receives, in addition to a transformation instruction vector, input of an allowable angle between the transformation instruction vector and the article bending line (S50). The transformation processing device 6 then determines, for each node, whether or not the angle formed by the transformation vector and the bending line is less than the allowable angle (S51). A node for which the angle formed by the transformation instruction vector and the bending line is less than the allowable angle is displaced in the extending direction of the bending line (S44). A node for which an angle formed by the transformation instruction vector and the bending line is equal to or greater than the allowable angle is displaced in accordance with the transformation vector (S15). Due to the node displacement described above, new design data can be generated.

With the above transformation process by the design data generating method, it is possible to perform transformation process which further satisfies the operator's intention.

Embodiment 5

Figure 12:
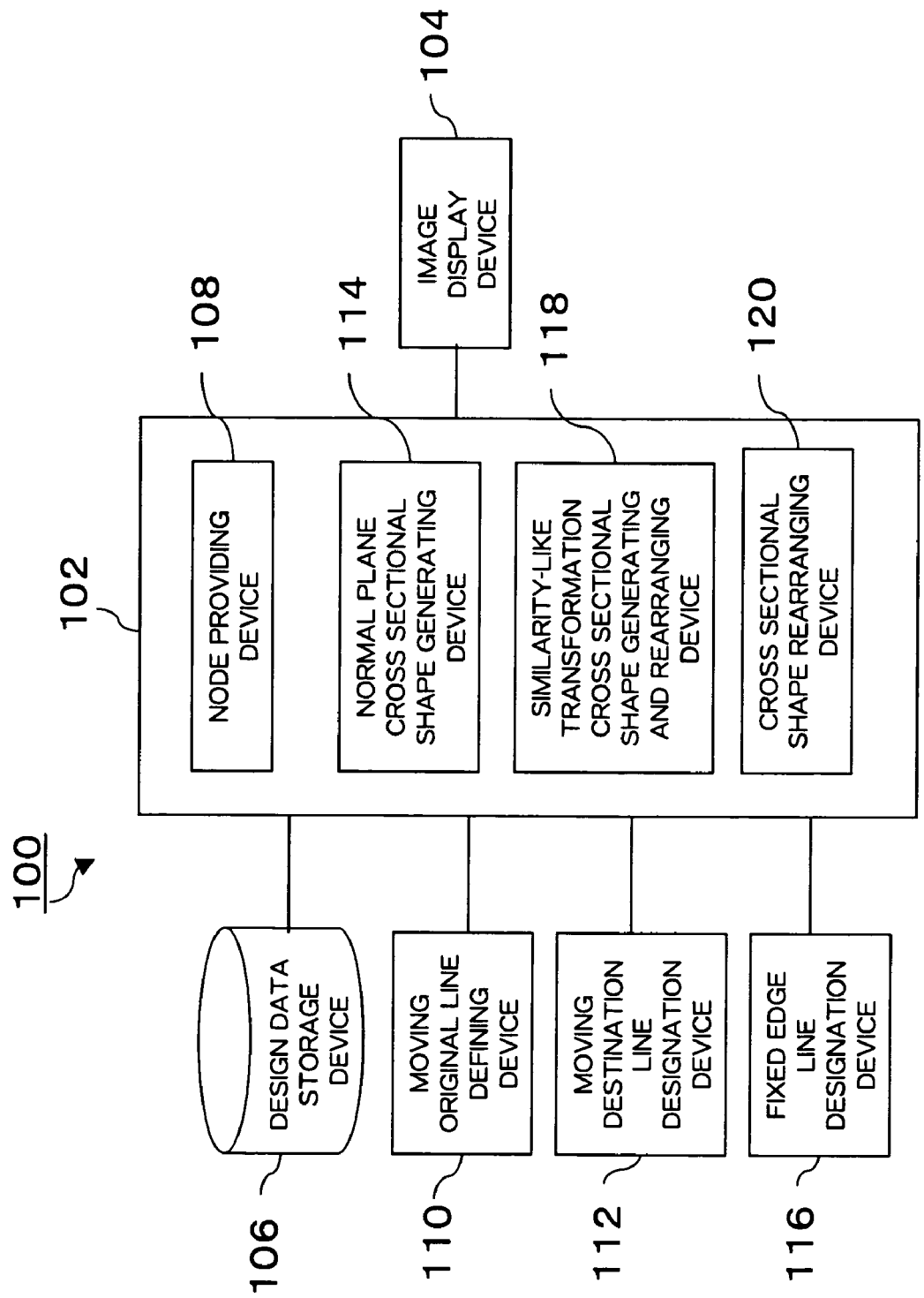
FIG. 12 is a block structural diagram showing the function of a design data generating apparatus according to a fifth embodiment of the present invention.

FIG. 12 is a structural block diagram showing the function of a design data generating apparatus according to the fifth embodiment of the present invention. The design data generating apparatus 100 is an apparatus for generating new design data of an article by applying a shape transformation process to design data of the article which has been already generated. The design data generating apparatus 100 comprises a calculator 102, an image display device 104, and an input device such as keyboard and a mouse. Existing article design data is read out from a design data storage device 106 which is configured by a hard disk or the like. The operator operates a node providing device 108 for providing a node to an existing article shape, a moving original line defining device 110 for defining one edge line of the existing article shape as a moving original line, a moving destination line designation device for designating a moving destination line which is a destination of the moving original line, a normal plane cross sectional shape generating device 114 for generating a cross sectional shape of the existing article formed by a normal plane at each node on the moving original line, while visually confirming the shape being transformed on the image display device 104 such as a CRT, thereby designing a new article shape.

The fifth embodiment is characterized by having a fixed edge line designation device 116 for designating a fixed edge line from an existing article shape, a similarity-like transformation cross sectional shape generating and rearranging device 118 for moving a node belonging to the moving original line to a corresponding point on the moving destination line, with regard to a normal plane cross sectional shape which crosses the fixed edge line, to perform similarity-like transformation and rearrangement, and a cross sectional shape rearranging device 120 for rearranging a normal plane cross sectional shape which does not cross the fixed edge line to a corresponding point on the moving destination line. With the above structure, it is possible to efficiently design a new article shape with transformation of a cross sectional shape, from an existing article shape. Preferably, the design data generating apparatus 100 may comprise a printing device and a communication device for communicating with a network.

Here, "similarity-like transformation" as used herein will be described. "Similarity transformation" refers to transformation by which an original figure is changed into a shape which can completely match the original figure when it is evenly magnified or reduced. On the other hand, "similarity-like transformation" refers to transformation with a broader concept than that of transformation into a shape having a similarity relationship, and transforms an original shape into a shape which at least partially maintains the features of the original shape.

Figure 13:
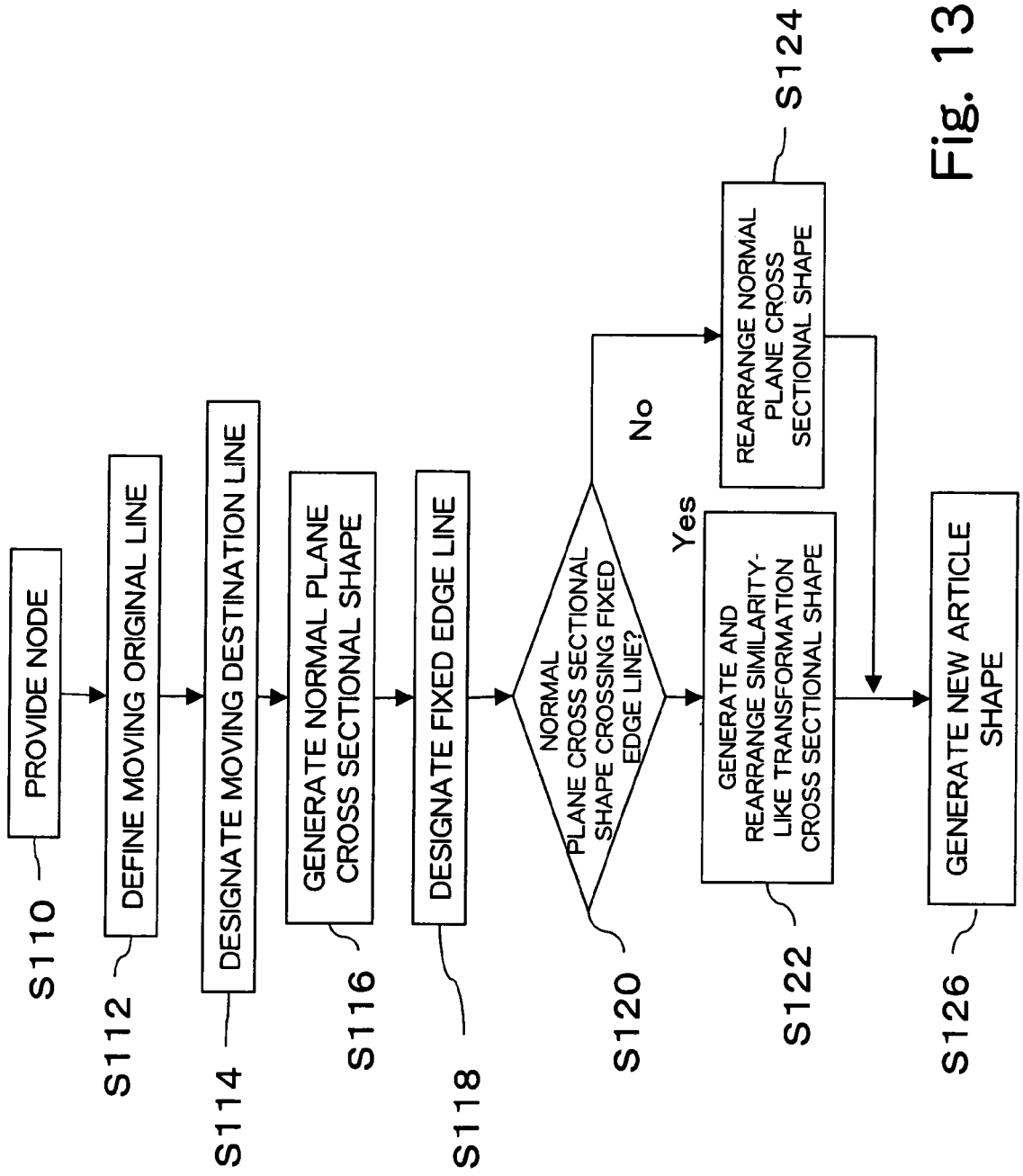
FIG. 13 is a flowchart showing design data generation according to the fifth embodiment of the present invention.

FIG. 13 is a flowchart showing data generation by a design data generating apparatus of the present invention.

First, existing article design data stored in a design data storage device 106 is read out. Nodes are provided on the existing article shape at predetermined intervals by the node providing device 108 (S110). The moving original line defining device 110 defines one of the edge lines of the existing article shape as a moving original line (S112). Then, a moving destination line which is a destination of the moving original line is designated by the moving destination line designation device 112 (S114). A cross sectional shape of the existing article formed by a normal plane at each node on the moving original line is generated by the normal plane cross sectional shape generating device 144 (S116).

Then, from the existing article shape, a fixed edge line is designated by the fixed edge line designation device 116, which is a feature of the present embodiment (S118). Further, the similarity-like transformation cross sectional shape generating and rearranging device 118 determines whether or not each normal plane sectional shape crosses the fixed edge line (S120), and performs similarity-like transformation with regard to the normal plane cross sectional shape which crosses the fixed edge line by moving the node belonging to the moving original line to a corresponding point on the moving destination line for rearrangement (S122). On the other hand, the cross sectional shape rearranging device 120 rearranges a normal plane cross sectional shape which does not cross the fixed edge line to the corresponding point on the moving destination line (S124). A new article shape defined by a series of the similarity-like transformation cross sectional shapes and the normal plane cross sectional shapes which are thus rearranged is then generated (S126). The order of the defining step and the designation step prior to the similarity-like transformation and rearrangement process is not necessarily limited to the above example.

With the above structure, it is possible to efficiently design a new article shape using similarity-like transformation of a normal plane sectional shape of an existing article shape.

Further, when there is an region in an existing article shape which does not cross a normal plane of the moving original line, it is preferable to extend the defined moving original line such that normal plane cross sectional shapes are generated for all the regions of the existing shape in the above normal plane cross sectional shape generating step S116.

Figures 14A, 14B:
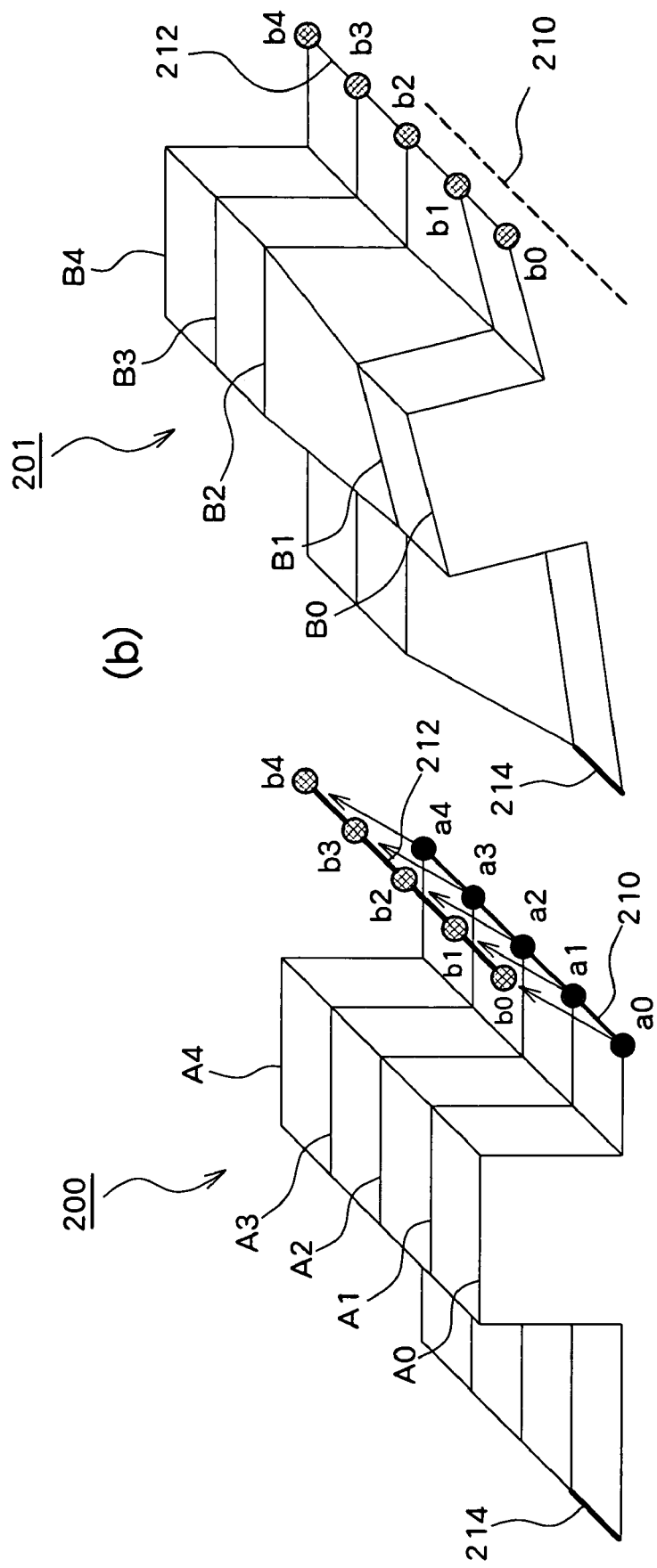
FIG. 14A is a diagram for explaining a specific transformation process of an existing shape in the design data generating apparatus according to the fifth embodiment of the present invention.
FIG. 14B is a diagram for explaining a specific transformation process of an existing shape in the design data generating apparatus according to the fifth embodiment of the present invention.

The specific transformation process in the design data generating apparatus 100 according to the present embodiment will be described using example figures. FIG. 14A shows an existing article shape 200. This shape may be obtained by reading data already stored in the design data storage device 106 or may be received through a network or the like using a communication device provided in the calculator 102. First, nodes are provided on the existing article shape 200 using the node providing device 108.

Then, one of the edge lines of the article shape 200 is defined as a moving original line 210 using the moving original line defining device 110 configured by an input device such as a keyboard, mouse, or the like. In the drawing, among the above-described nodes which are provided, only the nodes located on the moving original line are shown as a0, a1, a2, a3, and a4, respectively.

Further, a moving destination line 212, which is a destination of the moving original line 210, is designated by the moving destination line designation device 112 constituted by an input device such as a keyboard, a mouse, or the like.

Then, a cross sectional shape of the existing article shape 200 formed by a normal plane at each node a0, a1, a2, a3, or a4 on the moving original line 210 is generated by the normal plane cross sectional shape generating device 114. The normal plane cross sectional shapes thus generated are denoted by A0, A1, A2, A3, and A4, respectively, corresponding to the respective nodes.

Then, among the edge lines of the shape 200, an edge line other than the moving original line 210 which the operator wishes to remain fixed in a new shape after transformation is designated as a fixed edge line 214 by the fixed edge line designation device 116 which is constituted by an input device such as a keyboard, a mouse, or the like.

Based on the above definition and designation, a similarity-like transformation process and a rearrangement process are performed with regard to the normal plane cross sectional shapes A0, A1, A2, A3, and A4 by the similarity-like transformation cross sectional shape generating and rearranging device 118. The resultant new article shape 201 is shown in FIG. 14B.

More specifically, for the normal plane cross sectional shape A0 (A1) which crosses the fixed edge line 214, similarity-like transformation is performed by moving the node a0 (a1) belonging to the moving original line to the corresponding point b0 (b1) on the moving destination line while a point belonging to the fixed edge line 214 remains fixed.

On the other hand, the normal plane cross sectional shape A2 (A3, A4) which does not cross the fixed edge line 214 is displaced and rearranged in accordance with the movement of the node a2 (a3, a4) on the moving original line 210 to the corresponding point b2 (b3, b4) on the moving destination line 212.

Thus, a series of the shapes B0, B1, B2, B3 and B4 which are the results of the above-described similarity-like transformation and rearrangement processes defines a new article shape.

In the above specific example, the shape 200 is formed only by straight lines. A similarity-like transformation in a case where an exiting article shape includes a curved surface will now be described.

When an existing article shape includes a curved surface, namely when a normal plane cross sectional shape has a curved line, the normal plane cross sectional shape generating device 114 provides shape nodes at predetermined intervals on each normal shape cross sectional shape which is generated. Similarity-like transformation for each shape node is then realized by moving a shape node in accordance with a shape node moving vector which is obtained by multiplying a moving vector from a node belonging to the moving original line to the corresponding point on the moving destination line by a ratio of a distance from the fixed edge line to the shape node of interest divided by a distance from the node on the moving original line to the corresponding point on the fixed edge line.

Figure 15A:
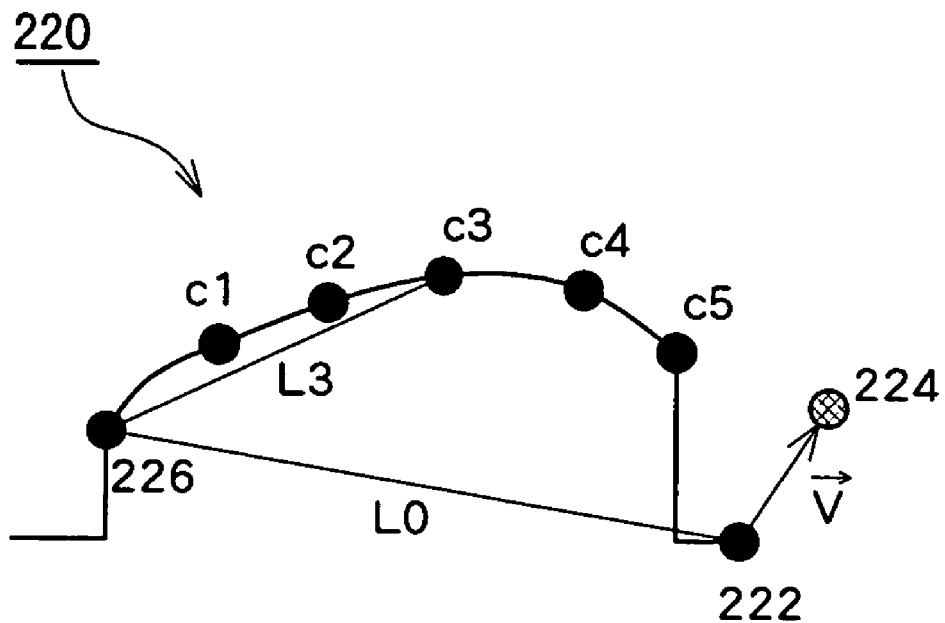
FIG. 15A is a view for explaining movement of a shape node of a normal plane cross sectional shape in the design data generating apparatus according to the fifth embodiment of the present invention.
Figure 15B:
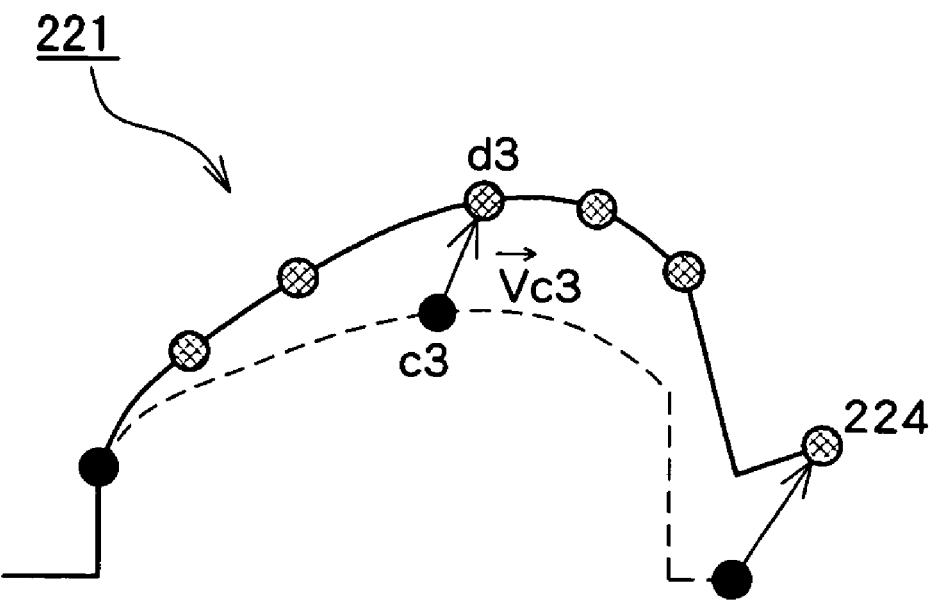
FIG. 15B is a view for explaining movement of a shape node of a normal plane cross sectional shape in the design data generating apparatus according to the fifth embodiment of the present invention.

The foregoing similarity-like transformation will be described in detail using an example normal plane cross sectional shape as shown in FIG. 15A. In a normal plane cross sectional shape 220, a node belonging to the moving original line is denoted by 222, a corresponding point on the moving destination sources is denoted by 224, a point belonging to the fixed edge line is denoted by 226, and a distance between the point 226 belonging to the fixed edge line and the node 222 belonging to the moving original line is denoted by L0.

First, shape nodes c1, c2, c3, c4, and c5 are provided at predetermined intervals on the normal plane cross sectional shape 220 by the normal plane cross sectional shape generating device 114.

In this example, for simplification of explanation, attention will be paid only to the shape node c3. The distance between the point 226 which belongs to the fixed edge line to c3 corresponds to L3. In the similarity-like transformation processing step S122, the shape node c3 is moved to a point d3 in accordance with a shape node moving vector vc3 (=moving vector v×L3/L0) obtained by multiplying the moving vector v from the node 222 belonging to the moving original line to the corresponding point 224 on the moving destination line by L3/L0.

By moving each shape node in a similar manner, similarity-like transformation of an article shape having a curved surface can be performed.

With the above structure, even when an existing article shape includes a curved surface, it is possible to efficiently design a new article shape using similarity-like transformation of the curved surface.

In the fifth embodiment, the following four types of correspondence are possible when determining to which point on the moving destination line the normal plane cross sectional shape at each node on the moving original line corresponds for realizing similarity-like transformation and rearrangement.

1. Equal internal division ratio correspondence for causing a node on the moving original line to correspond to a point on the moving destination line such that the internal ratio by which the node internally divides the line segment of the moving original line equals the internal ratio provided by the point on the moving destination line.

2. Moving destination line perpendicular line correspondence for causing a node on the moving original line to correspond to a point on the moving destination line such that the perpendicular line extending from the point crosses the node.

3. Moving original line perpendicular line correspondence for causing a node on the moving original line to correspond to an intersecting point on the moving destination line where the moving destination line crosses the perpendicular line extending from the node.

4. Designated plane parallel correspondence for causing a node on the moving original line to correspond to an intersecting point between a plane which is parallel to a designated plane designated by an operator and which contains the node and the moving destination line.

Figure 16:
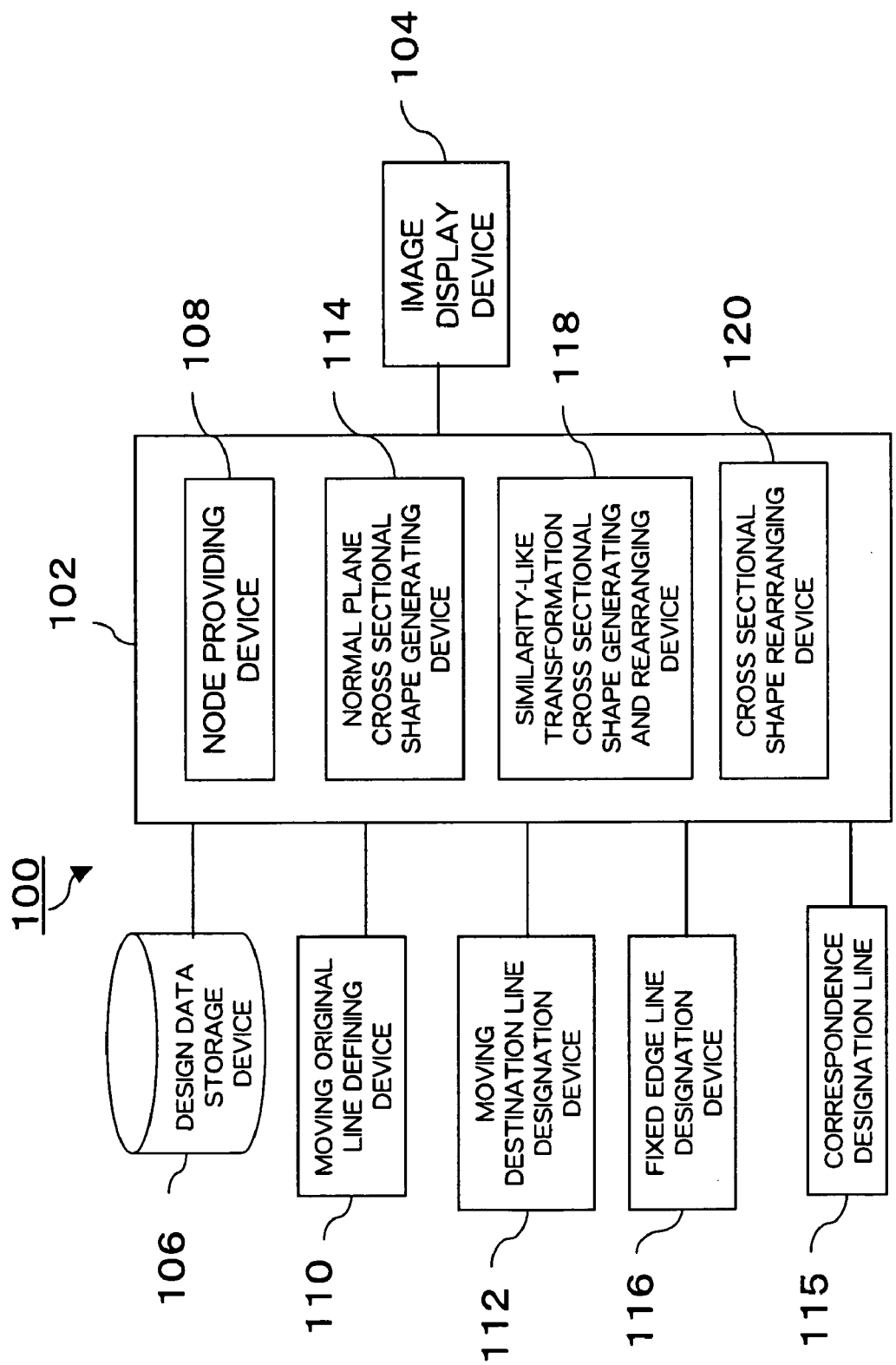
FIG. 16 is a functional block structural diagram showing a design data generating apparatus including a correspondence designation device.

Preferably, the design data generating apparatus 100 according to the fifth embodiment includes a correspondence designation device 115 for receiving the operator's instructions concerning which one of the above four types of correspondence the operator wishes to select in the similarity-like transformation and rearrangement processes. FIG. 16 shows a functional block diagram of a design data generating apparatus comprising the correspondence designation device 115. The correspondence designation device 115 may select correspondence among all the above-described four types or may select correspondence only from those suitable for a specific design method.

Figure 17:
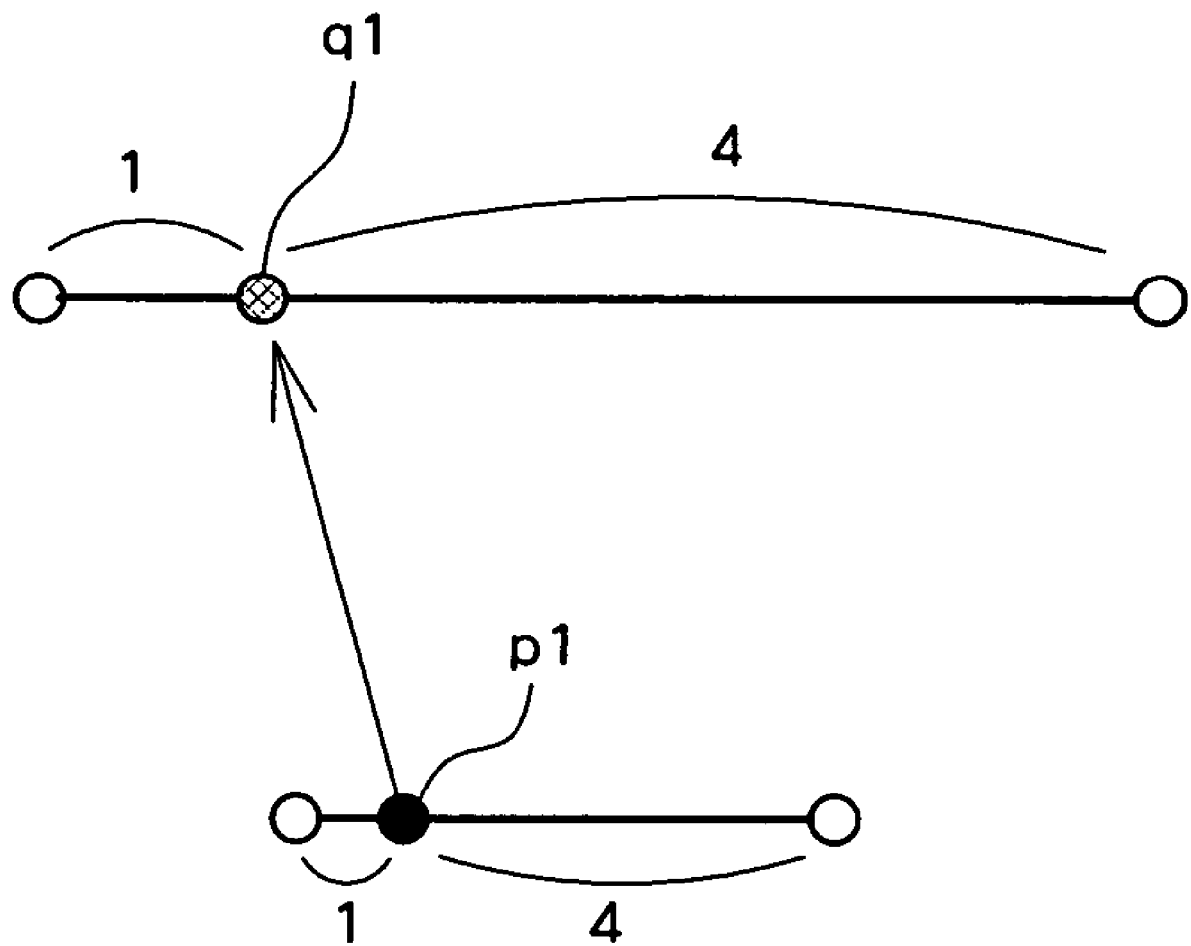
FIG. 17 is a view for explaining equal internal division ratio correspondence of the correspondence designation in FIG. 16.

The equal internal division ration correspondence (1) will be first described using a drawing. FIG. 17 shows a moving original line and a moving destination line. The node p1 on the moving original line internally divides a line segment of the moving original line at a ratio of 1:4. This node p1 or the normal plane cross sectional shape of the node p1 moves to a point q1 which internally divides a line segment of the moving destination line at a ratio of 1:4 so as to achieve similarity-like transformation or rearrangement.

Figure 18:
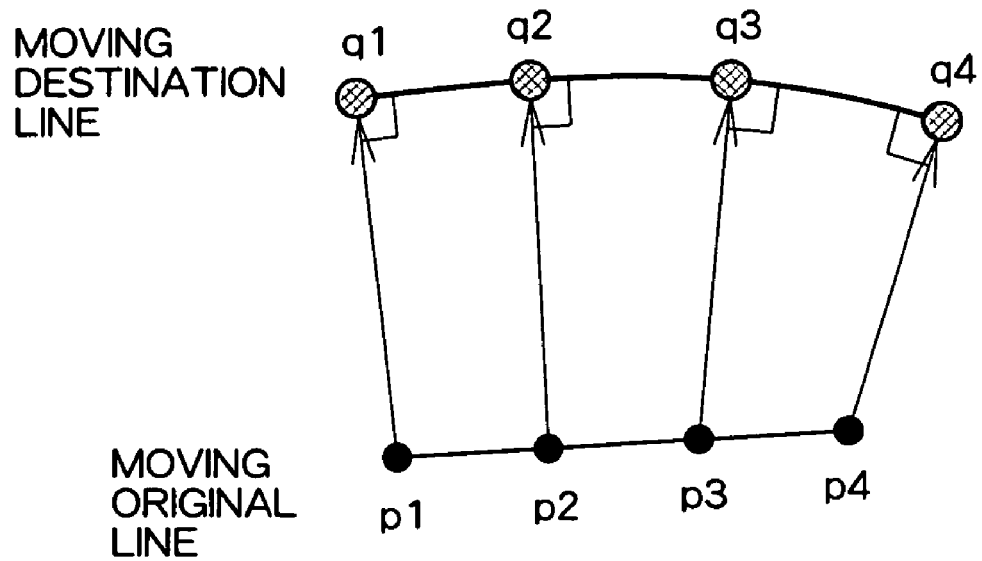
FIG. 18 is a view for explaining moving destination line perpendicular line correspondence of the correspondence designation in FIG. 16.

The moving destination line perpendicular line correspondence (2) will be described using a drawing. FIG. 18 shows a moving original line and a moving destination line. A node on the moving original line corresponds to a point on the moving destination line from which a perpendicular line extends and intersects the node. Accordingly, the nodes p1, p2, p3, and p4 correspond respectively to the points q1, q2, q3, and q4 on the moving destination line.

Figure 19:
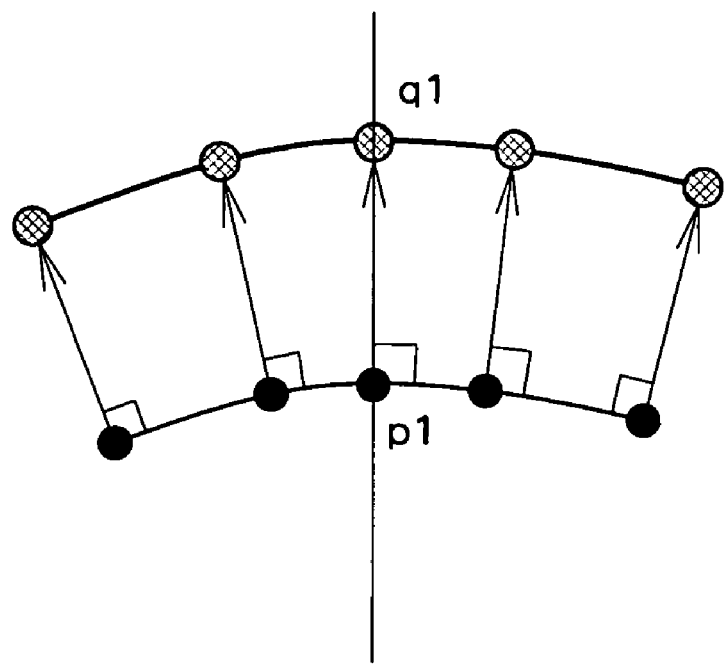
FIG. 19 is a view for explaining moving original line perpendicular line correspondence of the correspondence designation in FIG. 16.

The moving original line perpendicular line correspondence (3) will be described using a drawing. FIG. 19 shows a moving original line and a moving destination line. The node p1 on the moving original line corresponds to the point p1 on the moving destination line at which point the perpendicular line from the node p1 crosses the moving destination line.

Figure 20:
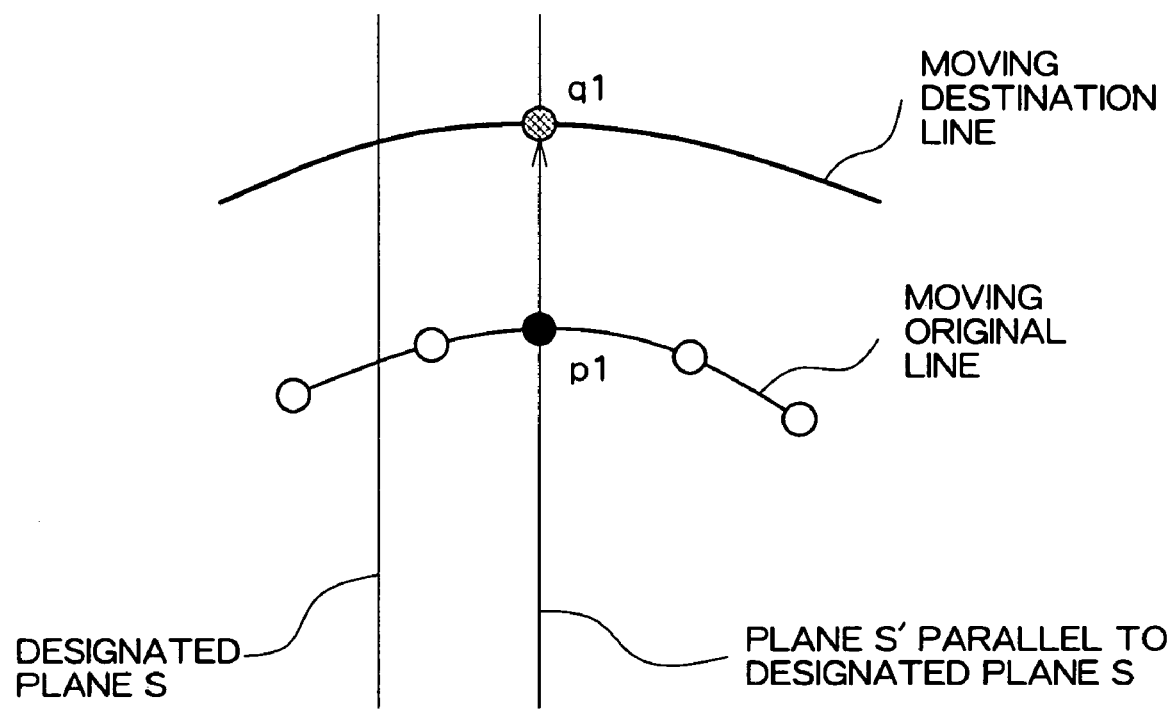
FIG. 20 is a view for explaining designated plane parallel correspondence of the correspondence designation in FIG. 16.

The designated plane parallel correspondence (4) will be described using a drawing. FIG. 20 shows a moving original line, a moving destination line, and a designated plane S which is designated by an operator. The node p1 on the moving original line corresponds to the point q1 where the plane S' which includes the node p1 and which is parallel to the designated plane S crosses the moving destination line.

There are cases, however, where none of the above corresponding types 1 to 4 can be applied. In such a case, there are the following two additional corresponding methods for determining to which point on the moving destination line a normal plane cross sectional shape at each node on the moving original line to which none of the above four methods is applicable corresponds so as to achieve similarity-like transformation and rearrangement.

A. Moving destination line extension correspondence for extending the moving destination line to create a corresponding point.

B. Nearest point correspondence for causing a node to correspond to the nearest point on the moving destination line.

Figure 21:
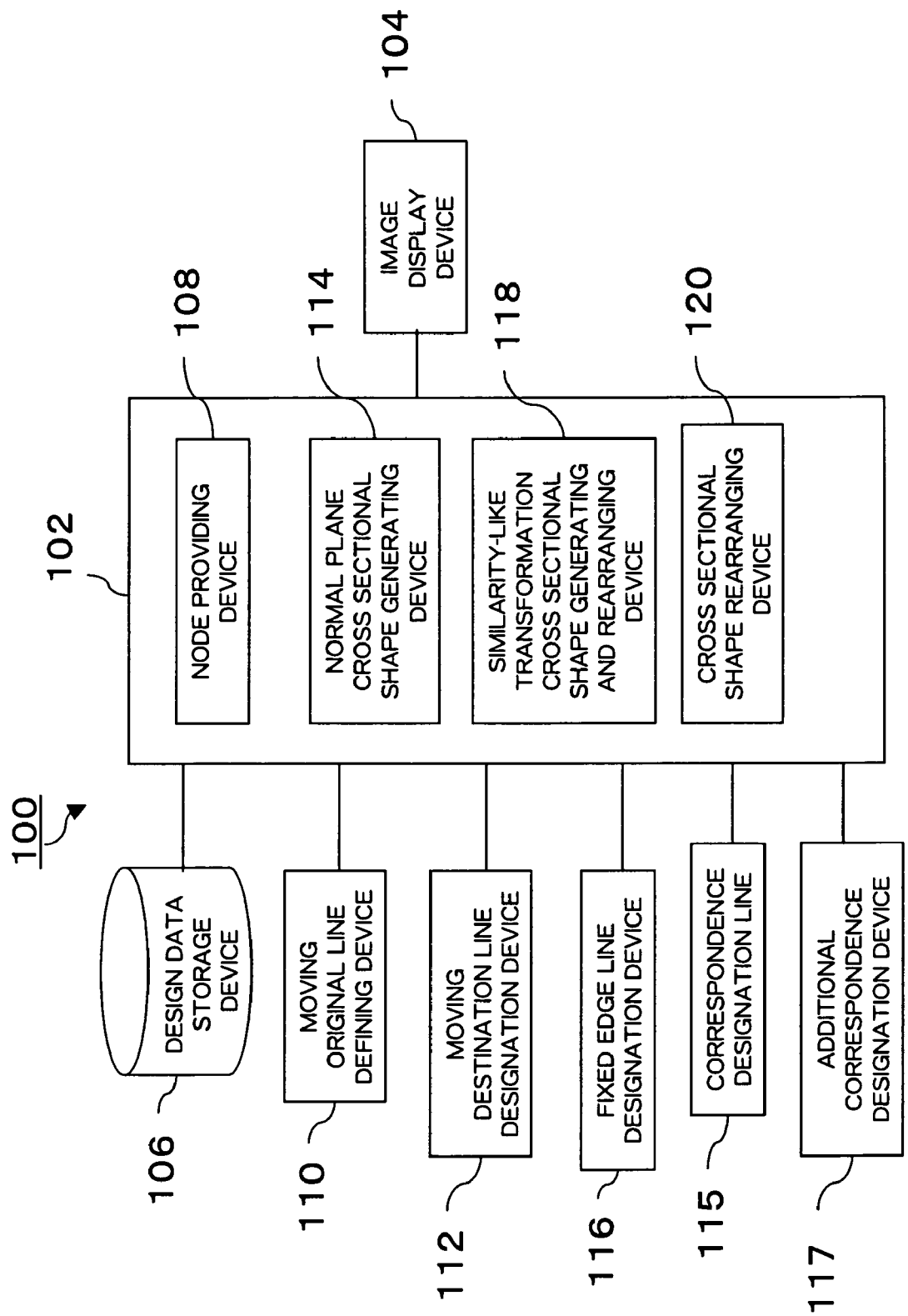
FIG. 21 is a view showing a functional block structure of a design data generating apparatus comprising an additional correspondence designation device.

Preferably, the design data generating apparatus 100 according to the fifth embodiment includes an additional correspondence designation device 117 for receiving the operator's instructions concerning which one of the above two types of additional correspondence the operator wishes to select in the similarity-like transformation and rearrangement processes. FIG. 21 shows a functional block diagram of a design data generating apparatus comprising the additional correspondence designation device 117. The additional correspondence designation device 117 may select one additional correspondence from the above-described two types or may allow selection regarding only either one of the two additional correspondences.

Figure 22:
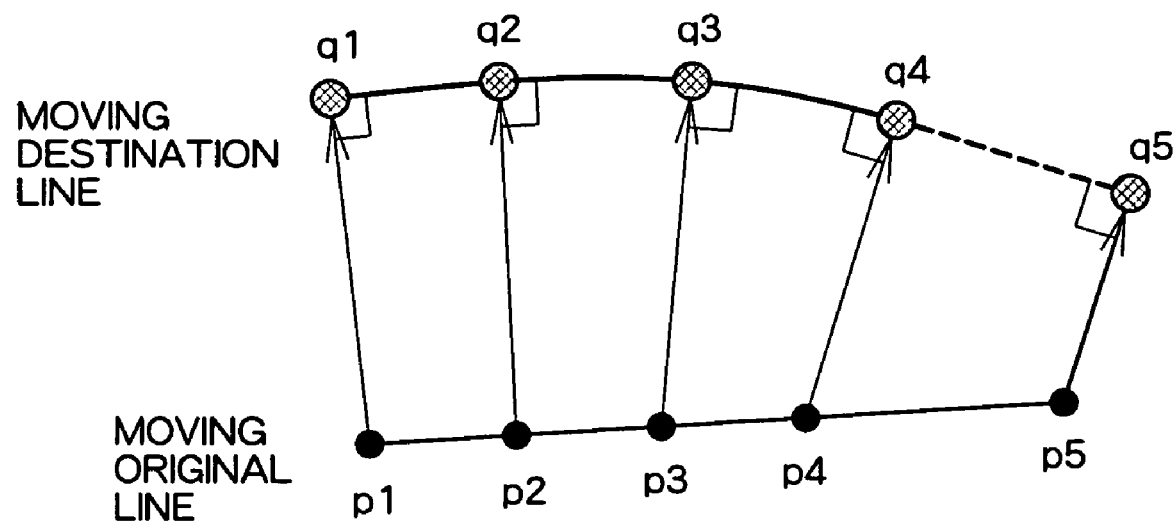
FIG. 22 is a view for explaining moving destination line extension correspondence of the additional correspondence designation in FIG. 21.

The moving destination line extension correspondence (A) will be described using a drawing. FIG. 22 shows a moving original line and a moving destination line. As a principle, correspondence is performed using the moving destination line perpendicular line correspondence (2) described above. Therefore, according to the moving destination line perpendicular line correspondence (2), the nodes p1, p2, p3, and p4 correspond respectively to the points q1, q2, q3, and q4 on the moving destination line. With regard to the node p5, however, because there exists no point on the moving destination line from which the perpendicular line extends and crosses the node 5, the node 5 does not correspond to any point according to the principle of correspondence. In such a case, as shown by dotted line in FIG. 22, the moving destination line is extended and the node p5 is caused to correspond to the point q5 from which the perpendicular line extends and crosses the node p5.

Figure 23:
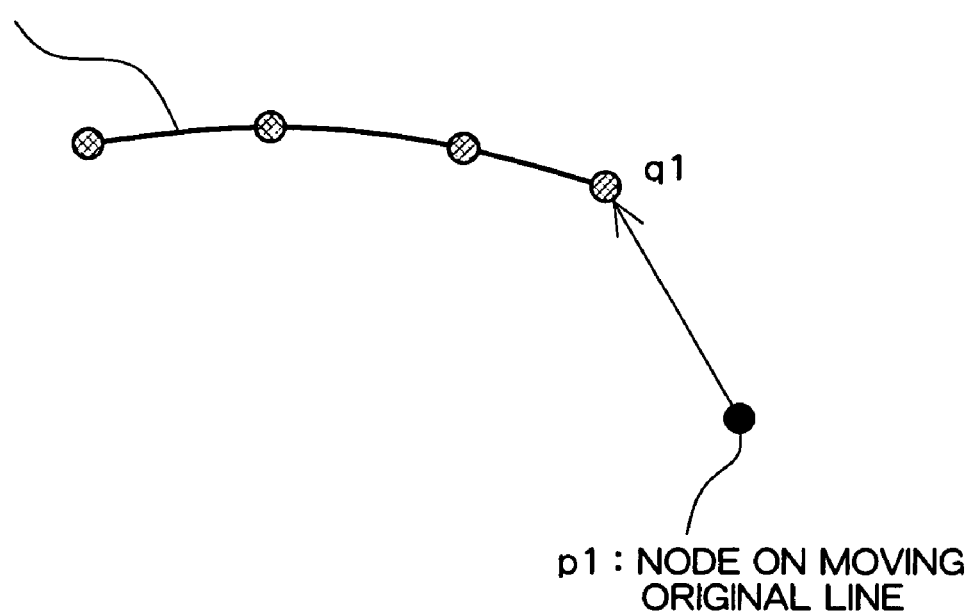
FIG. 23 is a view for nearest point correspondence of the additional correspondence designation in FIG. 21.

The nearest point correspondence (B) will be described using a drawing. FIG. 23 shows a node p1 on a moving original line and a moving destination line. As a principle, correspondence is performed using the moving destination line perpendicular line correspondence (2) described above. With regard to the node p1, however, because there exists no point on the moving destination line from which the perpendicular line extends and crosses the node p1, the node p1 does not correspond to any point according to the principle of correspondence. In such a case, as shown in FIG. 23, the node p1 is caused to correspond to the nearest point q1 on the moving destination line.

By designating the above additional correspondence, it is possible to efficiently use all the cross sectional shapes of an existing article when designing a new shape.

In addition, the design data generating apparatus 100 according to the fifth embodiment preferably includes a movement ratio destination device 111 for entering a ratio of movement for a similarity-like transformation process and a rearrangement process so as to interrupt or terminate the route for the transformation and for the rearrangement in the similarity-like transformation (S122) and in the rearrangement of the normal plane cross sectional shape (S124) due to movement of a node belonging to the moving original line toward the moving destination line, which is previously designated by the operator.

Figure 24:
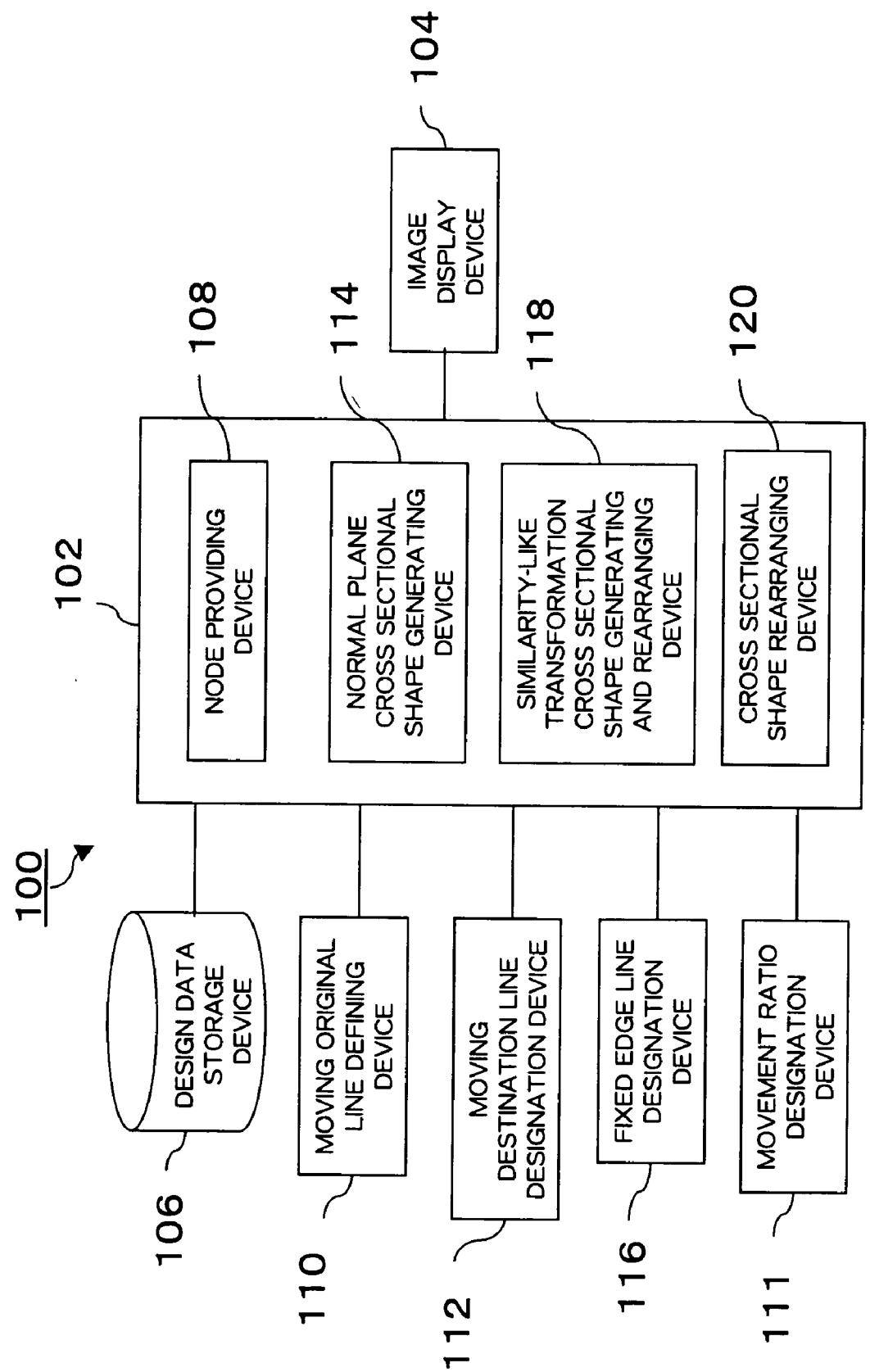
FIG. 24 is a view showing a functional block structure of a design data generating apparatus comprising a movement ratio designation device.

FIG. 24 shows a functional structural block diagram of a design data generating apparatus 100 comprising the movement ratio designation device 111. The movement ratio designation device 111 is preferably constituted by a pointing device such as a keyboard, mouse, or the like.

With the design data generating device 100 comprising the movement ratio designation device 111, an operator can confirm the process of transformation on the image display device 104, and when, during the movement for transformation and rearrangement to the moving destination line which is previously designated, a desirable shape which satisfies the operator can be obtained, the operator can interrupt or terminate the transformation at that point in time. It is also preferable to change the speed of transformation displayed on the image display device 104 in accordance with the speed of moving the pointing device.

With the above structure, the operator can confirm the similarity-like transformation shape on the display screen and interrupt or extend the transformation process at any desired stage, and efficient design for a new three-dimensional shape can therefore be achieved.

In addition, the design data generating apparatus 100 of the fifth embodiment preferably comprises a movement extension permission instructing device 113 for previously instructing whether or not movement to a point on an extension line of a straight line connecting a node and a corresponding point on the moving destination line is permitted in the above designation of the movement ratio for performing the similarity-like transformation (S122) and the rearrangement of a normal plane cross sectional shape (S124) due to the movement of a node belonging to the moving original line.

Figure 25:
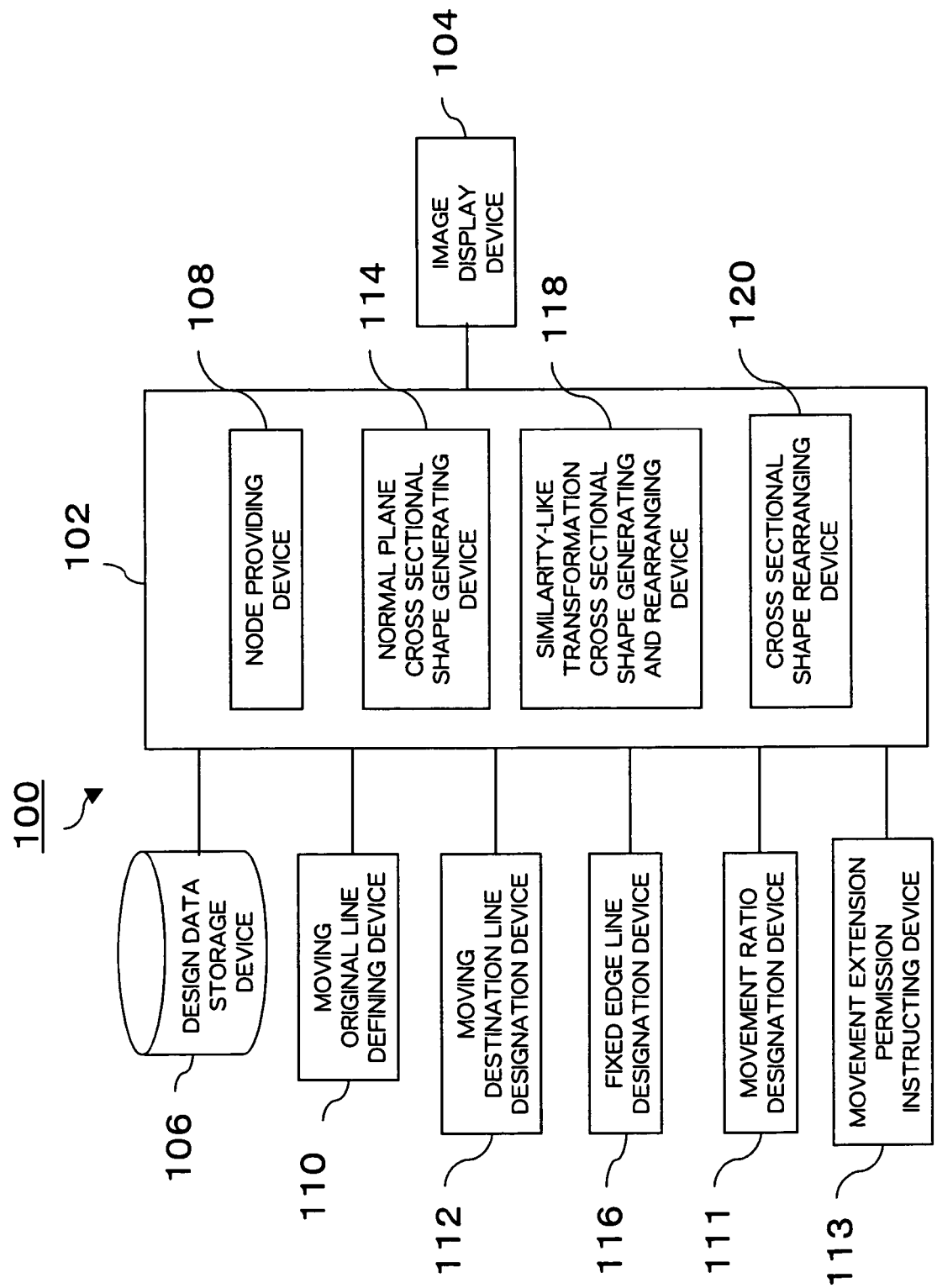
FIG. 25 is a view showing a functional block structure of a design data generating apparatus comprising a movement extension permission instructing device.

FIG. 25 shows a functional block structural diagram of the design data generating apparatus 100 comprising the movement extension permission instructing device 113.

When the permission for movement extension is received in the movement extension permission instructing device 113, it is possible to move a node on the moving original line or a normal plane cross sectional shape to a point on a line which is obtained by extending the straight line connecting the node and the corresponding point on the moving destination line.

With the design data generating apparatus 100 comprising the movement extension permission instructing device 113, an operator can confirm the process of transformation on the image display device 104, and when the shape obtained by moving a node to a point extending beyond the moving destination line which is previously designated is a desired shape which satisfies the operator, the operator can perform such transformation by moving the node up to that point, whereby efficient design can be performed.

Embodiment 6

In the sixth embodiment, a non-transformation region designation device is further provided in addition to the structure according to the fifth embodiment.

Figure 26:
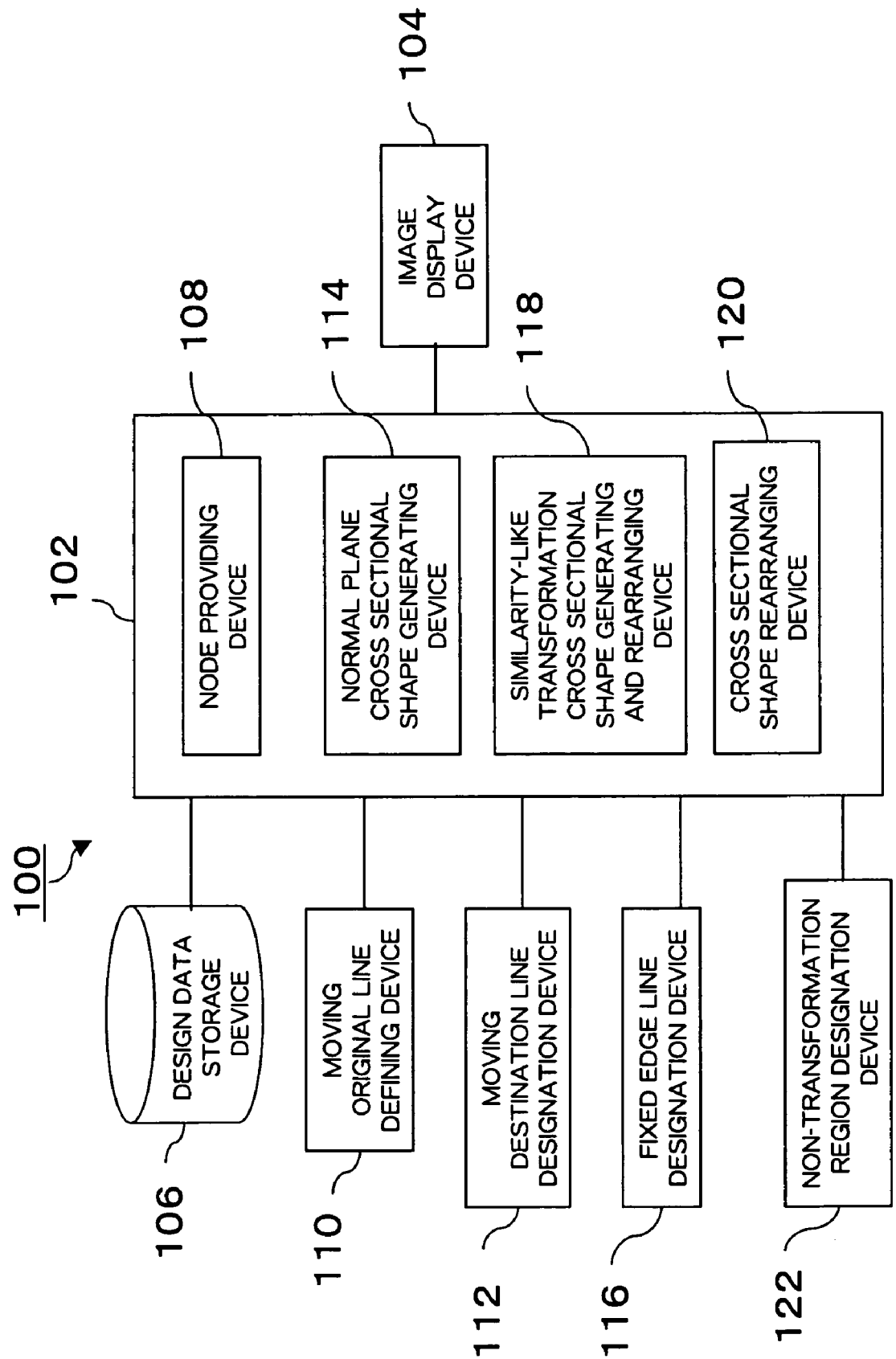
FIG. 26 is a block structural diagram showing the function of the design data generating apparatus comprising a non-transformation region designation device according to the sixth embodiment of the present invention.

FIG. 26 is a function block structural diagram of a design data generating apparatus according to the sixth embodiment of the present invention. The design data generating apparatus according to the sixth embodiment includes a non-transformation region designation device for designating a non-transformation region from an existing article shape.

FIG. 27 is a flowchart showing data generation in the design data generating apparatus according to the sixth embodiment. In this embodiment, a step S115 for designating a non-transformation region is added to the data generation flow of the fifth embodiment. The position of the step S115 in the process sequence is not limited to that shown in FIG. 27, as long as it is prior to the similarity-like transformation process step S122 and the rearrangement process step S124.

Figures 28A, 28B:
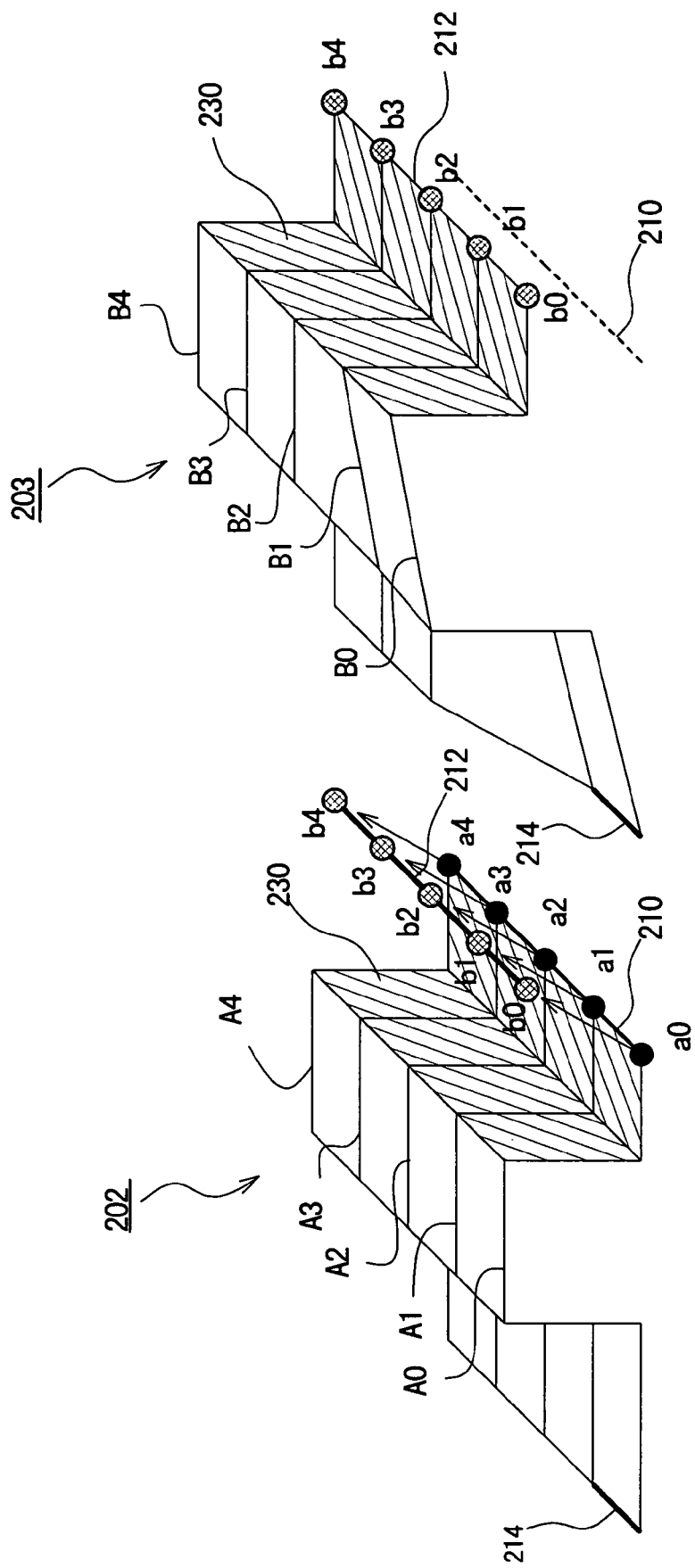
FIG. 28A is a view for explaining similarity-like transformation of an existing article shape in which a non-transformation region is designated.
FIG. 28B is a view for explaining similarity-like transformation of an existing article shape in which a non-transformation region is designated.

Here, a specific transformation process in the design data generating apparatus according to the sixth embodiment of the present invention will be described using an example figure. FIG. 28A shows an existing article shape 202. First, nodes are provided on this shape by the node providing device 108 (S110). Then, one of the edge lines is defined as the moving original line 210 by the moving original line defining device 110 (S112). In FIG. 28A, of the nodes which are provided, only the nodes on the moving original line are denoted as a0, a1, a2, a3, and a4, respectively. Further, the moving destination line 212 which is a destination of the moving original line 210 is designated (S114). Then, a non-transformation region is designated from the existing article shape by the non-transformation region designation device 122 (S115). In this example, two hatched planes shown in FIG. 28A correspond to the non-transformation region 230. Subsequently, a cross sectional shape of the existing article formed by a normal plane at each node on the moving original line is generated by the normal plane cross sectional shape generating device 114 (S116). The normal cross sectional shapes thus generated are denoted by A0, A1, A2, A3, and A4, corresponding to the respective nodes.

Then, of the edge lines of the shape, an edge line other than the moving original line which the operator wishes to remain fixed in a newly generated shape is designated as a fixed edge line 214 (S118).

With the above setting, a shape which belongs to a non-transformation region in each normal plane cross sectional shape, namely an L shaped portion in each normal plane cross sectional shape A0, A1, A2, A3, or A4 corresponds to a non-transformation shape. This non-transformation L shaped portion is not subjected to transformation in the similarity-like transformation process (S122), as shown in FIG. 28B, and the remaining region of the shape other than the L-shaped portion is transformed as instructed.

More specifically, in the similarity-like transformation (S122) and the rearrangement of a normal plane cross sectional shape (S124) due to the movement of a node belonging to the moving original line, the normal plane cross sectional shape A2 (A3, A4) which does not cross the fixed edge line 214 is subjected to parallel displacement in association with the movement of a node on the moving original line 210 to a corresponding point b2 (b3, b4) on the moving destination line. Consequently, the non-transformation region having a shape which is defined by this normal plane cross sectional shape A2 (A3, A4) is maintained.

Transformation of the normal plane cross sectional shape A0, A1 which crosses the fixed edge line 214, on the other hand, will be described using a drawing. With reference to FIG. 29A, a normal plane cross sectional shape A0, a point f belonging to the fixed edge line, a node g on the moving original line, point h which is the destination of the node g, and an L shaped portion belonging to the non-transformation region as indicated by a solid line, which are prior to transformation, are shown. FIG. 29B shows the shape B0 after transformation. With the movement of the node g to the point h, the normal plane cross sectional shape A0 is subjected to similarity-like transformation. At this time, however, the L shaped portion indicated by a solid line does not transform and is subjected to parallel displacement, and the remaining region of the shape is transformed as instructed. The normal plane cross sectional shape A1 is also subjected to a similar transformation process. As described above, the shape of the non-transformation region is also maintained in the normal plane cross sectional shape crossing the fixed edge line 214.

According to the transformation process as described above, as shown in FIG. 28B, similarity-like transformation in which the shape of the designated non-transformation region is maintained can be performed, thereby generating a new article shape 203.

With the structure according to the sixth embodiment, it is possible to perform similarity-like transformation in which the shape of the designated non-transformation region is maintained and therefore efficiently design a new three dimensional shape as expected by the operator based on an existing article shape.

Embodiment 7

In the seventh embodiment of the present invention, a fixed shape designation device is provided in addition to the structure of the above-described fifth embodiment.

Figure 30:
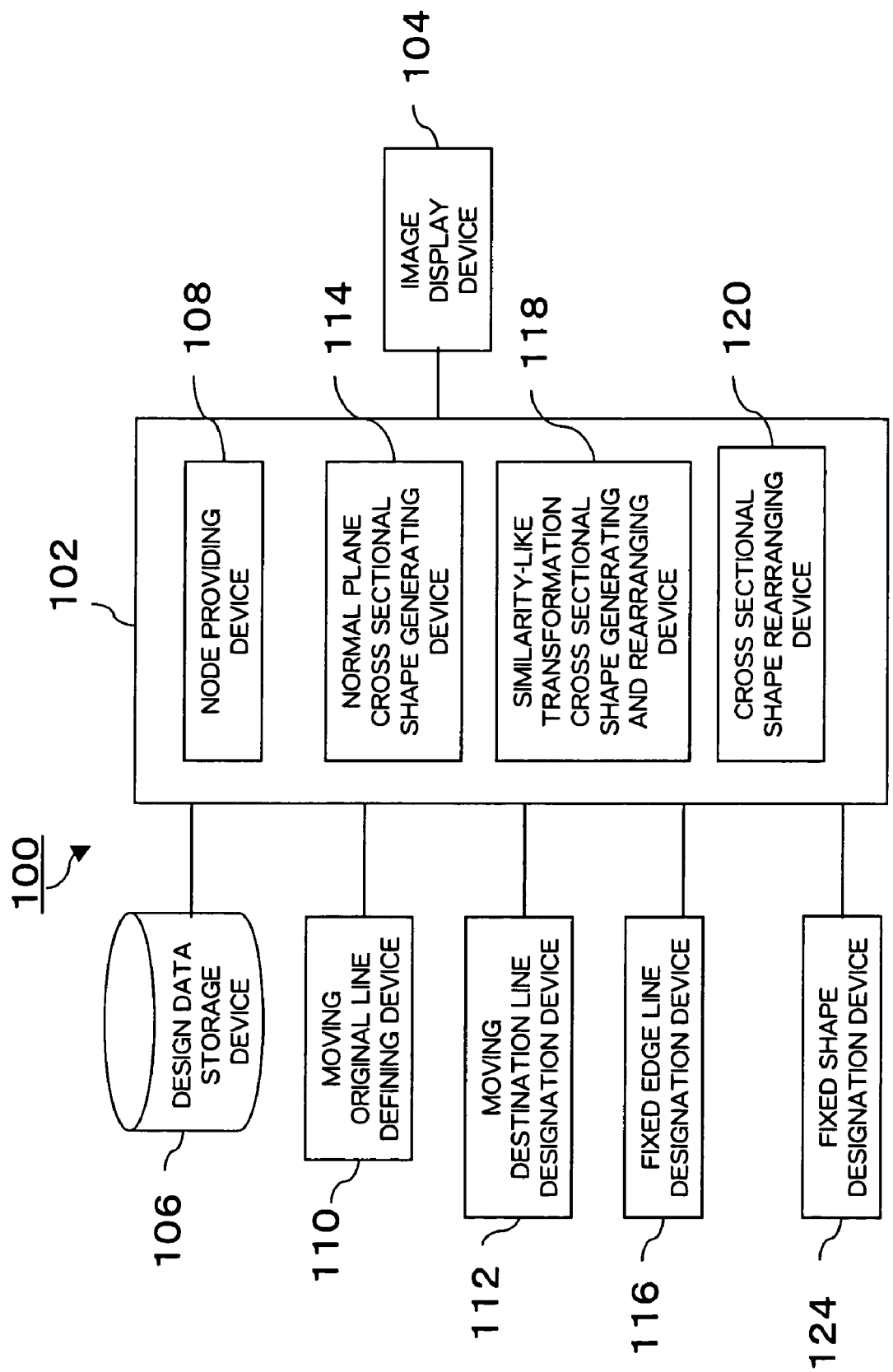
FIG. 30 is a block structural diagram showing the function of the design data generating apparatus comprising a fixed shape designation device according to the seventh embodiment of the present invention.

FIG. 30 is a functional block diagram showing the structure of the design data generating apparatus according to the seventh embodiment of the present invention. The design data generating apparatus of the seventh embodiment includes a fixed shape designation device 124 for designating a fixed shape from an existing article shape. The fixed shape designation device 124 of the seventh embodiment differs from the non-transformation region designation device 122 of the sixth embodiment in the following respect. Namely, the non-transformation region designation device 122 designates an arbitrary region of an existing article shape and the shape of the designated region is subjected to parallel displacement and is not transformed, whereas the fixed shape designation device 124 of the seventh embodiment designates an arbitrary region of an existing article shape, such as a hole used for fixing, for example, and the shape of the designate region is fixed and does not move.

Figure 31:
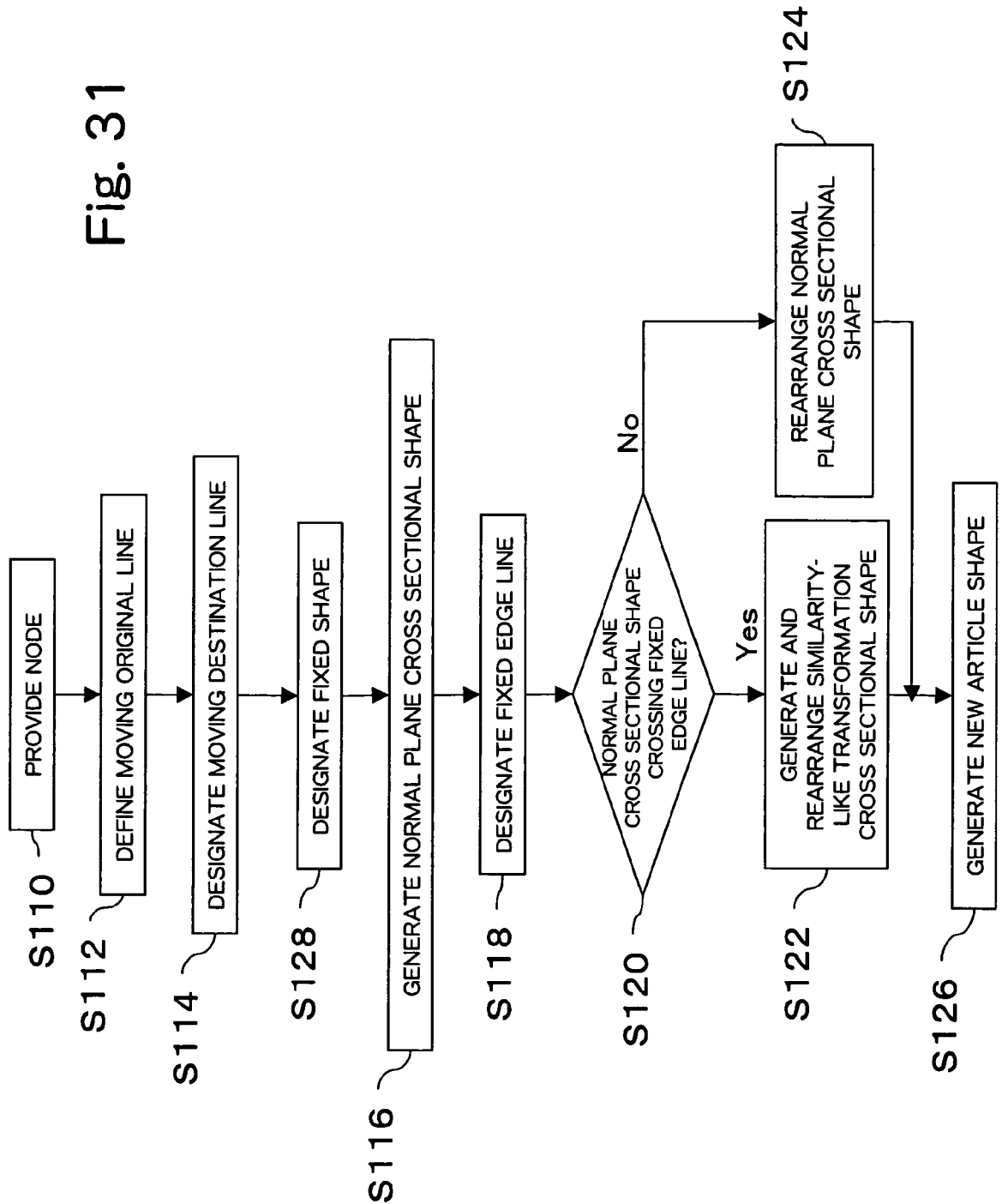
FIG. 31 is a chart showing the design data generation flow including a step of designating a fixed shape according to the seventh embodiment of the present invention.

FIG. 31 is a flowchart showing data generation in the design data generating apparatus according to the seventh embodiment. In this embodiment, a step S128 for designating a fixed shape is provided in addition to the flow of the fifth embodiment. The position of the step S128 in the process sequence is not limited to the shown example, as long as it is before the similarity-like transformation process step S122 and the rearrangement process step S124.

The specific transformation process in the design data generating apparatus according to the seventh embodiment of the present invention will be described using an example figure. FIG. 32A shows an existing article shape 204. First, nodes are provided on this shape by the node providing device 108 (S110). Of the nodes which are thus provided, only the nodes on the moving original line, a0, a1, a2, a3, and a4, are shown in FIG. 32A. Then, one of the edge lines is defined as the moving original line 210 using the moving original line defining device 110 (S112). Further, on the image display device 104, the moving destination line 212 which is the destination of the moving original line 210 is designated using the moving destination designation device 112 (S114). Then, a fixed shape is designated from the existing article shape using the fixed shape designation device 124 (S128). In the shown example, a rectangular opening is designated as a fixed shape 240. A cross sectional shape of the existing article formed by a normal plane at each generated node on the moving original line is indicated as A0, A1, A2, A3, and A4, respectively.

With the above setting, the similarity-like transformation process (S122) and the rearrangement process of a normal plane cross sectional shape (S124) will be performed.

More specifically, with regard to the normal plane cross sectional shapes A0 and A4 which do not cross the fixed shape 240, the similarity-like transformation process (S122) and the rearrangement process (S124) according to the first embodiment are performed.

Figure 33B:
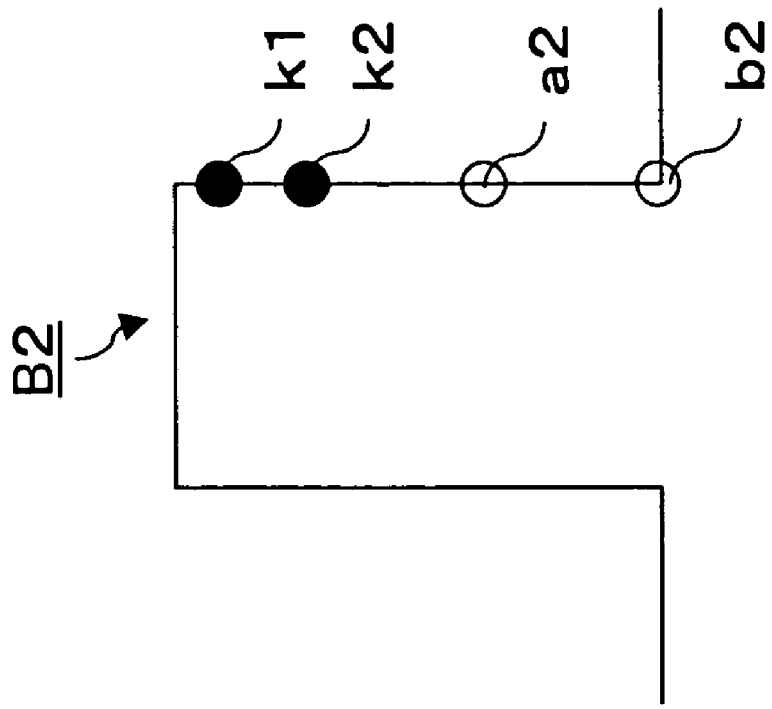
FIG. 33B is a view for explaining similarity-like transformation of a normal plane cross sectional shape which crosses the fixed shape shown in FIG. 32A and does not cross the fixed edge line.
Figure 33A:
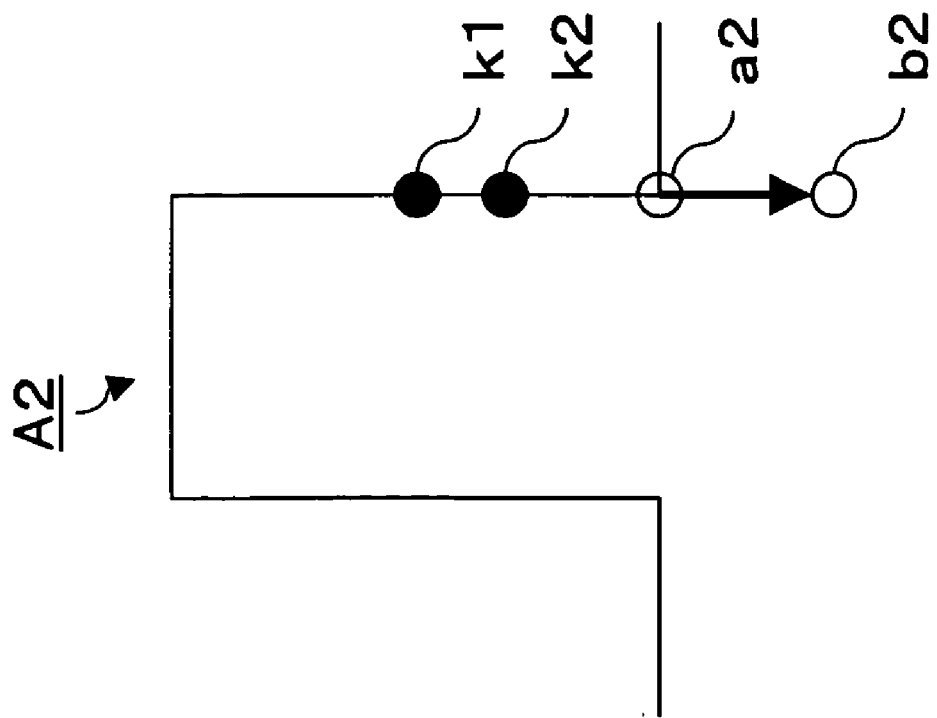
FIG. 33A is a view for explaining similarity-like transformation of a normal plane cross sectional shape which crosses the fixed shape shown in FIG. 32A and does not cross the fixed edge line.

On the other hand, with regard to the normal plane cross sectional shapes A1, A2, and A3 which cross the fixed shape 240, the normal cross sectional shapes A2 and A3 further do not cross the fixed edge line, and the normal plane cross sectional shape A2, as a representative, is shown in FIG. 33A. In FIG. 33A, points shown as black circles correspond respectively to the points k1 and k2 which define the fixed shape on this normal plane cross sectional shape A2, and the positions of these points are fixed in the similarity-like transformation and the rearrangement process. The elements of the normal plane cross sectional shape other than these fixed points are moved and rearranged in accordance with the movement of the node a2 on the moving original line to the corresponding point b2 on the moving destination line, as shown in FIG. 33B.

Accordingly, in this case, although the positions of the points k1 and k2 which cross the fixed shape relative to the cross sectional shape change, the absolute positions of these points k1 and k2 are fixed.

Figure 34B:
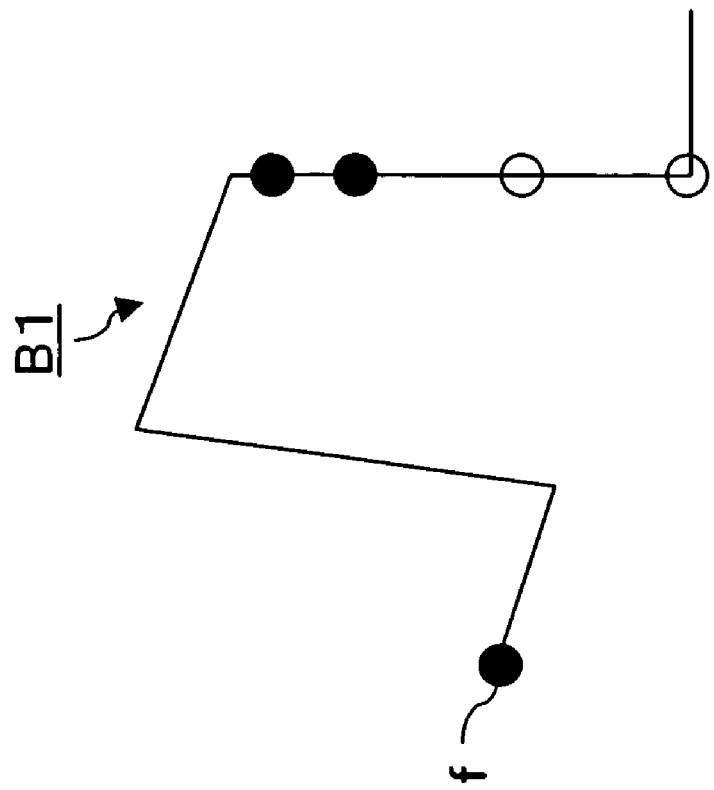
FIG. 34B is a view for explaining similarity-like transformation of a normal plane cross sectional shape which crosses the fixed shape shown in FIG. 32A and also crosses the fixed edge line.
Figure 34A:
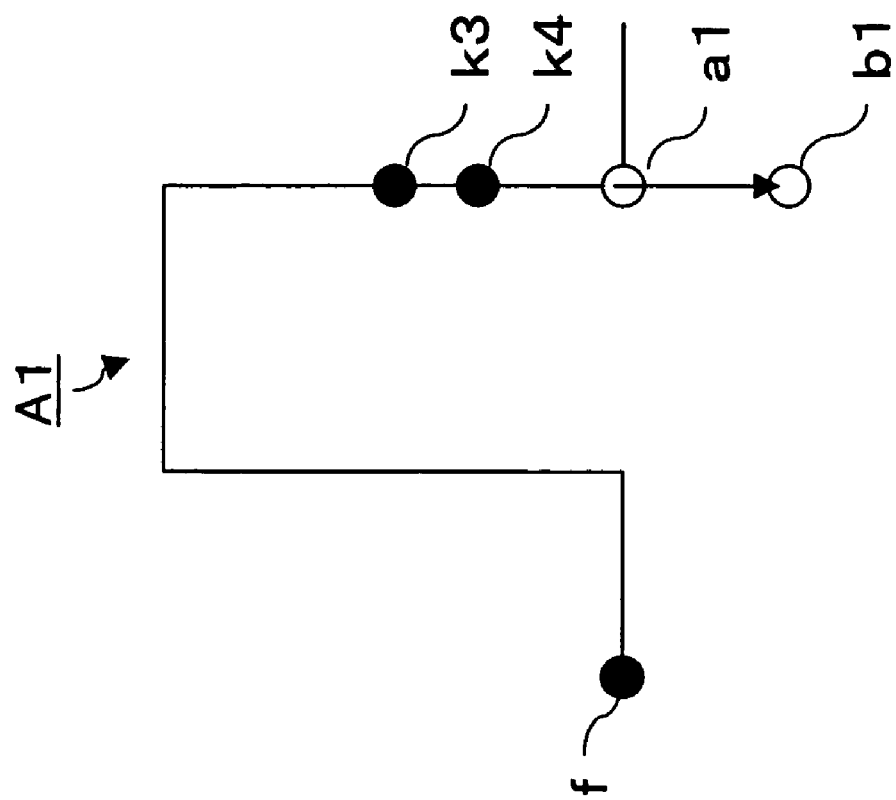
FIG. 34A is a view for explaining similarity-like transformation of a normal plane cross sectional shape which crosses the fixed shape shown in FIG. 32A and also crosses the fixed edge line.

Further, among the normal plane cross sectional shapes A1, A2, A3 which cross the fixed shape 240, the normal plane cross sectional shape A1 which crosses the fixed edge line is shown in FIG. 34A. In this case, during the similarity-like transformation process, the point f belonging to the fixed edge line and the points k3 and k4 belonging to the fixed shape are fixed, and the normal plane cross sectional shape other than these points is transformed in association with the movement of the node a1 on the moving original line to the corresponding point b1 on the moving destination line.

Figure 32B:
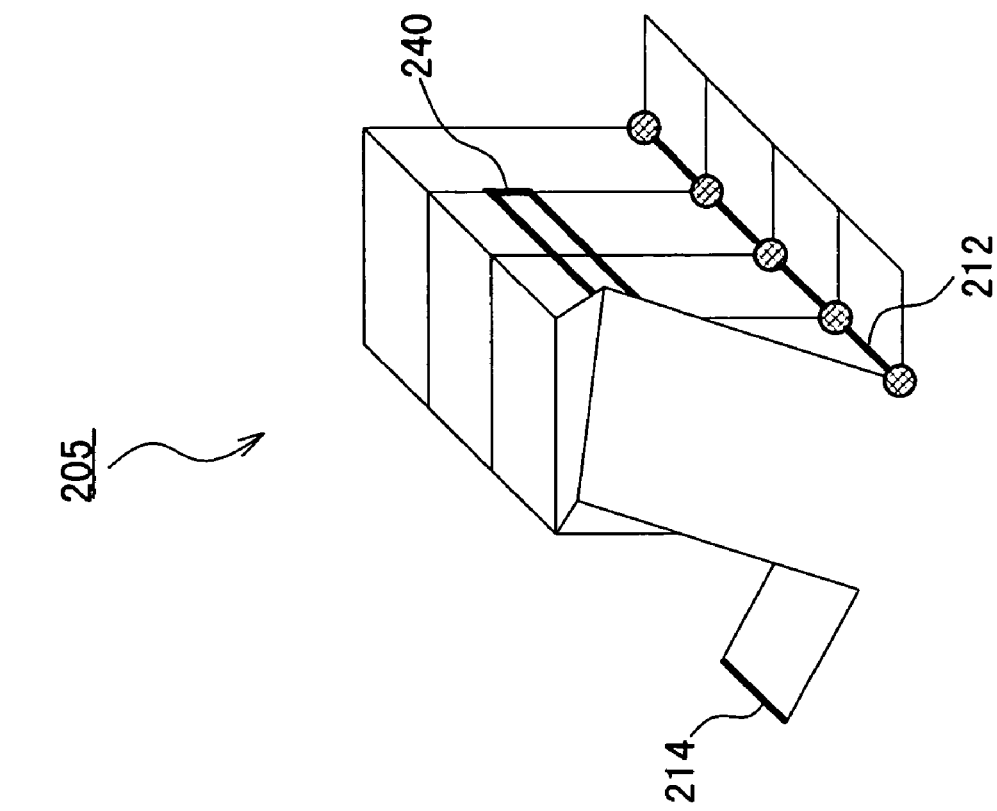
FIG. 32B is a view for explaining similarity-like transformation of an existing article shape in which a fixed shape is designated.
Figure 32A:
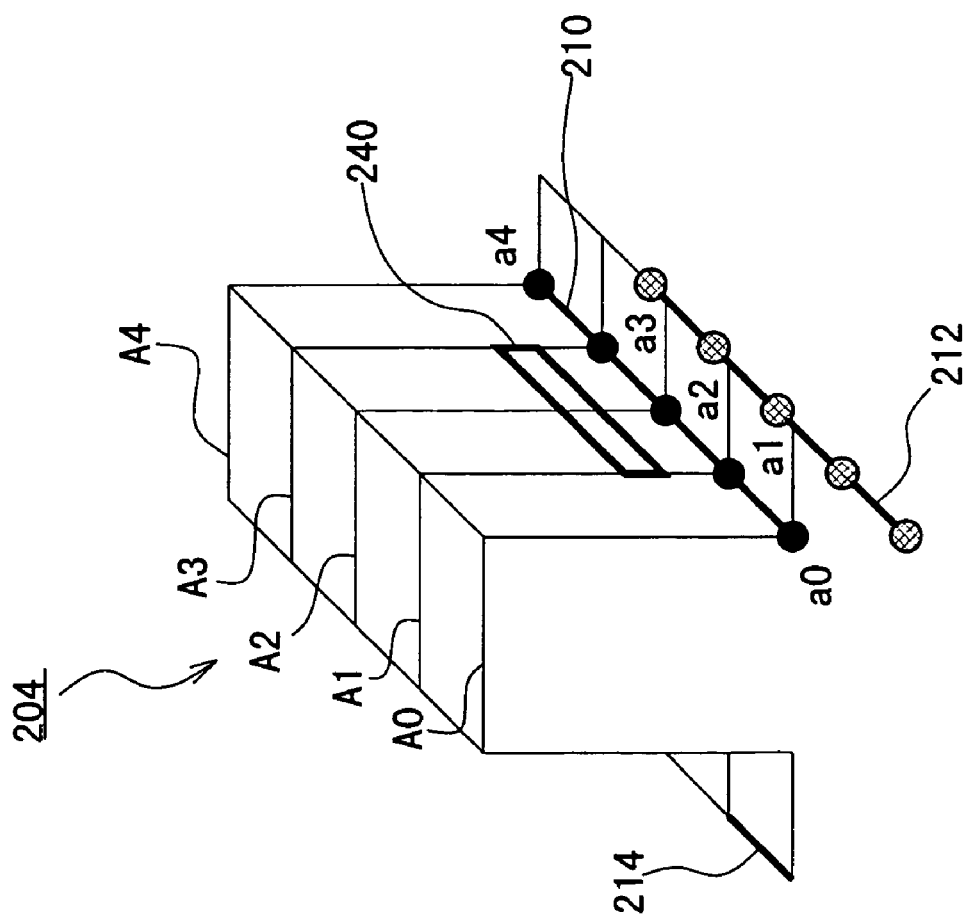
FIG. 32A is a view for explaining similarity-like transformation of an existing article shape in which a fixed shape is designated.

With the above transformation process, in a new article shape 205, the fixed shape 240 remains fixed even after the predetermined similarity-like transformation process, as shown in FIG. 32B.

According to the structure of the seventh embodiment, when generating a new three-dimensional shape by transformation, the shape in the existing article shape which the operator wishes to remain fixed can be fixed, whereby efficient design which makes use of an existing article shape can be performed.

Embodiment 8

In the eighth embodiment, a lower limit radius of curvature designation device for designating lower limit radium of curvature of the moving original line is provided in addition to the structure of the fifth embodiment.

Figure 35:
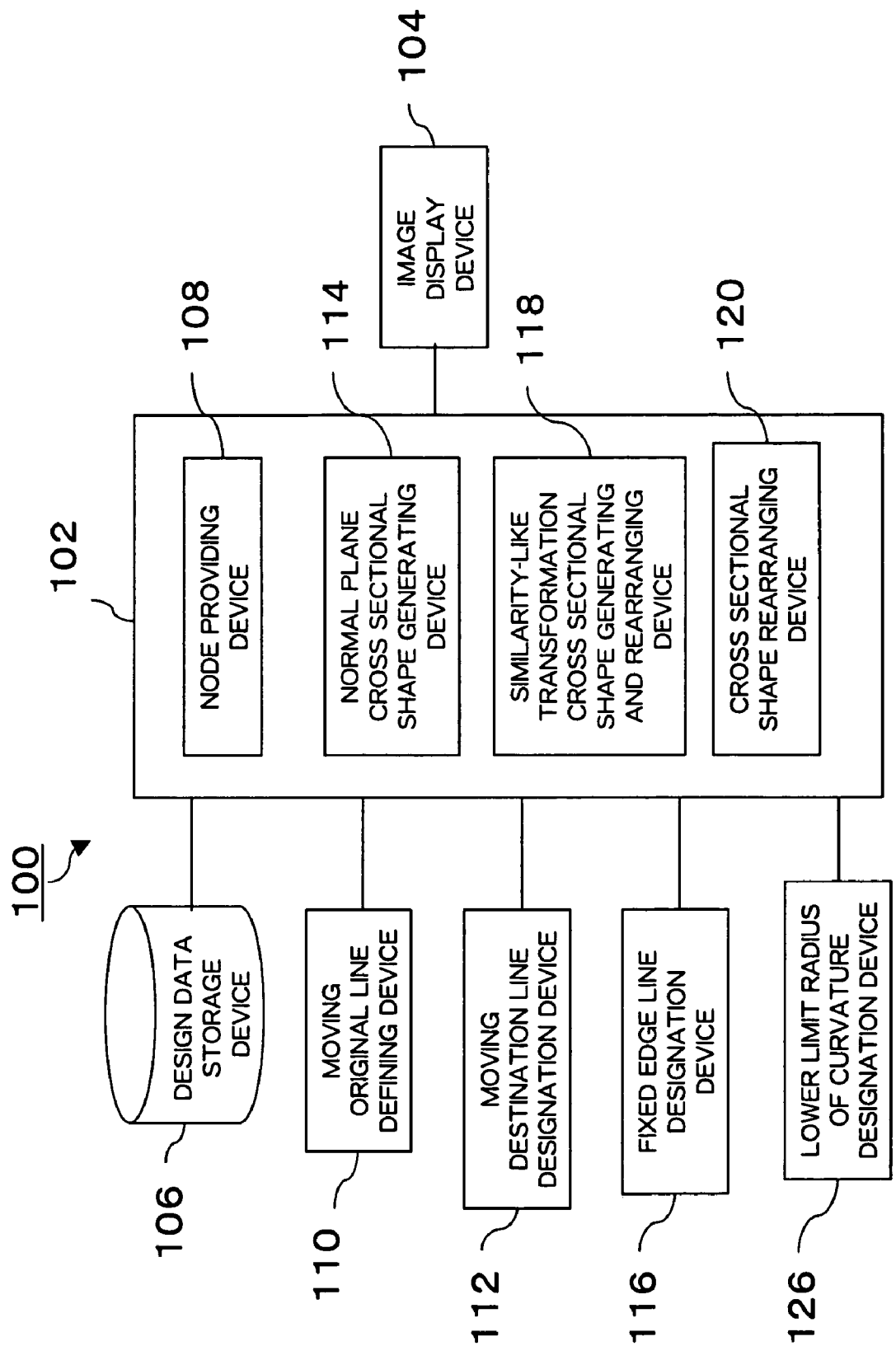
FIG. 35 is a block structural diagram showing the function of the design data generating apparatus comprising a lower limit radius of curvature designation device according to the eighth embodiment of the present invention.

FIG. 35 is a block structural diagram showing the function of the design data generating apparatus according to the eighth embodiment of the present invention. The design data generating apparatus according to the eighth embodiment includes a lower limit radius of curvature designation device 126 for designating a lower limit radius of curvature of the moving original line.

When the moving original line has a radius of curvature which is smaller than that designated by the lower limit radius of curvature designation device 126 between any nodes on the moving original line, the normal plane cross sectional shape generating device 114 provides a new additional node at a position between these nodes by which the moving original line between these nodes is divided by n (n is an integer equal to or greater than 1).

Figure 36:
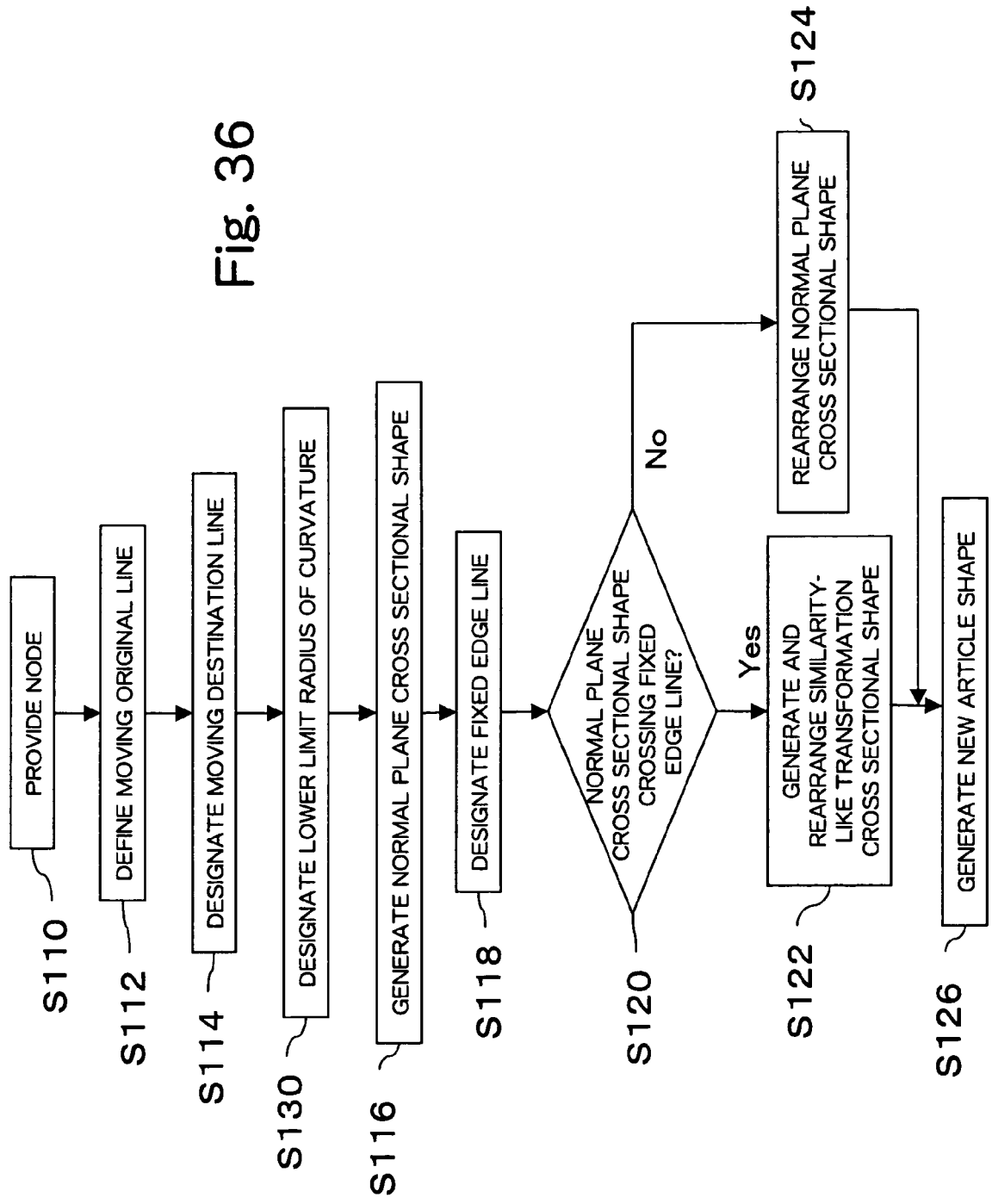
FIG. 36 is a chart showing the design data generation flow including a step of designating lower limit radius of curvature according to the eighth embodiment of the present invention.

FIG. 36 is a flowchart showing data generation in the design data generating apparatus according to the eighth embodiment. In this embodiment, a step S130 for designating lower limit radius of curvature is provided in addition to the flow of the fifth embodiment. The position of the step S130 in the process sequence is not limited to the shown example, as long as it is located before the similarity-like transformation process step (S122) and the rearrangement process step (S124).

Figure 37B:
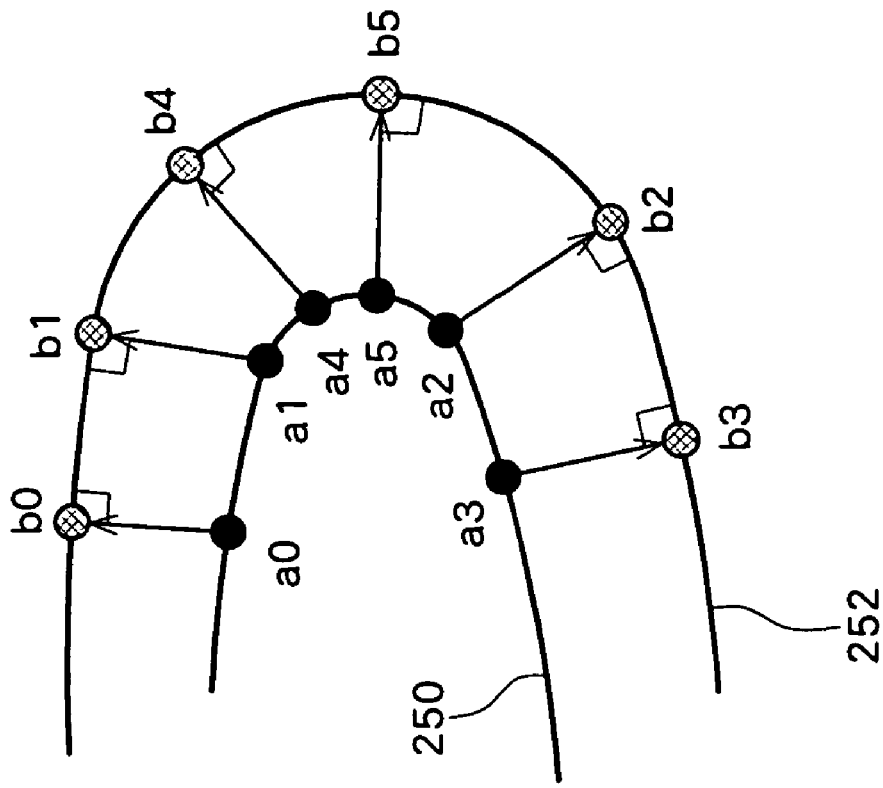
FIG. 37B is a view for explaining similarity-like transformation of an existing article shape having a moving original line with radius of curvature which is equal to or smaller than the lower limit radius of curvature.
Figure 37A:
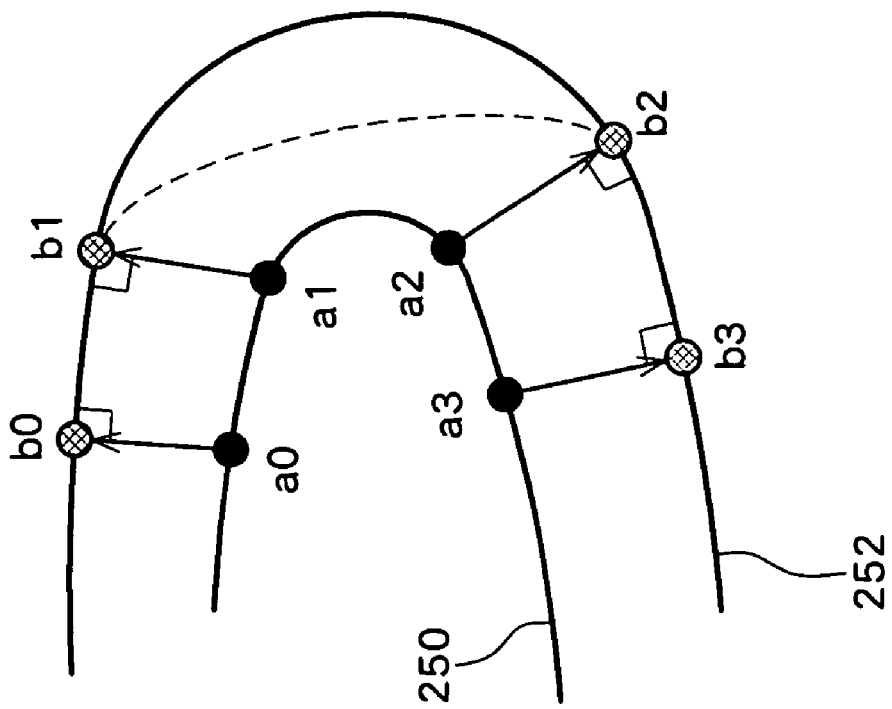
FIG. 37A is a view for explaining similarity-like transformation of an existing article shape having a moving original line with radius of curvature which is equal to or smaller than the lower limit radius of curvature.

The specific transformation process in the design data generating apparatus according to the eighth embodiment of the present invention will be described. FIG. 37A shows the moving original line 250 of an existing article shape and the designated moving destination line 252. The nodes (a0, a1, a2, a3) indicated by black circles are provided on the moving original line 250 by the node providing device 108. Here, it is assumed that a node on the moving original line corresponds to a point on the moving destination line based on the moving destination line perpendicular line correspondence described above, namely that a node on the moving original line corresponds to a point on the moving destination line such that the perpendicular line extending from the point on the moving destination line crosses the node on the moving original line. Consequently, the normal plane cross sectional shapes at a0, a1, a2, and a3 are rearranged to the points b1, b2, b3 and b4, respectively. However, as shown by the dotted line, the new article shape which is defined by a series of normal plane cross sectional shapes after similarity-like transformation and rearrangement has an outline which is different from the moving destination line 252 designated by the operator for the following reason. Namely, because the radius of curvature of the moving original line 250 between the nodes a1 and a2 is small, there is a wide interval between the respective corresponding points b1 and b2 on the moving destination line 252 from which the perpendicular lines extend and cross the respective nodes on the moving original line. Consequently, the shape defined between the points b1 and b2 cannot coincide with the designated moving destination line, and necessarily becomes a shape having an outline smoothly connecting the points b1 and b2, as shown in FIG. 37A.

Accordingly, when the moving original line has a radius of curvature which is smaller than the lower limit radius of curvature designated by the lower limit radius of curvature designation device 126 between the nodes a1 and a2, the normal plane cross sectional shape generating device 114 provides additional nodes a4 and a5 such that the moving original line between the nodes a1 and a2 is divided into three equal sections by these nodes a4 and a5, and generates a normal plane cross sectional shape of the existing article at each additional node.

The normal plane cross sectional shape at each additional node a4, a5 corresponds to the point b4, b5 on the moving destination line from which the perpendicular line extends and crosses the additional node a4, a5, respectively.

Although the number of additional nodes is set such that the additional nodes divide the distance between the original nodes into three equal sections in the above example, the number of additional nodes is not limited to the above example and the additional nodes may be provided such that they divide the distance between the original nodes into n (n is an integer equal to or greater than 1). It is also preferable that n can be previously input using the lower limit radius of curvature designation device 126.

According to the structure of the eighth embodiment, it is possible to make use of an existing article shape to efficiently design a new shape having an outline which the operator expects.

Embodiment 9

In the ninth embodiment, a normal plane cross sectional shape orientation designation device 128 for designating the direction of the normal plane cross sectional shape at a point on the moving destination line after rearrangement and similarity-like transformation is further provided in addition to the structure of the fifth embodiment.

Figure 38:
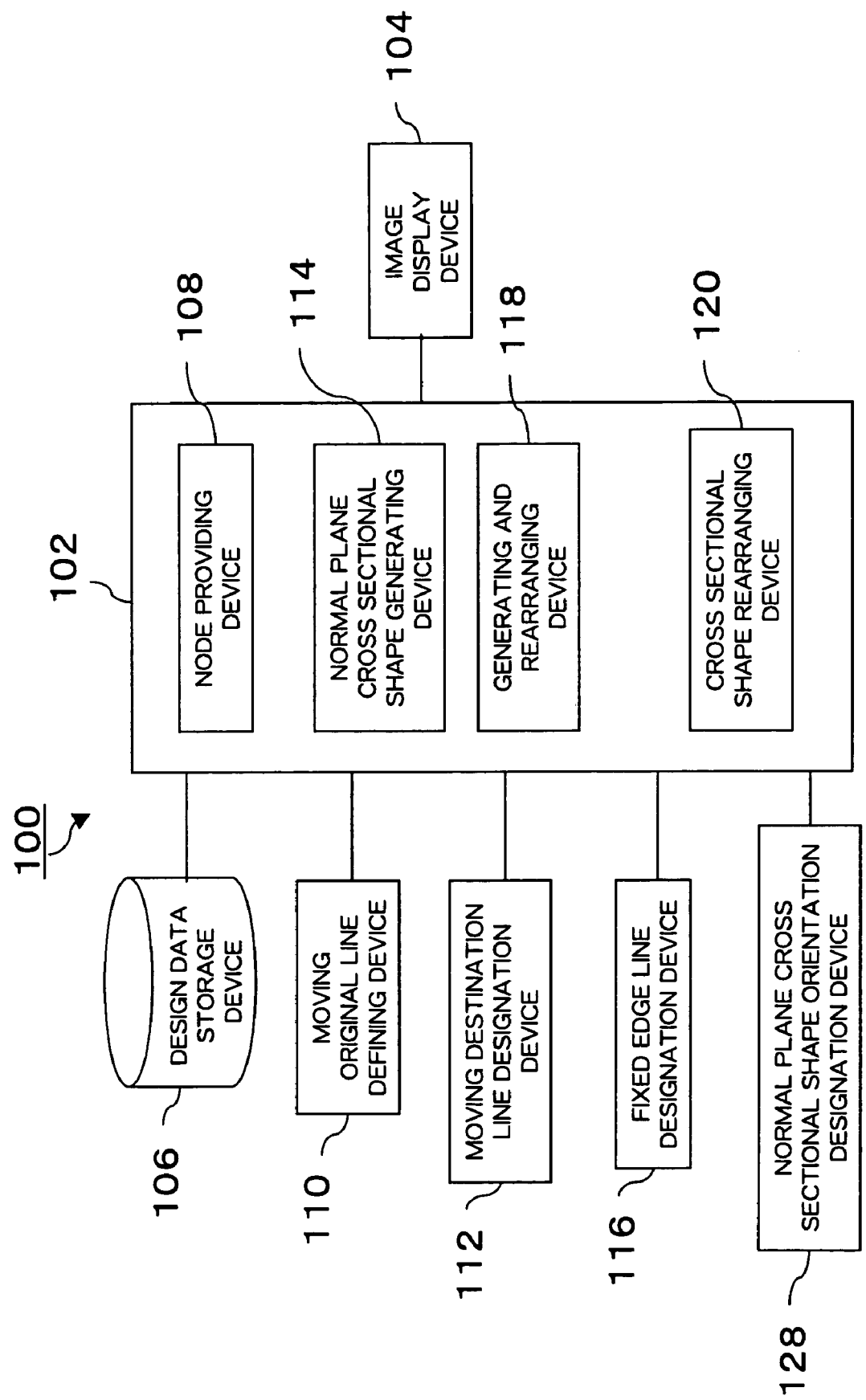
FIG. 38 is a block structural diagram showing the function of the design data generating apparatus comprising a normal plane cross sectional shape orientation designation device according to the ninth embodiment of the present invention.

FIG. 38 is a block structural diagram showing the structure of the design data generating apparatus according to the ninth embodiment of the present invention. The design data generating apparatus of the ninth embodiment includes a normal plane cross sectional shape orientation designation device 128 for designating the direction of the normal plane cross sectional shape at a point on the moving destination line after rearrangement and similarity-like transformation. The normal plane cross sectional shape orientation designation device 128 receives the operator's instructions concerning whether the operator wishes the orientation of the normal plane cross sectional shape at a point on the moving destination line after rearrangement and similarity-like transformation to be realized by a shape on the normal plane at a point on the moving destination line or to be realized by a shape within a plane parallel to the normal plane at the corresponding node on the moving original line.

Figure 39:
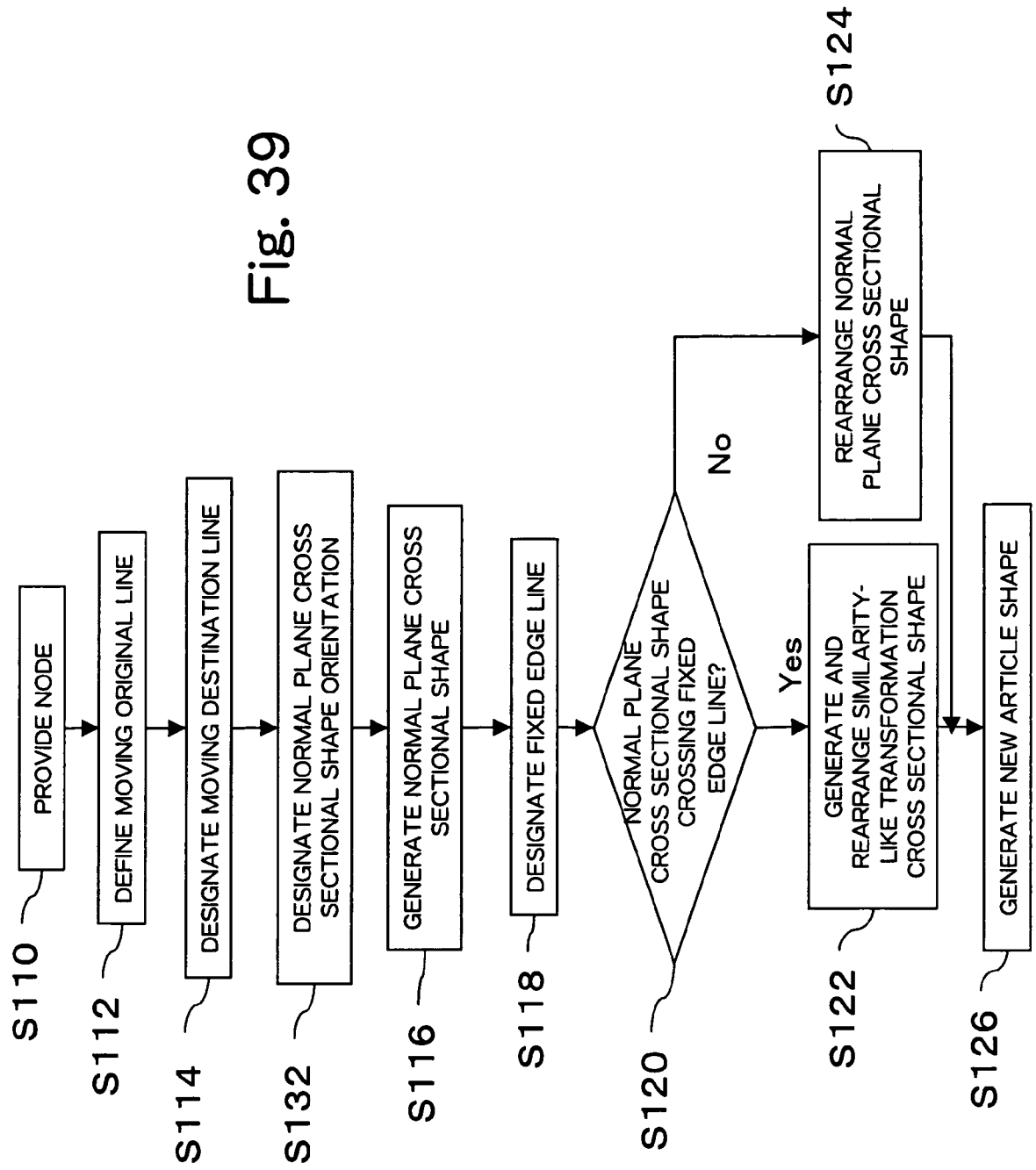
FIG. 39 is a chart showing the design data generation flow including a step of designating the orientation of a normal plane cross sectional shape according to the ninth embodiment of the present invention.

FIG. 39 is a flowchart showing data generation in the design data generating apparatus according to the ninth embodiment. In the data generation flow of the ninth embodiment, a step S132 for receiving the operator's instructions concerning whether the operator wishes the orientation of the normal plane cross sectional shape at a point on the moving destination line after rearrangement and similarity-like transformation as a shape on the normal plane at a point on the moving destination line or as a shape within a plane parallel to the normal plane at the corresponding node on the moving original line is further provided in addition to the flow of the fifth embodiment. The position of the step S132 in the process sequence is not limited to the shown example, as long as it is located prior to the similarity-like transformation process step (S122) and the rearrangement process step (S124).

Figure 40:
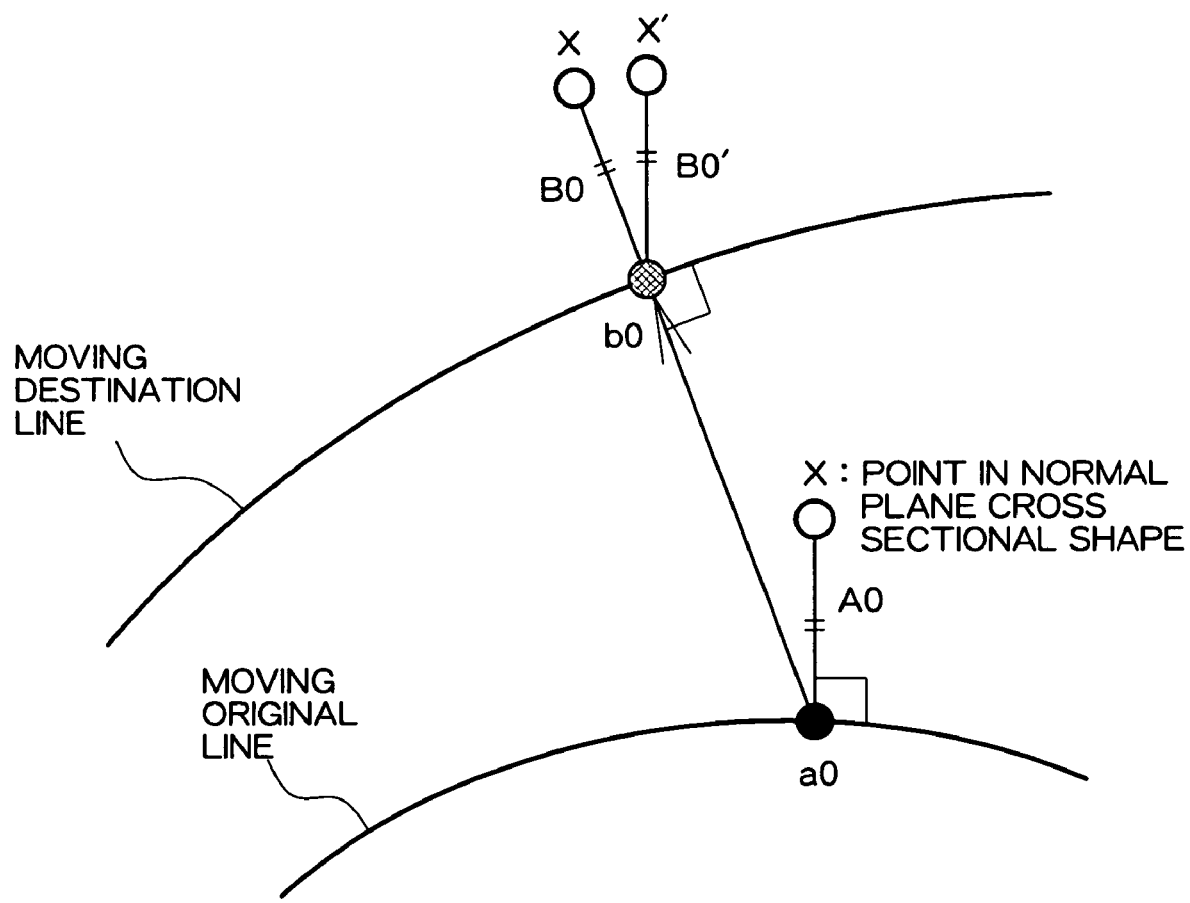
FIG. 40 is a view for explaining the orientation of a normal plane cross sectional shape using a specific example of an existing article shape.

The specific transformation process in the design data generating apparatus according to the ninth embodiment of the present invention will be described using an example figure. FIG. 40 shows a moving original line, a node a0, a moving destination line, and a point b0 on the moving destination line corresponding to the node a0. A shape point x is representative of the normal plane cross sectional shape A0 at the node a0 on the moving original line and is indicated by a white circle.

Here, it is assumed that a node on the moving original line corresponds to a point on the moving destination line based on the moving destination line perpendicular line correspondence described above, whereby the node on the moving original line corresponds to a point on the moving destination line such that the perpendicular line extending from the point on the moving destination line cross the node on the moving original line.

The normal plane cross sectional shape A0 is rearranged to the point b0 on the moving destination line due to the similarity-like transformation process step (S122) and the rearrangement process step (S124). As shown in FIG. 40, the normal plane cross sectional shape B0 which is rearranged at the point b0 on the moving destination line can be either the shape B0 on the normal plane at the point b0 on the moving destination line or the shape B0' within a plane parallel to the normal plane at the corresponding node a0 on the moving original line, and can have either one of these two orientations.

The normal plane cross sectional shape orientation designation device 128 receives the operator's instructions as to whether the operator wants the shape B0 on the normal plane at the point b0 on the moving destination line or the shape B0' within a plane parallel to the normal plane at the corresponding node a0 on the moving original line. The normal plane cross sectional shape is then positioned in the direction in accordance with the instructions in the similarity-like transformation process step (S122) and the rearrangement process step (S124), and a new article shape which is defined by a series of these shapes is generated (S126).

Here, the operator's designation of a shape on the normal plane at the point on the moving destination line is advantageous in that, when the normal plane cross sectional shape includes a fixed shape which maintains a predetermined dimension with respect to the outer edge shape of the article, a new article shape can be generated with such a dimension maintained. Further, while the orientation of the cross sectional shape after rearrangement of the normal plane cross sectional shape based on the moving destination line perpendicular line correspondence has been described in the above example, the correspondence type may instead be the moving original line perpendicular line correspondence or the designated plane parallel correspondence.

According to the structure of the ninth embodiment, it is possible to designate a plane in which the normal plane cross sectional shape of an existing article is located after a similarity-like transformation operation, so that efficient design which makes use of the existing article shape can be performed.

Embodiment 10

In the tenth embodiment, a moving original line dividing device 130 for dividing the moving original line is further provided in addition to the structure of the fifth embodiment, in order to perform the similarity-like transformation process in a divided manner.

Figure 41:
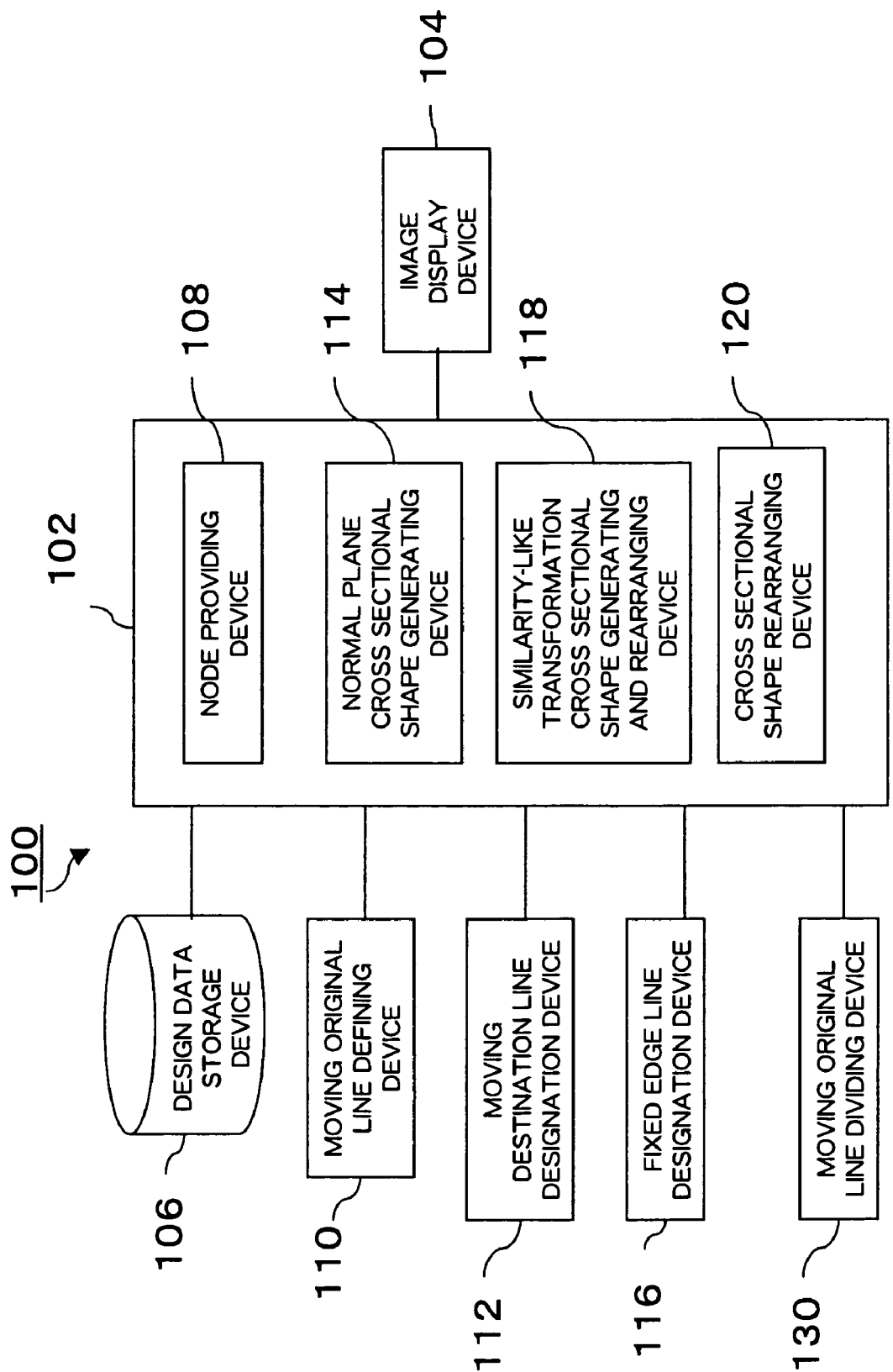
FIG. 41 is a block structural diagram showing the function of the design data generating apparatus comprising a moving original line dividing device according to the tenth embodiment of the present invention.

FIG. 41 is a block structural diagram showing the function of the design data generating apparatus according to the tenth embodiment of the present invention. The design data generating apparatus according to the tenth embodiment includes a moving original line dividing device 130 for performing the similarity-like transformation process and the rearrangement process in a divided manner. The moving original line dividing device 130 receives the operator's instructions for dividing the moving original line which is previously designated.

Figure 42:
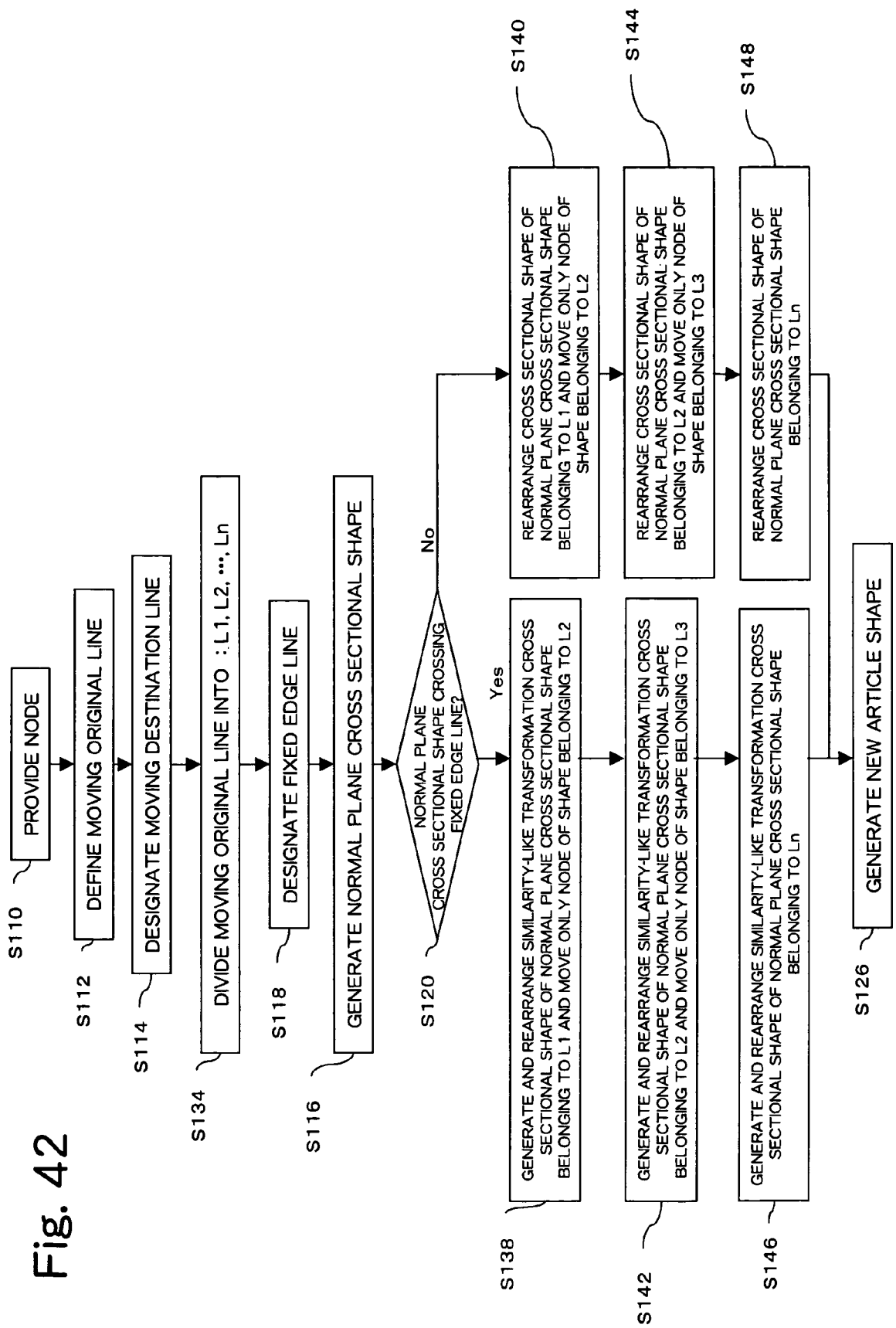
FIG. 42 is a chart showing the design data generation flow including a step of dividing the moving original line according to the tenth embodiment of the present invention.

FIG. 42 is a flowchart showing data generation in the design data generating apparatus according to the tenth embodiment. More specifically, in order perform the similarity-like transformation process dividedly, a step S134 of receiving the operator's instructions for dividing the moving original line into L1, L2, . . . Ln is further provided in addition to the flow of the fifth embodiment, and similarity-like transformation and rearrangement is performed for each normal plane cross sectional shape belonging to each divided moving original line (S138 to S148).

The specific transformation process in the design data generating apparatus according to the tenth embodiment of the present invention will be described using an example figure. FIG. 43A through FIG. 43D sequentially show the steps of similarity-like transformation of a shape according to the tenth embodiment.

Figure 43A:
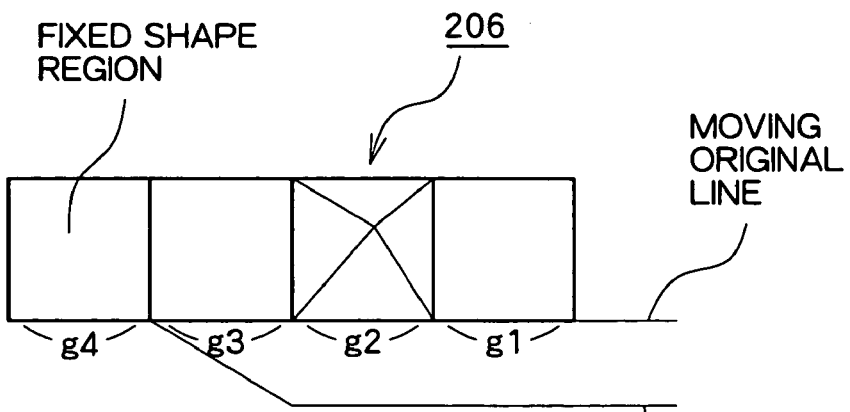
FIG. 43A is a view for explaining a divided similarity-like transformation process of the design data generating apparatus according to the tenth embodiment of the present invention.

FIG. 43A shows an existing shape 206, a moving original line and a moving destination line. The moving original line has been divided into four sections, g1 to g4, in step S134. It is assumed that a shape defined by a normal plane cross section belonging to the divided moving original line g4 is designated as a fixed shape. Further, in the shape belonging to the divided moving original line g2, planes defined by twelve control points are denoted by lines.

Figure 43B:
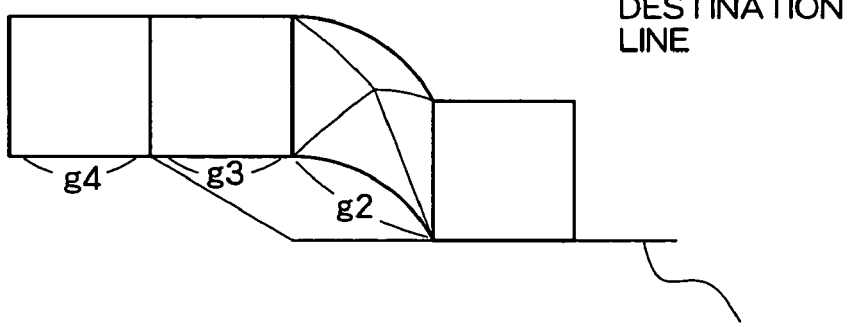
FIG. 43B is a view for explaining a divided similarity-like transformation process of the design data generating apparatus according to the tenth embodiment of the present invention.

The first transformation and rearrangement process is performed for a normal plane cross section belonging to the divided moving original line g1, as shown in FIG. 43B (S138, S140). At this time, with the transformation of the normal plane cross sectional shape belonging to g1, the node of the shape belonging to the adjacent g2 also moves so as to maintain the continuity of the outer line, but the control points are not moved. In this manner, the first transformation process is completed.

Figure 43C:
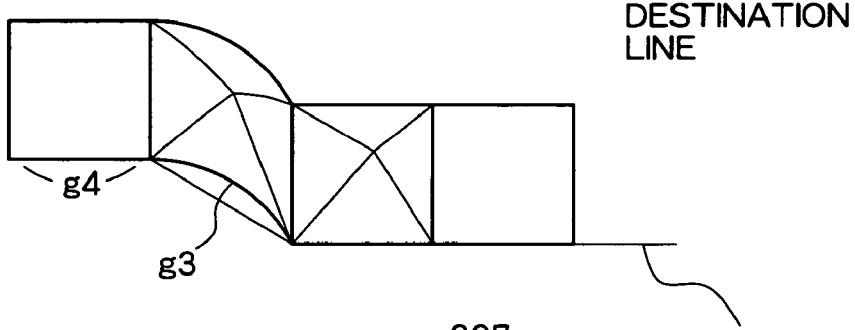
FIG. 43C is a view for explaining a divided similarity-like transformation process of the design data generating apparatus according to the tenth embodiment of the present invention.

Then, as shown in FIG. 43C, transformation and rearrangement is performed for the normal plane cross sectional shape belonging to the divided moving original line g2 (S142, S144). As in the case of the first transformation and rearrangement process (S138, S140), with the transformation of the normal plane cross sectional shape belonging to g2, the node of the shape belonging to the adjacent g3 also moves so as to maintain the continuity of the outer line, but the control points are not moved. Thus, the second transformation process is completed.

Figure 43D:
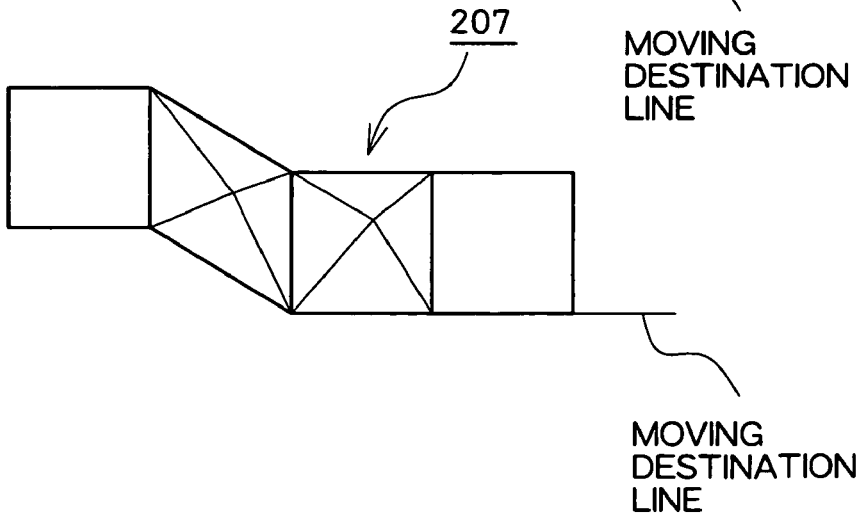
FIG. 43D is a view for explaining a divided similarity-like transformation process of the design data generating apparatus according to the tenth embodiment of the present invention.

Subsequently, as shown in FIG. 43D, transformation and rearrangement is performed for the normal plane cross sectional shape belonging to the divided moving original line g3 (S146, S148). Because the normal plane cross sectional shape belonging to the divided moving original line g4 is designated as the fixed shape, this third transformation and rearrangement process will be the last transformation and rearrangement process. Accordingly, the transformation and rearrangement process similar to that in the fifth embodiment is performed. In this manner, the whole transformation and rearrangement process is completed.

While a method in which the transformation process is performed for four divided sections has been described in the above example, a similar process can be achieved as long as the transformation region is divided into two or more sections.

According to the structure of the tenth embodiment, because the control points which define a curved plane are fixed during transformation, even when a transformation process is performed for divided sections, these divided regions can be connected smoothly without generating discontinuity at their boundaries. Consequently, even when a transformation process is performed for each divided region of a complicated article shape with a large data amount, it is possible to efficiently generate a new shape which fulfils the operator's intention.

Embodiment 11

While, in the fifth embodiment, the similarity-like transformation process is performed in which a combination of a pair of the moving original line and the moving destination line, and the fixed edge line are designated, in the eleventh embodiment, a second moving original line and a second moving destination line are further designated, in place of the fixed edge line. Namely, according to the eleventh embodiment, similarity-like transformation for moving two edge lines of an existing article shape to the respective designated lines can be achieved.

Figure 44:
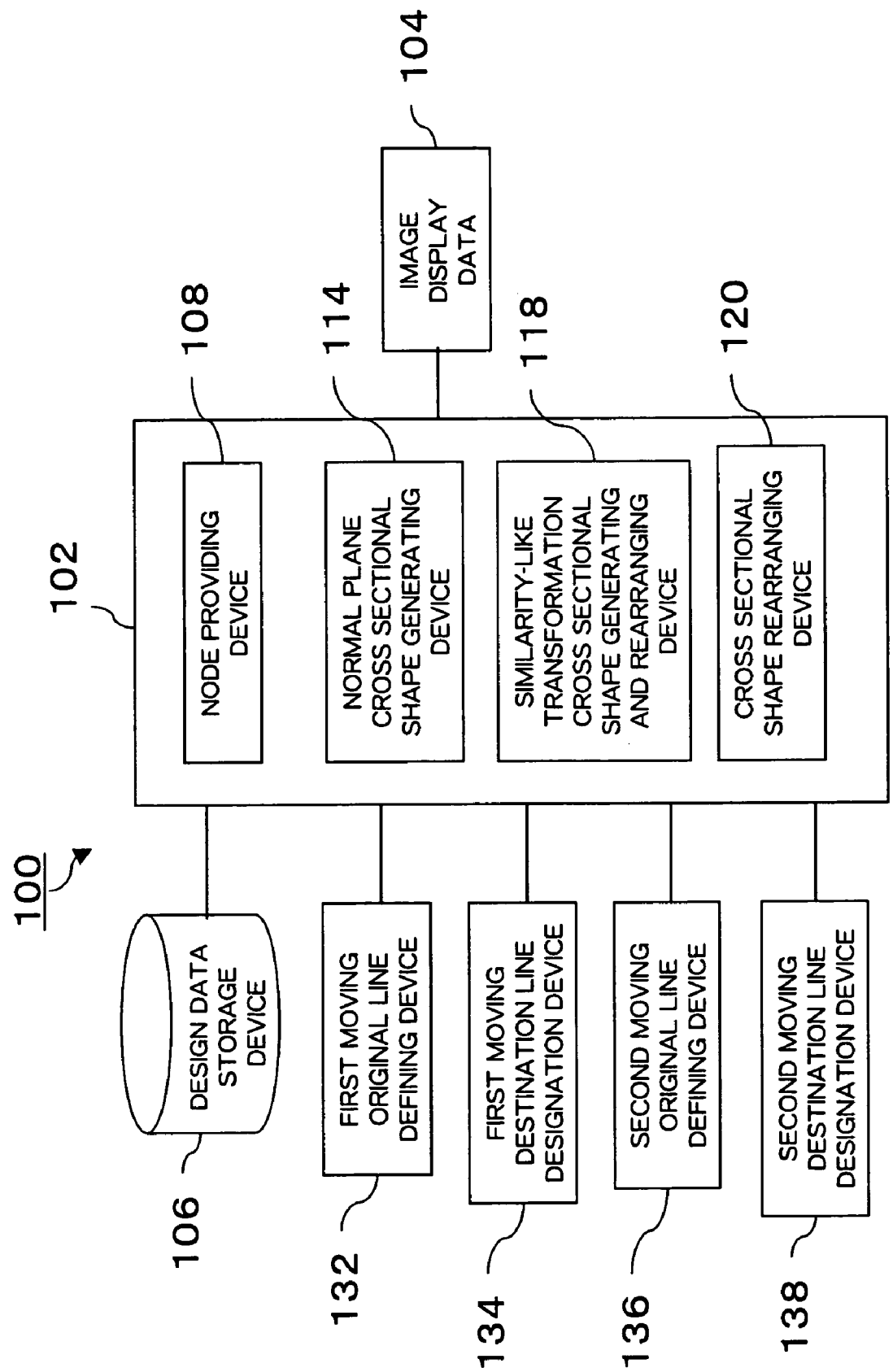
FIG. 44 is a block structural diagram showing the function of the design data generating apparatus comprising a device for designating two sets of the moving original line and the moving destination line according to the eleventh embodiment of the present invention.

FIG. 44 is a functional block diagram of the design data generating apparatus 100 according to the eleventh embodiment of the present invention. The design data generating apparatus 100 according to the eleventh embodiment includes a first moving original line defining device 132 for defining the first moving original line, a first moving destination line designation device 134 for designating the first moving designation line, a second moving original line defining device 136 for defining the second moving original line, and second moving destination line designation device 138 for designating the second moving designation line.

Figure 45:
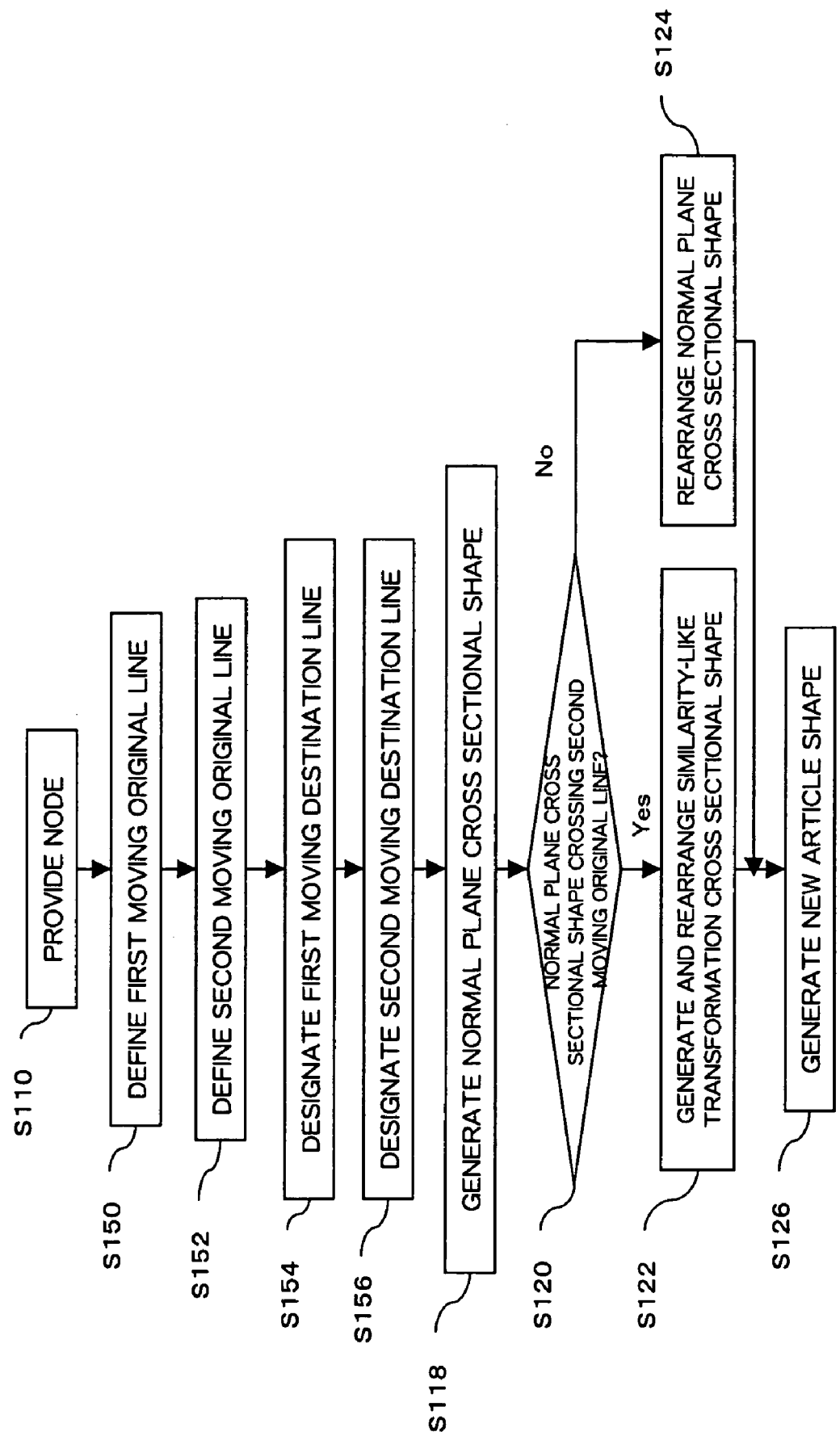
FIG. 45 is a chart showing the design data generation flow including a step of designating two sets of the moving original line and the moving destination line according to the eleventh embodiment of the present invention.

FIG. 45 is a chart showing data generation flow in the design data generating apparatus according to the eleventh embodiment. In this embodiment, a step S152 of defining the second moving original line and a step S156 of designating the second moving destination line are performed in place of the step of designating the fixed edge line in the flow of the fifth embodiment.

As a process of the normal plane cross sectional shape, the similarity-like transformation process step (S122) and the rearrangement process step (S124) are performed in the following manner.

The normal plane cross sectional shape which does not cross the second moving original line is not transformed and is rearranged with the movement of a node on the first moving original line to a corresponding point on the first moving destination line (S124).

Figure 46A:
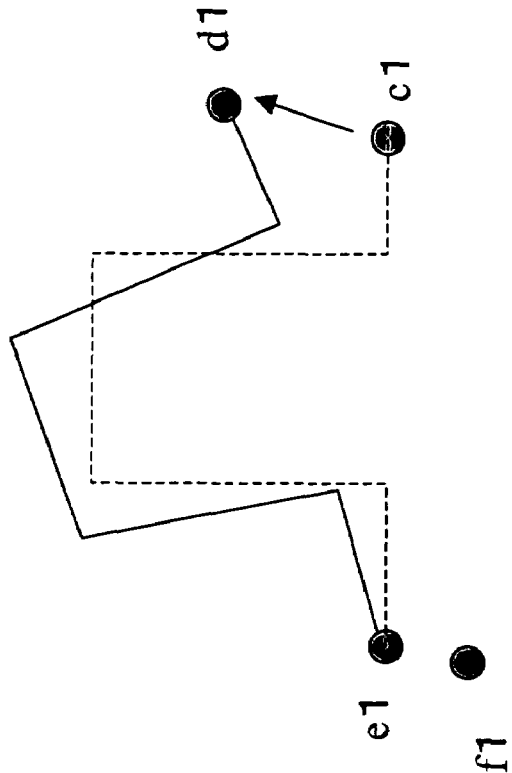
FIG. 46A is a view for explaining similarity-like transformation of an existing article shape in which two sets of the moving original line and the moving destination line are designated.

On the other hand, the similarity-like transformation process (S122) for a normal plane cross sectional shape which crosses the second moving original line will be described using an example figure. FIG. 46A shows the normal plane cross sectional shape, a node (c1) on the first moving original line and the corresponding point (d1) on the first moving destination line, a node (e1) on the second moving original line and the corresponding point (f1) on the second moving destination line.

Figure 46B:
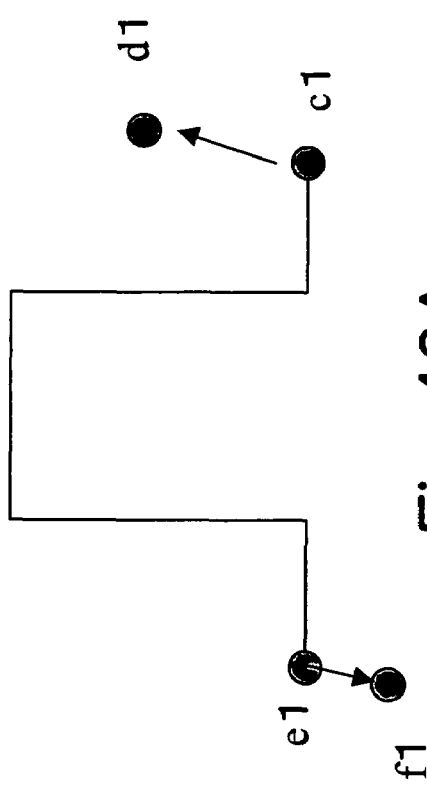
FIG. 46B is a view for explaining similarity-like transformation of an existing article shape in which two sets of the moving original line and the moving destination line are designated.

First, a similarity-like transformation process for moving the node (c1) on the first moving original line to the corresponding point (d1) on the first moving destination line is performed, as shown in FIG. 46B. This is similar to the similarity-like transformation in the fifth embodiment except that the point on the fixed edge line in the first embodiment is replaced by the node (e1) on the second moving original line.

Figure 46C:
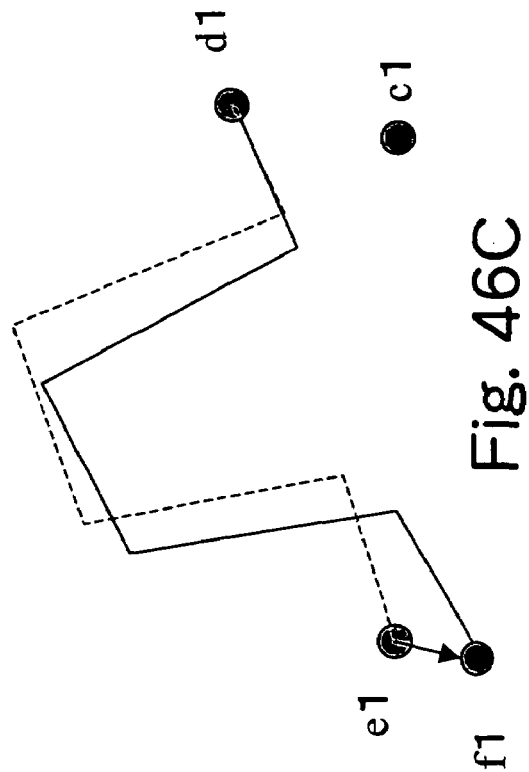
FIG. 46C is a view for explaining similarity-like transformation of an existing article shape in which two sets of the moving original line and the moving destination line are designated.
Figure 47A:
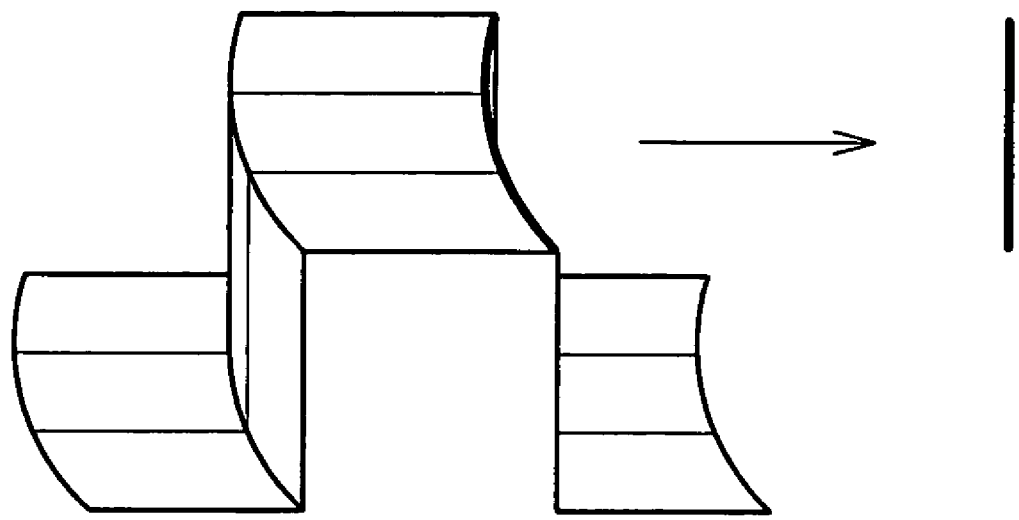
FIG. 47A is a view showing a conventional transformation process using a CAD apparatus.
Figure 47B:
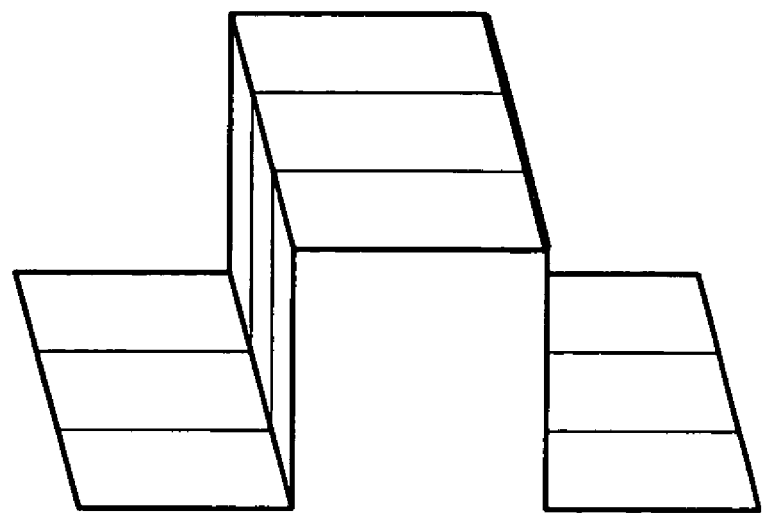
FIG. 47B is a view showing a conventional transformation process using a CAD apparatus.

Then, a similarity-like transformation process for moving the node (e1) on the second moving original line to the corresponding point (f1) on the second moving destination line is performed, as shown in FIG. 46C. By moving the nodes in two separate stages as described above, the similarity-like transformation process step (S122) is completed.

When an existing article shape includes a curved plane, similarity-like transformation is also performed in a similar manner, namely the shape node is moved in two separate stages. More specifically, in the first stage, the moving process similar to that of the fifth embodiment, in which the fixed edge line of the fifth embodiment is replaced by the second moving original line, is performed. In the second stage, the moving process similar to that of the fifth embodiment in which the moving original line, the moving destination line, and the fixed edge line of the fifth embodiment are replaced by the second moving original line, the second moving destination line, and the first moving original line, respectively, is performed. Accordingly, in the second step, the shape node is moved in accordance with a second shape node moving vector which is obtained by multiplying a second moving vector from a node belonging to the second moving original line to a corresponding point on the second moving destination line by a ratio of a distance from the first moving original line to the shape node divided by a distance from the node belonging to the second moving original line to a corresponding point on the first moving original line.

By performing the above two-stage moving process for each shape node, even when an existing article shape includes a curved plane, it is possible to perform similarity-like transformation for moving two edge lines, thereby generating a new article shape.

According to the structure of the eleventh embodiment, similarity-like transformation for moving two edge lines of an existing article shape can be performed, so that efficient design of a new shape can be achieved.

While the preferred embodiments of the present invention have been described using specific terms, such description is for illustrative purposes only, and it is to be understood that changes and variations may be made without departing from the spirit or scope of the appended claims.

What is claimed is:

1. A computer-based design shape generating apparatus for generating a new design shape of an article by performing a shape transformation process, using a transformation processing device, with respect to a design shape of the article which has been already generated, the apparatus comprising:

an input device receiving transformation instructions from an operator; and the transformation processing device performing an operation of the design shape which has been already generated in accordance with the transformation instructions, wherein the input device receives input for designating a shape attribute of the article between a transformation region for which the shape transformation process is to be performed and a maintaining region which maintains its shape, and input of a transformation instruction vector which is defined by a direction and an amount of transformation with respect to the article, and wherein the transformation processing device is configured to:

not displace a node located at a boundary between the transformation region and the maintaining region;

subdivide the transformation region into a plurality of shape elements; and displace a node defining the shape of the shape elements and belonging only to the transformation region in accordance with the input transformation instruction vector as follows:

when the node is located on a single bending line of the article, the bending line being an intersection of a surface of a first shape element and a surface of a second shape element that meet at an intersection angle other than 180 degrees, the input device further receives an input of a predetermined angle, and when an angle, formed by the transformation instruction vector and a bending line vector being an extension of the bending line, is less than the predetermined angle, the node is displaced in a direction of the bending line vector and by an amount corresponding to a component of the input transformation instruction vector in the direction of the bending line vector, and when the angle formed by the transformation instruction vector and the bending line vector is equal to or greater than the predetermined angle, the node is displaced in accordance with the transformation instruction vector, when the node is located on the intersection of a plurality of bending lines of the article, the node is displaced in the direction of the bending line vector which forms the smallest angle with respect to the transformation instruction vector and by an amount corresponding to a component of the input transformation instruction vector in the direction of the bending line vector, and when the node is not located on the bending line of the article, the node is displaced in accordance with a vector obtained by projecting the transformation instruction vector onto an extension plane of an article shape plane at that node.

2. An apparatus according to claim 1, wherein
the shape of the article which has been already generated is composed of a base shape and an auxiliary shape, and
the transformation processing device performs a transformation process only with respect to the base shape thereby generating a new base shape, and attaches the auxiliary shape to the new base shape by an auxiliary shape adding device at a predetermined position of the new base shape.

3. An apparatus according to claim 1, wherein
the input received by the input device from the operator includes instructions for an operative node of the transformation instruction vector.

4. An apparatus according to claim 3, wherein
the instructions for an operative node of the transformation instruction vector include point designation concerning a single node, line designation concerning a line connecting nodes, and plane designation concerning a plane enclosed by nodes.

5. A computer-implemented design shape generating method for generating a new design shape of an article by performing, using a transformation processing device, a shape transformation process with respect to a design shape of the article which has been already generated, the method comprising:

a region attribute input step of receiving, by an input device from an operator, input for designating a shape attribute of the article between a transformation region for which the shape transformation process is to be performed and a maintaining region which maintains its shape;

a transformation instruction input step of receiving, by an input device from the operator, a transformation instruction vector which is defined by a direction and an amount of transformation with respect to the article, and a shape transformation processing step of performing, by the transformation processing device, a displacement process with respect to a node of a shape element in accordance with the transformation instruction vector which is input, the shape transformation processing step including:

not displacing the node when the node is located at a boundary between the transformation region and the maintaining region; and displacing the node in accordance with the input transformation instruction vector as follows when the node belongs only to the transformation region:

when the node is located on a single bending line of the article, the bending line being an intersection of a surface of a first shape element and a surface of a second shape element that meet at an intersection angle other than 180 degrees, the transformation instruction input step further includes receiving an input of a predetermined angle, and when an angle, formed by the transformation instruction vector and a bending line vector being an extension of the bending line, is less than the predetermined angle, the node is displaced in a direction of the bending line vector and by an amount corresponding to a component of the input transformation instruction vector in the direction of the bending line vector, and when the angle formed by the transformation instruction vector and the bending line vector is equal to or greater than the predetermined angle, the node is displaced in accordance with the transformation instruction vector, when the node is located on the intersection of a plurality of bending lines of the article, displacing the node in the direction of the bending line vector which forms the smallest angle with respect to the transformation instruction vector and by an amount corresponding to a component of the input transformation instruction vector in the direction of the bending line vector, and when the node is not located on the bending line of the article, displacing the node in accordance with a vector obtained by projecting the transformation instruction vector onto an extension plane of an article shape plane at that node.

6. A method according to claim 5, wherein
the shape of the article which has been already generated is composed of a base shape and an auxiliary shape, and
a transformation process is performed only with respect to the base shape thereby generating a new base shape, and the auxiliary shape is attached to the new base shape by an auxiliary shape adding device at a predetermined position of the new base shape.

7. A method according to claim 5, wherein
in the transformation instruction input step, the input received by the input device from the operator includes instructions for an operative node of the transformation instruction vector.

8. A method according to claim 7, wherein
the instructions for the operative node of the transformation instruction vector include point designation concerning a single node, line designation concerning a line connecting nodes, and plane designation concerning a plane enclosed by nodes.

9. A method according to claim 5, wherein
in the shape transformation processing step, when an edge line connecting nodes of the transformation region is to extend beyond a node belonging to the boundary between the maintaining region and the transformation region as a result of node displacement in accordance with the transformation instruction vector input by the operator, (1) the transformation instruction vector input by the operator is divided into a first transformation instruction vector which terminates where the edge line connecting nodes in the transformation region reaches a node in the maintaining region and a second transformation instruction vector which starts where the edge line connecting the nodes in the transformation region reaches the node in the maintaining region;

(2) a shape transformation process in accordance with the first transformation instruction vector is performed only with respect to the transformation region which is designated by the operator;

(3) the attribute of the maintaining region including the node which contacts the edge line of the transformation region is reallocated as the attribute of the transformation region; and (4) a shape transformation process in accordance with the second transformation instruction vector is performed with respect to the transformation region, including the reallocated transformation region, of the article shape which has been subjected to the transformation process in accordance with the first transformation instruction vector.

10. An apparatus according to claim 1, wherein the bending line is curved.

11. A method according to claim 5, wherein the bending line is curved.

* * * * *